(12) United States Patent
Sato

(10) Patent No.: US 10,623,761 B2
(45) Date of Patent: Apr. 14, 2020

(54) IMAGE PROCESSING APPARATUS AND IMAGE PROCESSING METHOD

(71) Applicant: SONY CORPORATION, Tokyo (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/672,950

(22) Filed: Aug. 9, 2017

(65) Prior Publication Data

US 2017/0339424 A1 Nov. 23, 2017

Related U.S. Application Data

(63) Continuation of application No. 14/111,255, filed as application No. PCT/JP2012/063321 on May 24, 2012, now Pat. No. 9,749,625.

(30) Foreign Application Priority Data

Jul. 14, 2011 (JP) .................................. 2011-155414

(51) Int. Cl.
*H04N 19/51* (2014.01)
*H04N 19/52* (2014.01)
(Continued)

(52) U.S. Cl.
CPC ........... *H04N 19/51* (2014.11); *H04N 19/103* (2014.11); *H04N 19/139* (2014.11);
(Continued)

(58) Field of Classification Search
None
See application file for complete search history.

(56) References Cited

U.S. PATENT DOCUMENTS

| 2002/0106019 A1 | 8/2002 | Chaddha et al. |
| 2006/0088101 A1 | 4/2006 | Han et al. |
| (Continued) | | |

FOREIGN PATENT DOCUMENTS

| CN | 1764280 A | 4/2006 |
| EP | 0644695 A2 | 3/1995 |
| (Continued) | | |

OTHER PUBLICATIONS

Winken, et al., Description of video coding technology proposal by Fraunhofer HHI, Joint Collaborative Team on Video-Coding (JCT-VC) of ITU-T SG16 WP3 and ISO/IEC JTC1/SC29/WG11, Apr. 15-23, 2010, p. 1-44, $1^{st}$ Meeting: Dresden, DE.
(Continued)

*Primary Examiner* — William C Vaughn, Jr.
*Assistant Examiner* — Joseph Daniel A Towe
(74) *Attorney, Agent, or Firm* — Paratus Law Group, PLLC

(57) ABSTRACT

Provided is an image processing apparatus including an information acquisition section that acquires setting information to set a motion vector to a second prediction unit in a second layer corresponding to a first prediction unit in a first layer of a scalable-video-decoded image containing the first layer and the second layer, which is higher than the first layer, the setting information being related to a motion vector set to the first prediction unit, and a motion vector setting section that sets the motion vector to the second prediction unit using the setting information acquired by the information acquisition section.

15 Claims, 31 Drawing Sheets

(51) Int. Cl.
*H04N 19/139* (2014.01)
*H04N 19/176* (2014.01)
*H04N 19/46* (2014.01)
*H04N 19/30* (2014.01)
*H04N 19/103* (2014.01)
*H04N 19/187* (2014.01)
*H04N 19/513* (2014.01)

(52) U.S. Cl.
CPC ......... *H04N 19/176* (2014.11); *H04N 19/187* (2014.11); *H04N 19/30* (2014.11); *H04N 19/46* (2014.11); *H04N 19/513* (2014.11); *H04N 19/52* (2014.11)

(56) References Cited

U.S. PATENT DOCUMENTS

| | | | |
|---|---|---|---|
| 2006/0153300 A1 | 7/2006 | Wang et al. | |
| 2007/0253487 A1* | 11/2007 | Kim | H04N 19/105 375/240.16 |
| 2008/0089597 A1* | 4/2008 | Guo | H04N 19/30 382/238 |
| 2008/0095238 A1* | 4/2008 | Wu | H04N 19/51 375/240.16 |
| 2008/0165855 A1* | 7/2008 | Wang | H04N 19/105 375/240.16 |
| 2009/0220000 A1* | 9/2009 | Park | H04N 19/103 375/240.13 |
| 2010/0183080 A1* | 7/2010 | Jeon | H03M 7/4006 375/240.26 |
| 2011/0216833 A1* | 9/2011 | Chen | H04N 19/597 375/240.16 |
| 2011/0222605 A1 | 9/2011 | Kashiwagi et al. | |
| 2012/0008676 A1* | 1/2012 | Lee | H04N 19/137 375/240.02 |
| 2012/0134415 A1* | 5/2012 | Lin | H04N 19/52 375/240.16 |
| 2013/0107959 A1* | 5/2013 | Park | H04N 19/61 375/240.15 |

FOREIGN PATENT DOCUMENTS

| | | | | |
|---|---|---|---|---|
| EP | 1659797 A2 * | 5/2006 | ............. | H04N 19/52 |
| EP | 1659797 A2 * | 5/2006 | ........... | H04N 19/196 |
| EP | 1811786 A1 | 7/2007 | | |
| JP | 2006-121701 | 5/2006 | | |
| JP | 2008-535424 | 8/2008 | | |
| JP | 2008-536424 A | 9/2008 | | |
| JP | 2008-536440 | 9/2008 | | |
| JP | 2014-514833 | 6/2014 | | |
| WO | WO2008/049052 A2 | 4/2008 | | |
| WO | WO2012/167712 A1 | 12/2012 | | |

OTHER PUBLICATIONS

Test Model under Consideration, Joint Collaborative Team on Video Coding (JCT-VC) of ITU-T SG16 WP3 and ISO/IEC JTC1/SC29/WG11, Jul. 21-28, 2010, 2$^{nd}$ Meeting: Geneva, CH.
Yang, et al., Motion Vector Coding with Optimal PMV Selection, ITU—Telecommunications Standardization Sector, Study Group 16 Question 6, Video Coding Experts Group (VCEG), Jul. 16-18, 2008, p. 1-6, 35$^{th}$ Meeting: Berlin, DE.
Reichel, et al., Scalable Video Coding—Working Draft 3, Joint Video Team (JVT) of ISO/IEC MPEG & ITU-T VCEG (ISO/IEC JTC1/SC29/WG11 and ITU-T SG16 Q.6), Jul. 2005, p. 1 & 51, 16$^{th}$ Meeting: Poznan, PL.
May 7, 2015, EP communication issued for related EP application No. 12811989.8.
Tihao Chiang, et al., Hierarchical Coding of Digital Television, IEEE Communications Magazine, May 1994, pp. 38-45.
Jun. 23, 2015, JP communication issued for related JP application No. 2011-155414.
Danny Hong, et al., Scalability Support in HEVC, Joint Collaborative Team on Video Coding (JCT-VC) of ITU-T SG16 WP3 and ISO/IEC JTC1/SC29/WG11, Jul. 14-22, 2011, pp. 1-15, 6$^{th}$ Meeting: Torino, IT.
Aug. 3, 2016, Chinese Office Action for related CN application No. 201280033787.0.
Sep. 12, 2017, JP communication issued for related JP application No. 2016-226631.
Apr. 25, 2019, Korean Office Action issued for related KR Application No. 10-2013-7032128.
Jul. 3, 2019, Chinese Office Action issued for related CN Application No. 201611176471.3.

* cited by examiner

FIG.6
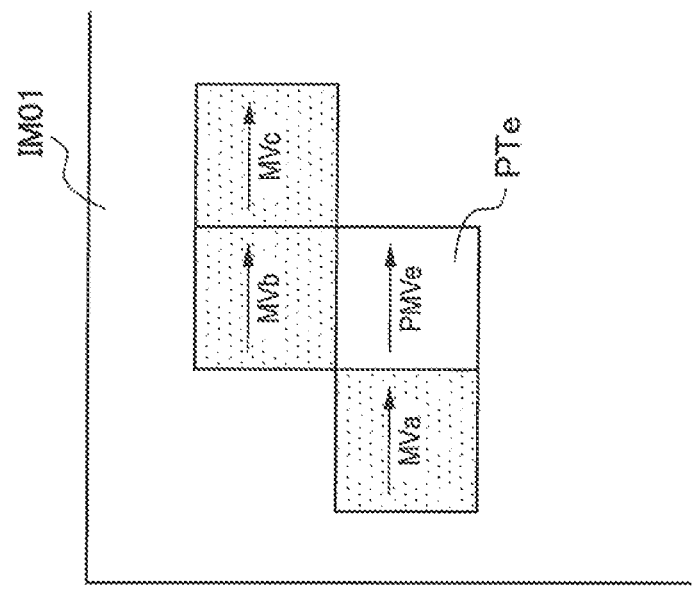
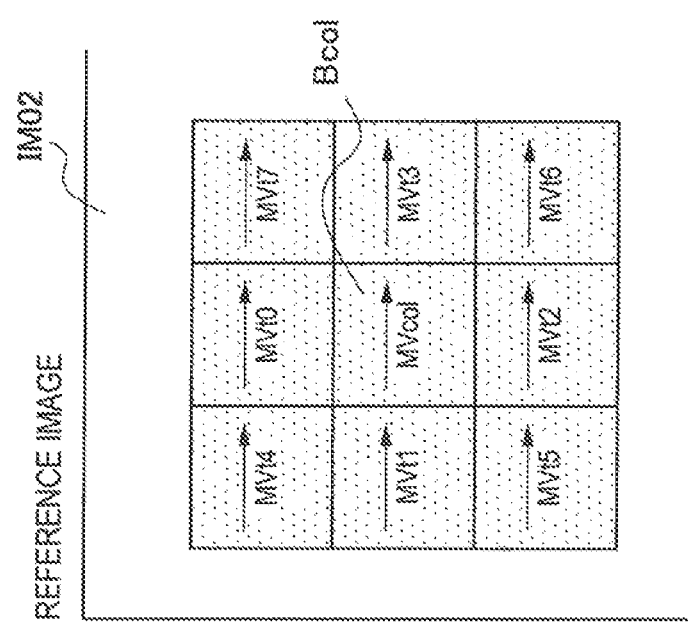

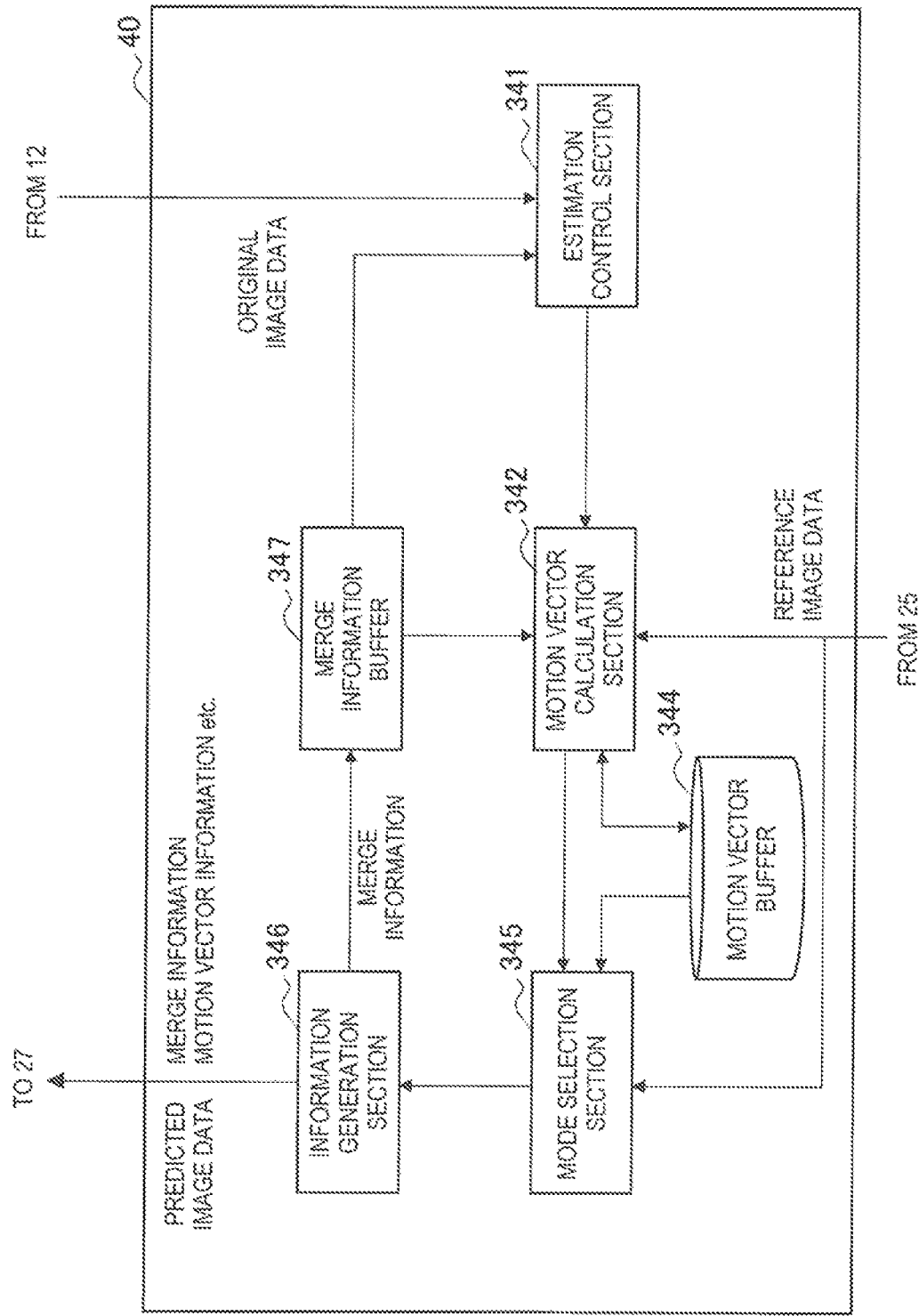

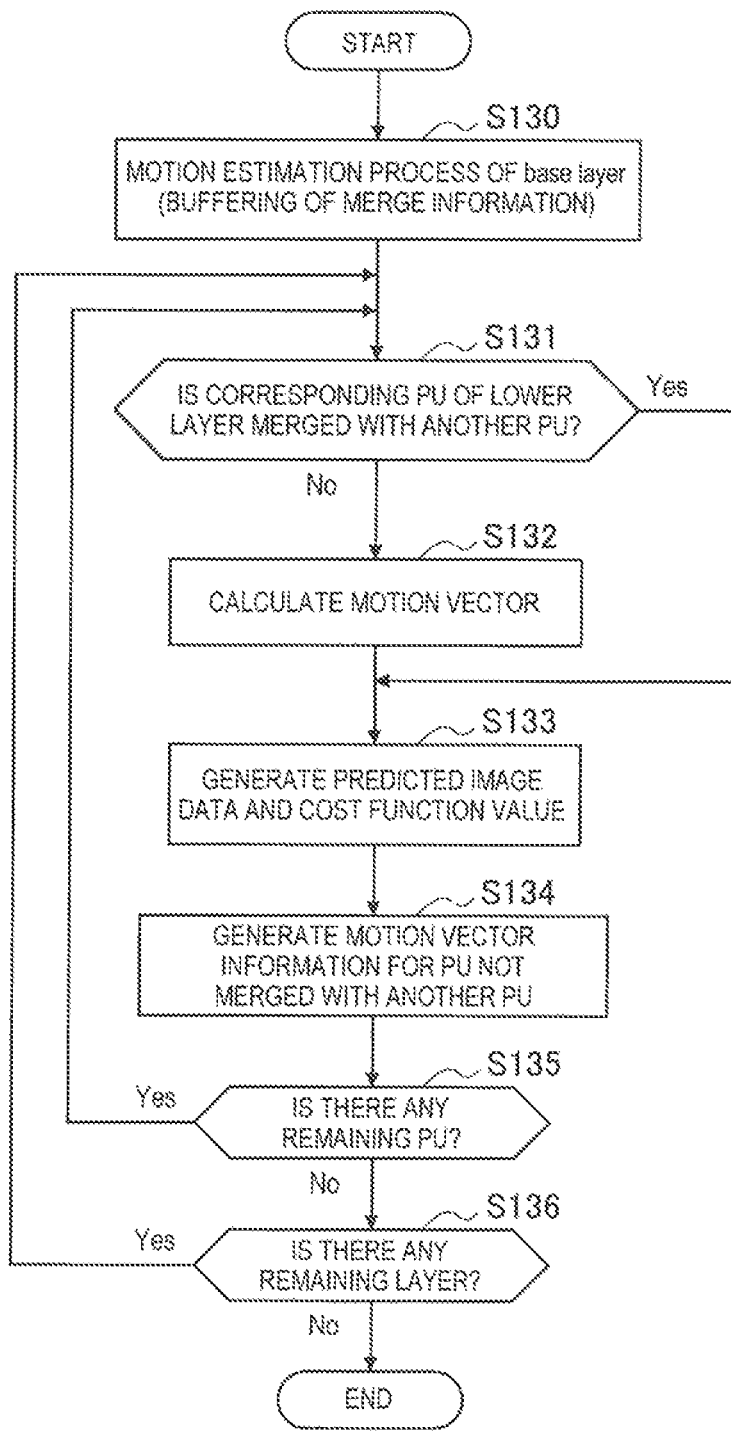

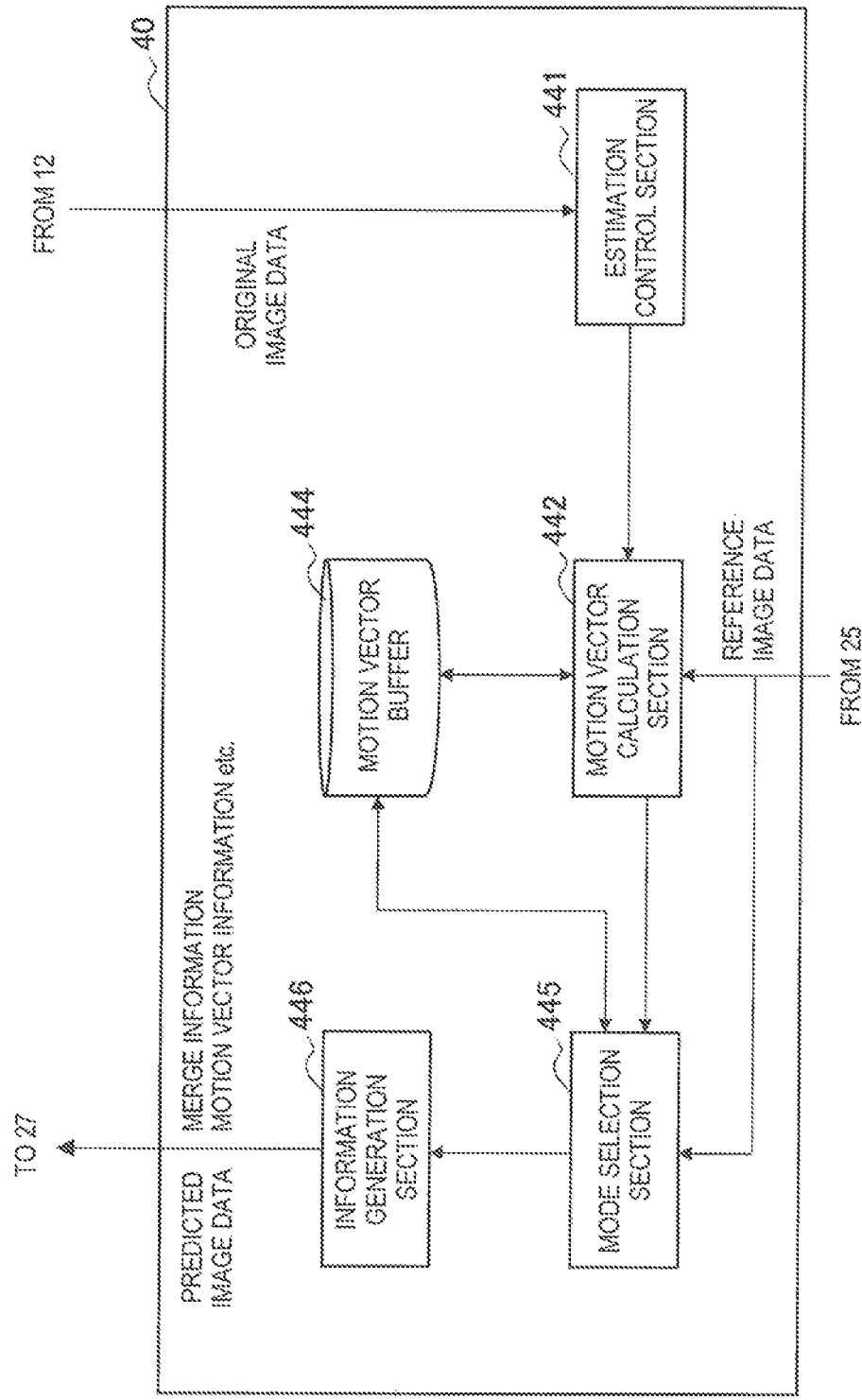

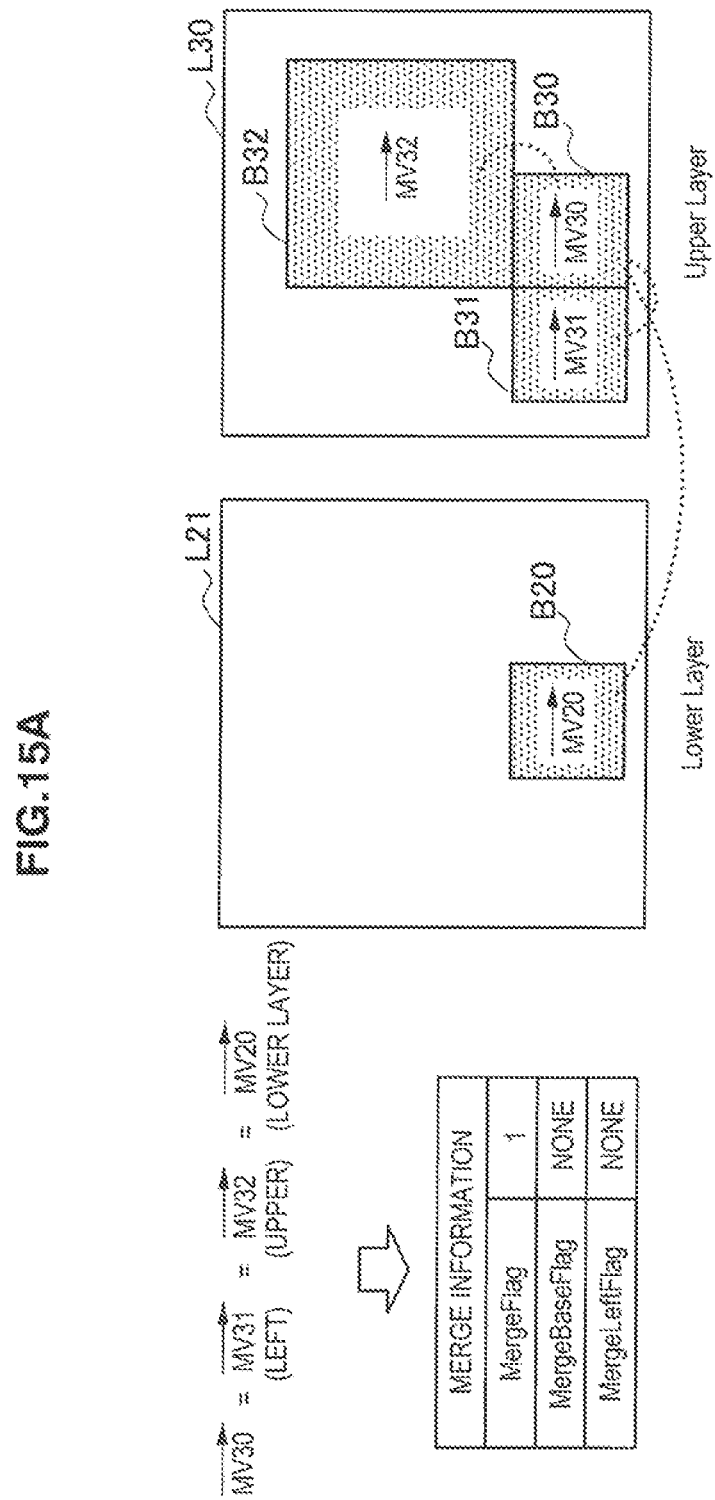

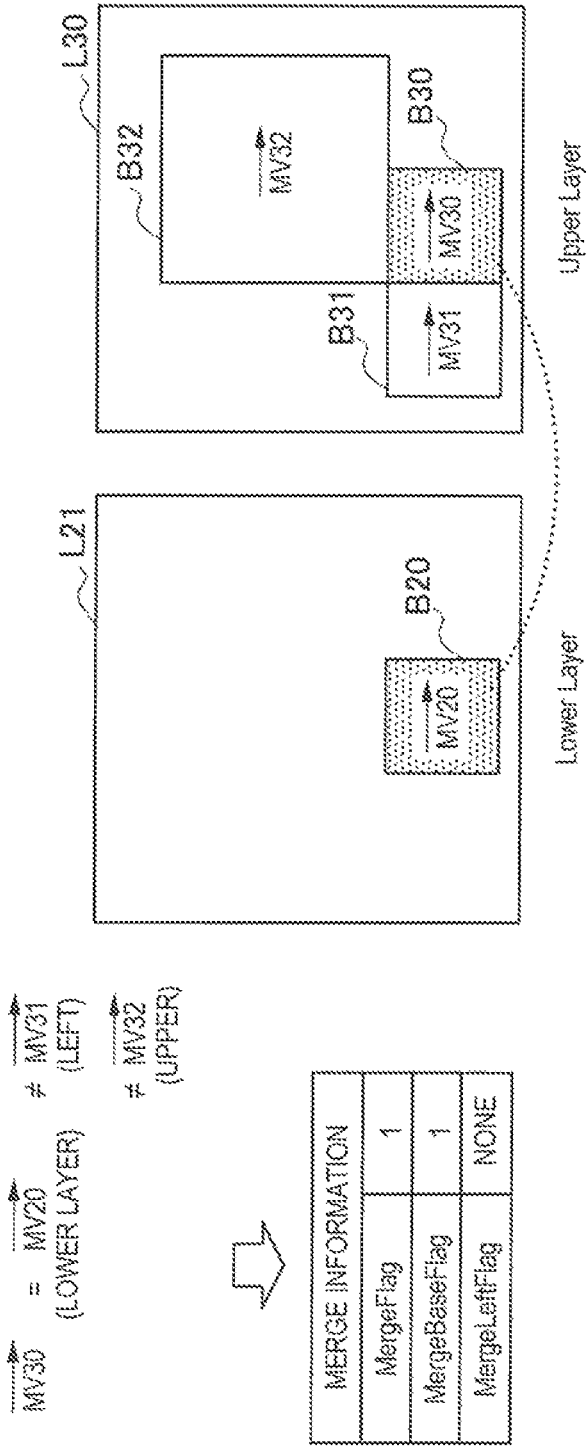

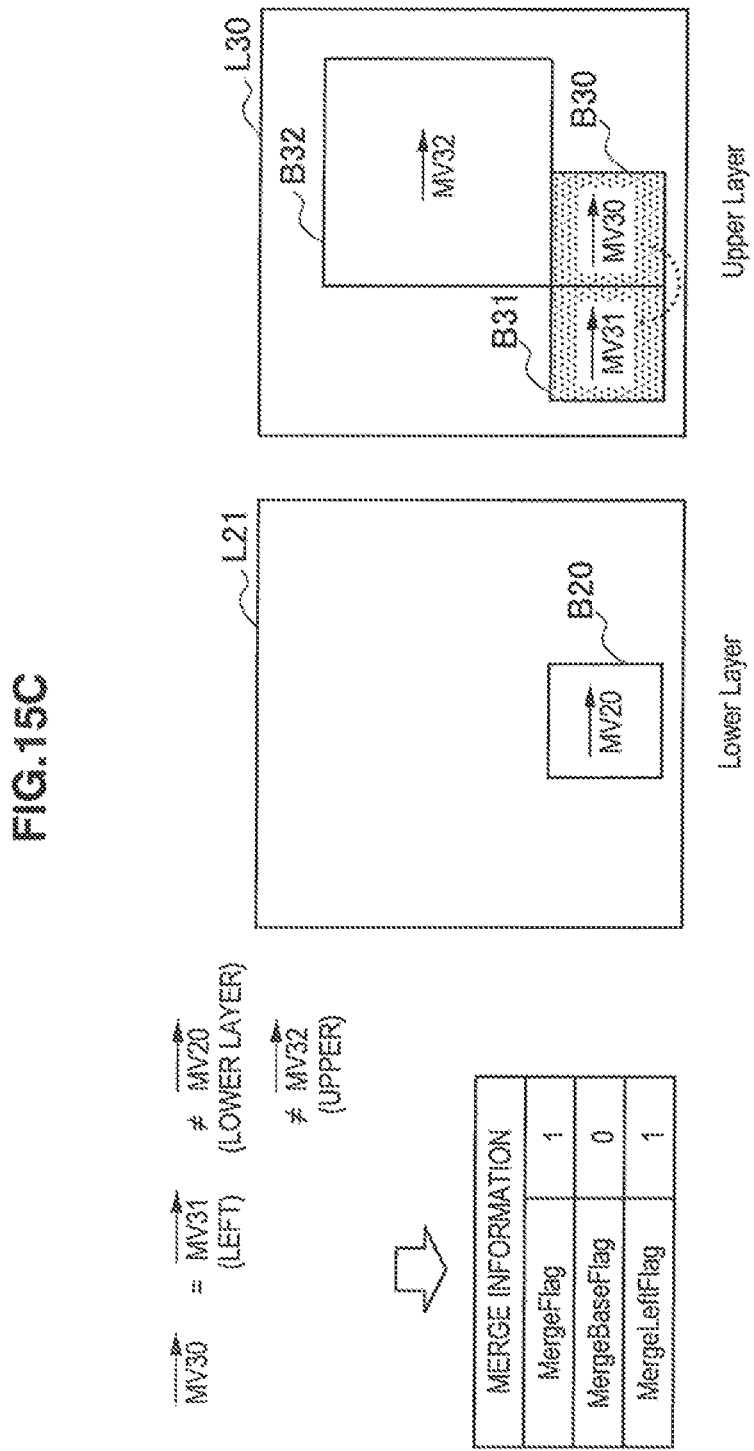

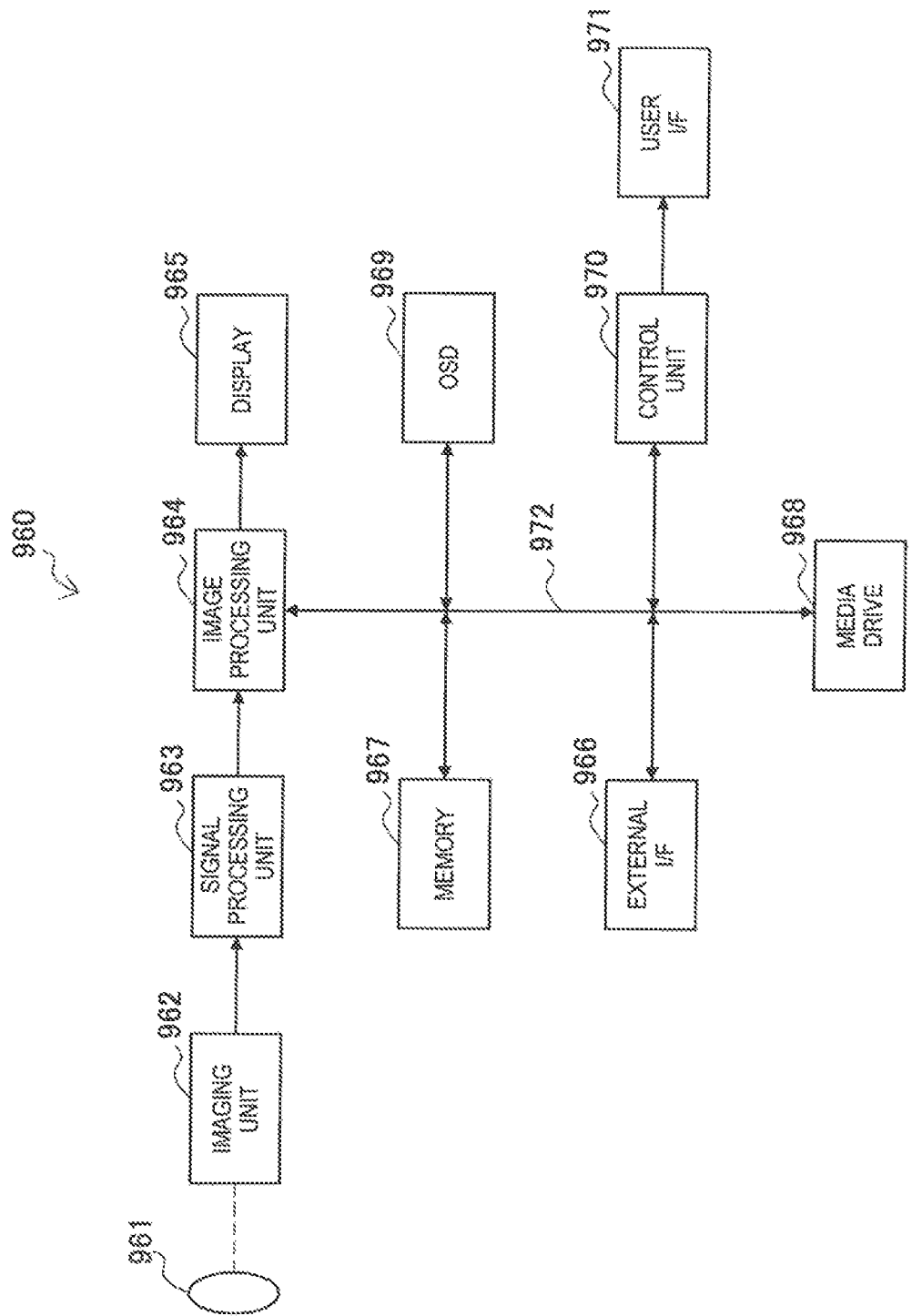

IMAGE PROCESSING APPARATUS AND IMAGE PROCESSING METHOD

CROSS REFERENCE TO PRIOR APPLICATION

This application is a continuation of U.S. application Ser. No. 14/111,255 (filed on Oct. 11, 2013), which is a National Stage Patent Application of PCT International Patent Application No. PCT/JP2012/063321 (filed on May 24, 2012) under 35 U.S.C. § 371, which claims priority to Japanese Patent Application No. 2011-155414 (filed on Jul. 14, 2011), which are all hereby incorporated by reference in their entirety.

TECHNICAL FIELD

The present disclosure relates to an image processing apparatus and an image processing method.

BACKGROUND ART

Compression technology like the H.26x (ITU-T Q6/16 VCEG) standard and MPEG (Moving Picture Experts Group)-y standard that compresses the amount of information of images using redundancy specific to images have widely been used for the purpose of efficiently transmitting or accumulating digital images. In Joint Model of Enhanced-Compression Video Coding as part of activity of MPEG4, international standards called H.264 and MPEG-4 Part 10 (Advanced Video Coding; AVC) capable of realizing a higher compression rate by incorporating new functions based on the H.26x standard have been laid down.

One important technology in these image encoding methods is the inter-frame prediction. In the inter-frame prediction, content of an image to be encoded is predicted by using a reference image and only a difference between the predicted image and the actual image is encoded. Compression of the amount of code is thereby realized. When an object moves greatly in a series of images, however, the difference between the predicted image and the actual image increases and a high compression rate cannot be achieved by a simple inter-frame prediction. Thus, an attempt is made to reduce a prediction error in the inter-frame prediction by recognizing motion of an object as a motion vector and making compensation for a pixel value in a region where the motion appears in accordance with the motion vector. Such a technique is called motion compensation.

In HEVC (High Efficiency Video Coding) HEVC whose standardization is under way as the next-generation image encoding method succeeding the H.264/AVC, each coding unit (CU) in an image is further divided into one or more prediction units (PU) and a motion vector can be set to each prediction unit. The size and shape of the prediction unit in HEVC is more varied than those of a block in H.264/AVC and the motion of an object can be reflected in motion compensation more correctly (see Non-Patent Literature 1 below). Non-Patent Literature 2 below proposes a technology that predicts a motion vector using a spatial correlation or temporal correlation of motion and encodes only a difference between the predicted motion vector and the actual motion vector to reduce the amount of code of the motion vector. Non-Patent Literature 3 below proposes to reduce the amount of code of motion information by merging blocks having common motion information of neighboring blocks in an image.

Another important technology in the aforementioned image coding method is scalable video coding (SVC). The scalable video coding is a technology that hierarchically encodes a layer transmitting a rough image signal and a layer transmitting a fine image signal. Typical attributes hierarchized in the scalable video coding mainly include the following three:

Space scalability: Spatial resolutions or image sizes are hierarchized.

Time scalability: Frame rates are hierarchized.

SNR (Signal to Noise Ratio) scalability: SN ratios are hierarchized.

Further, though not yet adopted in the standard, the bit depth scalability and chroma format scalability are also discussed.

CITATION LIST

Non-Patent Literature

Non-Patent Literature 1: JCTVC-B205, "Test Model under Consideration", Joint Collaborative Team on Video Coding meeting: Geneva, CH, 21-28 July, 2010

Non-Patent Literature 2: VCEG-AI22, "Motion Vector Coding with Optimal PMV Selection", Jungyoup Yang, et al, July, 2008

Non-Patent Literature 3: JCTVC-A116, "Video Coding Technology Proposal by Fraunhofer HHI", M. Winken, et al, April, 2010

SUMMARY OF INVENTION

Technical Problem

The technique proposed in Non-Patent Literature 2 and the technique proposed in Non-Patent Literature 3 described above do not assume scalable video coding. If such existing techniques are applied to each layer of an image to be scalable-video-encoded, the amount of code can be reduced to some extent. However, depending on the type of scalable video coding, the correlation of motion between layers is conspicuous. Therefore, it is useful to enhance the encoding efficiency by utilizing such a correlation of motion between layers.

An object of the technology according to the present disclosure is to enhance the encoding efficiency by utilizing a correlation of motion between layers of an image to be scalable-video-encoded.

Solution to Problem

According to the present disclosure, there is provided an image processing apparatus including an information acquisition section that acquires setting information to set a motion vector to a second prediction unit in a second layer corresponding to a first prediction unit in a first layer of a scalable-video-decoded image containing the first layer and the second layer, which is higher than the first layer, the setting information being related to a motion vector set to the first prediction unit, and a motion vector setting section that sets the motion vector to the second prediction unit using the setting information acquired by the information acquisition section.

The image processing device mentioned above may be typically realized as an image decoding device that decodes an image.

According to the present disclosure, there is provided an image processing method including acquiring setting information to set a motion vector to a second prediction unit in a second layer corresponding to a first prediction unit in a first layer of a scalable-video-decoded image containing the first layer and the second layer, which is higher than the first layer, the setting information being related to a motion vector set to the first prediction unit, and setting the motion vector to the second prediction unit using the acquired setting information.

According to the present disclosure, there is provided an image processing apparatus including an information generation section that generates setting information to set a motion vector to a second prediction unit in a second layer corresponding to a first prediction unit in a first layer of a scalable-video-decoded image containing the first layer and the second layer, which is higher than the first layer, the setting information being related to a motion vector set to the first prediction unit, and an encoding section that encodes the setting information generated by the information generation section.

The image processing device mentioned above may be typically realized as an image encoding device that encodes an image.

According to the present disclosure, there is provided an image processing method including generating setting information to set a motion vector to a second prediction unit in a second layer corresponding to a first prediction unit in a first layer of a scalable-video-decoded image containing the first layer and the second layer, which is higher than the first layer, the setting information being related to a motion vector set to the first prediction unit, and encoding the generated setting information.

Advantageous Effects of Invention

According to the present disclosure, the encoding efficiency is further enhanced by utilizing a correlation of motion between layers of an image to be scalable-video-encoded.

BRIEF DESCRIPTION OF DRAWINGS

FIG. 6 is a second explanatory view illustrating an example of a predictor candidate to predict a motion vector.

FIG. 11 is a block diagram showing an example of a detailed configuration of the motion estimation section according to a third example.

FIG. 13 is a flow chart showing an example of a flow of a motion estimation process by a motion estimation section according to the third example.

FIG. 14 is a block diagram showing an example of a detailed configuration of the motion estimation section according to a fourth example.

FIG. 15A is an explanatory view showing a first example of merge information.

FIG. 15B is an explanatory view showing a second example of merge information.

FIG. 15C is an explanatory view showing a third example of merge information.

FIG. 29 is a block diagram showing an example of a schematic configuration of an image capturing device.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

The description will be provided in the order shown below:

1. Configuration Example of Image Encoding Device
2. Detailed Configuration Example of Motion Estimation Section
   2-1. First Example
   2-2. Second Example
   2-3. Third Example
   2-4. Fourth Example
3. Configuration Example of Image Decoding Device
4. Detailed Configuration Example of Motion Compensation Section
   4-1. First Example
   4-2. Second Example
   4-3. Third Example
   4-4. Fourth Example
5. Application Example
6. Summary

Figure 1:
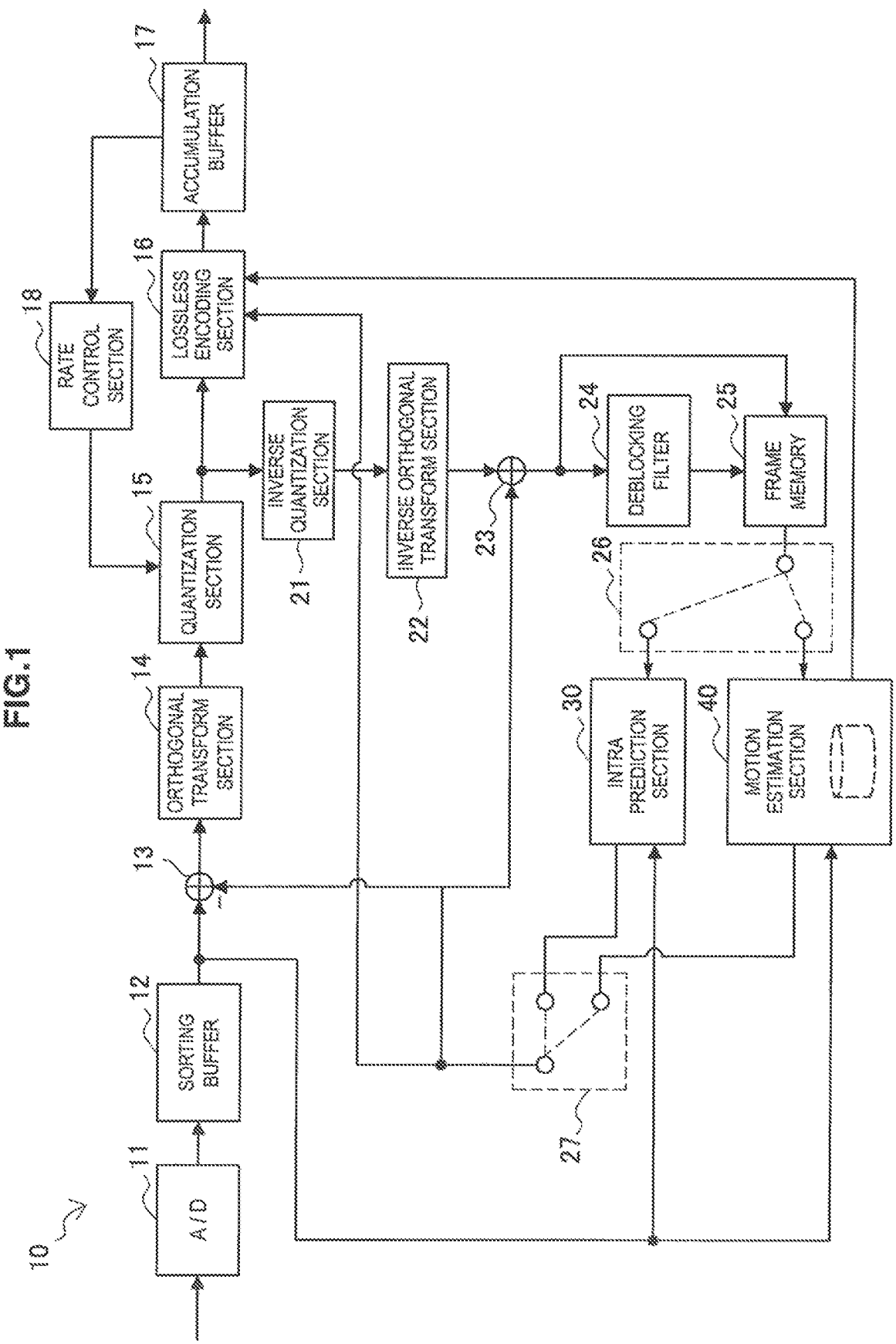
FIG. 1 is a block diagram showing a configuration of an image coding device according to an embodiment.

1. Example Configuration of Image Encoding Device According to an Embodiment FIG. 1 is a block diagram showing an example of a configuration of an image encoding device 10 according to an embodiment. Referring to FIG. 1, the image encoding device 10 includes an A/D (Analogue to Digital) conversion section 11, a sorting buffer 12, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a deblocking filter 24, a frame memory 25, selectors 26 and 27, an intra prediction section 30 and a motion estimation section 40.

The A/D conversion section 11 converts an image signal input in an analogue format into image data in a digital format, and outputs a series of digital image data to the sorting buffer 12.

The sorting buffer 12 sorts the images included in the series of image data input from the A/D conversion section 11. After sorting the images according to the a GOP (Group of Pictures) structure according to the encoding process, the sorting buffer 12 outputs the image data which has been sorted to the subtraction section 13, the intra prediction section 30 and the motion estimation section 40.

The image data input from the sorting buffer 12 and predicted image data input by the intra prediction section 30 or the motion estimation section 40 described later are supplied to the subtraction section 13. The subtraction section 13 calculates predicted error data which is a difference between the image data input from the sorting buffer 12 and the predicted image data and outputs the calculated predicted error data to the orthogonal transform section 14.

The orthogonal transform section 14 performs orthogonal transform on the predicted error data input from the subtraction section 13. The orthogonal transform to be performed by the orthogonal transform section 14 may be discrete cosine transform (DCT) or Karhunen-Loeve transform, for example. The orthogonal transform section 14 outputs transform coefficient data acquired by the orthogonal transform process to the quantization section 15.

The transform coefficient data input from the orthogonal transform section 14 and a rate control signal from the rate control section 18 described later are supplied to the quantization section 15. The quantization section 15 quantizes the transform coefficient data, and outputs the transform coefficient data which has been quantized (hereinafter, referred to as quantized data) to the lossless encoding section 16 and the inverse quantization section 21. Also, the quantization section 15 switches a quantization parameter (a quantization scale) based on the rate control signal from the rate control section 18 to thereby change the bit rate of the quantized data to be input to the lossless encoding section 16.

The lossless encoding section 16 generates an encoded stream by performing a lossless encoding process on the quantized data input from the quantization section 15. The lossless encoding by the lossless encoding section 16 may be variable-length coding or arithmetic coding, for example. Furthermore, the lossless encoding section 16 multiplexes the information about intra prediction or the information about inter prediction input from the selector 27 to the header region of the encoded stream. Then, the lossless encoding section 16 outputs the generated encoded stream to the accumulation buffer 17.

The accumulation buffer 17 temporarily accumulates an encoded stream input from the lossless encoding section 16. Then, the accumulation buffer 17 outputs the accumulated encoded stream to a transmission section (not shown) (for example, a communication interface or an interface to peripheral devices) at a rate in accordance with the band of a transmission path.

The rate control section 18 monitors the free space of the accumulation buffer 17. Then, the rate control section 18 generates a rate control signal according to the free space on the accumulation buffer 17, and outputs the generated rate control signal to the quantization section 15. For example, when there is not much free space on the accumulation buffer 17, the rate control section 18 generates a rate control signal for lowering the bit rate of the quantized data. Also, for example, when the free space on the accumulation buffer 17 is sufficiently large, the rate control section 18 generates a rate control signal for increasing the bit rate of the quantized data.

The inverse quantization section 21 performs an inverse quantization process on the quantized data input from the quantization section 15. Then, the inverse quantization section 21 outputs transform coefficient data acquired by the inverse quantization process to the inverse orthogonal transform section 22.

The inverse orthogonal transform section 22 performs an inverse orthogonal transform process on the transform coefficient data input from the inverse quantization section 21 to thereby restore the predicted error data. Then, the inverse orthogonal transform section 22 outputs the restored predicted error data to the addition section 23.

The addition section 23 adds the restored predicted error data input from the inverse orthogonal transform section 22 and the predicted image data input from the intra prediction section 30 or the motion estimation section 40 to thereby generate decoded image data. Then, the addition section 23 outputs the generated decoded image data to the deblocking filter 24 and the frame memory 25.

The deblocking filter 24 performs a filtering process for reducing block distortion occurring at the time of encoding of an image. The deblocking filter 24 filters the decoded image data input from the addition section 23 to remove the block distortion, and outputs the decoded image data after filtering to the frame memory 25.

The frame memory 25 stores, using a storage medium, the decoded image data input from the addition section 23 and the decoded image data after filtering input from the deblocking filter 24.

The selector 26 reads the decoded image data after filtering which is to be used for inter prediction from the frame memory 25, and supplies the decoded image data which has been read to the motion estimation section 40 as reference image data. Also, the selector 26 reads the decoded image data before filtering which is to be used for intra prediction from the frame memory 25, and supplies the decoded image data which has been read to the intra prediction section 30 as reference image data.

In the inter prediction mode, the selector 27 outputs predicted image data as a result of inter prediction output from the motion estimation section 40 to the subtraction section 13 and also outputs information about the inter prediction to the lossless encoding section 16. In the intra prediction mode, the selector 27 outputs predicted image data as a result of intra prediction output from the intra prediction section 30 to the subtraction section 13 and also outputs information about the intra prediction to the lossless encoding section 16. The selector 27 switches the inter prediction mode and the intra prediction mode in accordance with the magnitude of a cost function value output from the intra prediction section 30 or the motion estimation section 40.

The intra prediction section 30 performs an intra prediction process for each block set inside an image based on an image data to be encoded (original image data) input from the sorting buffer 12 and decoded image data as reference image data supplied from the frame memory 25. Then, the intra prediction section 30 outputs information about the intra prediction including prediction mode information indicating the optimum prediction mode, the cost function value, and predicted image data to the selector 27.

The motion estimation section 40 performs a motion estimation process for an inter prediction (inter-frame prediction) based on original image data input from the sorting buffer 12 and decoded image data supplied via the selector 26. The motion estimation process by the motion estimation section 40 according to the present embodiment is realized by extending the technique described in Non-Patent Literature 2 or the technique described in Non-Patent Literature 3. In the extension of the technique described in Non-Patent Literature 2 described above, the motion estimation section 40 can generate predictor information showing the optimum predictor for each prediction unit. In the extension of the technique described in Non-Patent Literature 3 described above, the motion estimation section 40 can generate margin information showing the optimum margin mode for each prediction unit. Then, the motion estimation section 40 outputs predictor information or margin information, information about an inter prediction including motion vector information and reference image information, the cost function value, and predicted image data to the selector 27. In the next section, four examples of a detailed configuration of the motion estimation section 40 will be described.

The image encoding device 10 repeats a series of encoding processes described here for each of a plurality of layers of an image to be scalable-video-coded. The layer to be encoded first is a layer called a base layer representing the roughest image. An encoded stream of the base layer may be independently decoded without decoding encoded streams of other layers. Layers other than the base layer are layers called enhancement layer representing finer images. Information contained in an encoded stream of the base layer is used for an encoded stream of an enhancement layer to enhance the coding efficiency. Therefore, to reproduce an image of an enhancement layer, encoded streams of both of the base layer and the enhancement layer are decoded. The number of layers handled in scalable video coding may be three or more. In such a case, the lowest layer is the base layer and remaining layers are enhancement layers. For an encoded stream of a higher enhancement layer, information contained in encoded streams of a lower enhancement layer and the base layer may be used for encoding and decoding. In this specification, of at least two layers having dependence, the layer on the side depended on is called a lower layer and the layer on the depending side is called an upper layer.

In scalable video coding by the image encoding device 10, a correlation of motion between layers is used to efficiently encode information about the inter prediction. That is, in an inter prediction block, a motion vector is set to an upper layer based on setting information about a motion vector set to a lower layer. More specifically, the motion estimation section 40 shown in FIG. 1 includes a buffer to temporarily store information obtained during inter prediction in the lower layer and uses the information stored in the buffer to set a motion vector to the upper layer. A correlation of motion between layers clearly appears particularly in scalable video coding based on space scalability or SNR scalability.

Figure 2:
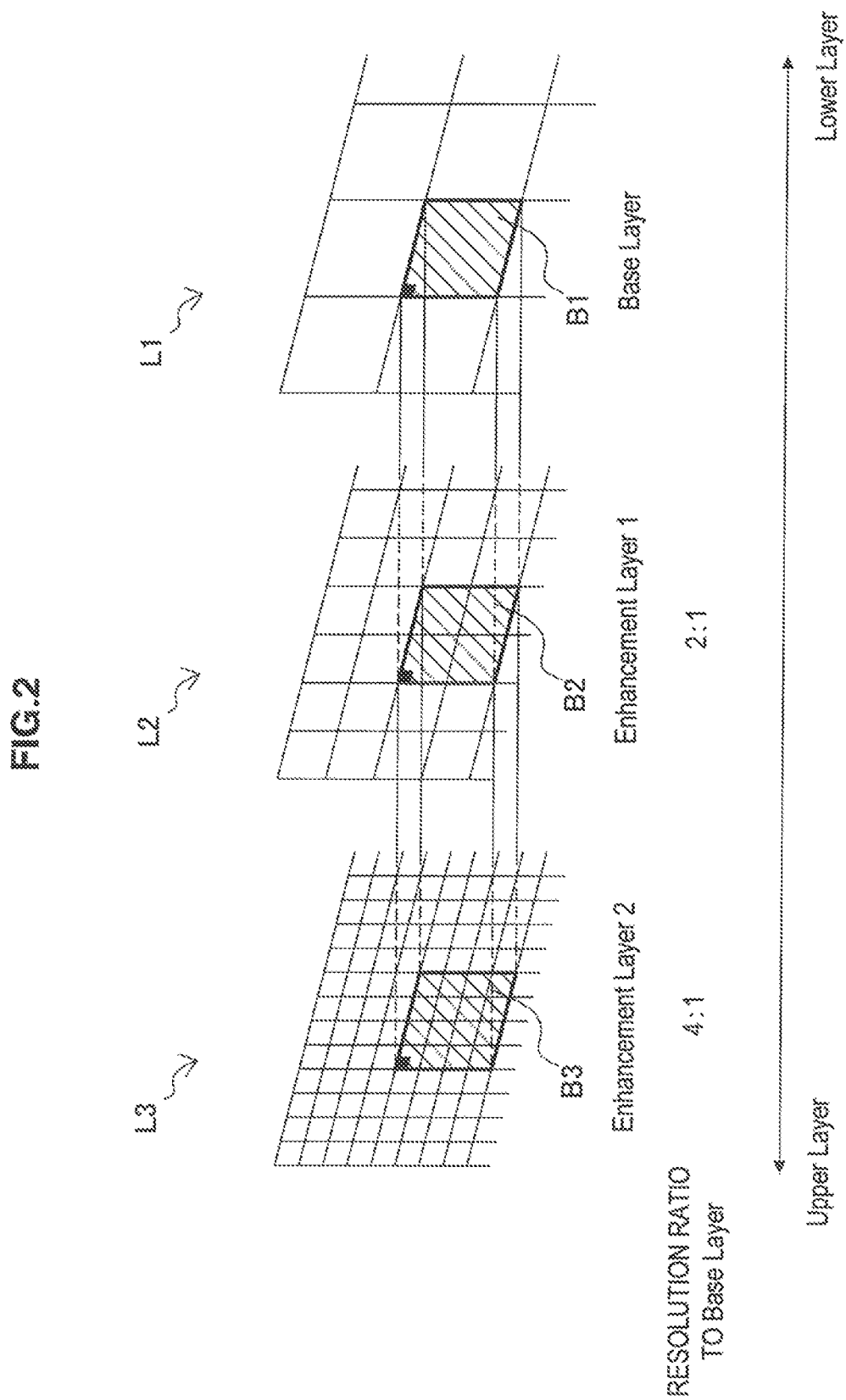
FIG. 2 is an explanatory view illustrating space scalability.

FIG. 2 is an explanatory view illustrating an example of space scalability. In FIG. 2, three layers L1, L2, L3 to be scalable-video-encoded are shown. The layer L1 is the base layer and the layers L2, L3 are enhancement layers. The ratio of spatial resolution of the layer L2 to the layer L1 is 2:1. The ratio of spatial resolution of the layer L3 to the layer L1 is 4:1. Even if the resolutions are different from each other as described above, motion appearing in a prediction unit B1 in the layer L1 is likely to appear in a corresponding prediction unit B2 in the layer L2 and a corresponding prediction unit B3 in the layer L3 in the same manner. This is a correlation of motion between layers in the space scalability.

Figure 3:
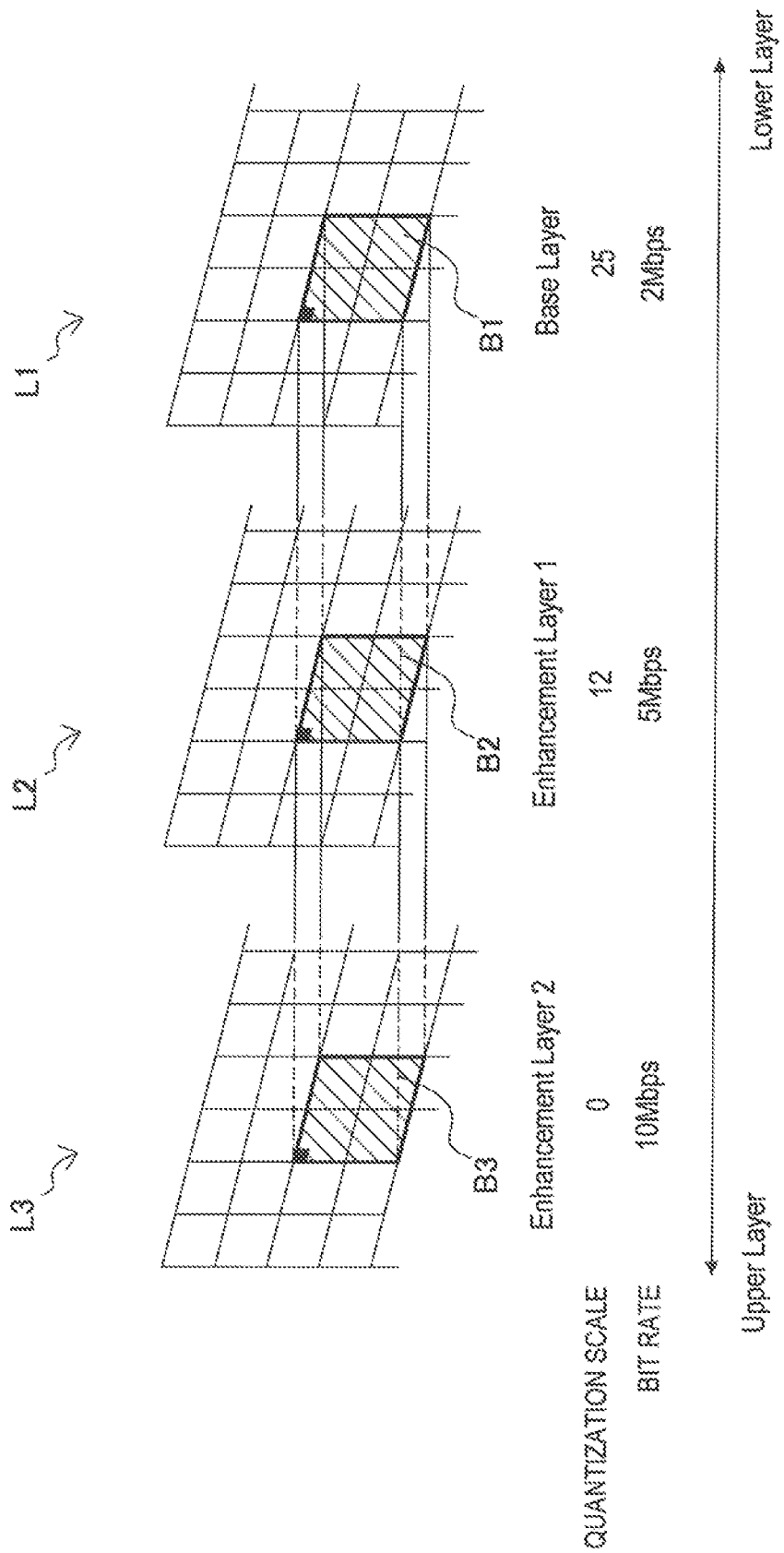
FIG. 3 is an explanatory view illustrating SNR scalability.

FIG. 3 is an explanatory view illustrating an example of SNR scalability. In FIG. 3, the three layers L1, L2, L3 to be scalable-video-encoded are shown. The layer L1 is the base layer and the layers L2, L3 are enhancement layers. The layers L1, L2, L3 are equal in space scalability to each other. However, as an example, the minimum quantization scale of the layer L1 is 25 and the bit rate of an encoded stream can be controlled to about 2 Mbps by quantization of an orthogonal transform coefficient. On the other hand, for example, the minimum quantization scale of the layer L2 is 12 and the bit rate of an encoded stream becomes about 5 Mbps. Also, for example, the minimum quantization scale of the layer L3 is 0 and the bit rate of an encoded stream becomes about 10 Mbps. Thus, even if the bit rates are different from each other, the motion appearing in the prediction unit B1 in the layer L1 is likely to appear in the corresponding prediction unit B2 in the layer L2 and the corresponding prediction unit B3 in the layer L3 in the same manner. This is a correlation of motion between layers in the SNR scalability.

The image encoding device 10 according to the present embodiment efficiently encodes information about an inter prediction by actively utilizing such a correlation of motion between layers.

Instead, the prediction unit of the lower layer corresponding to the prediction unit of the upper layer may be, for example, the prediction unit, among prediction units in the lower layer overlapping (sharing pixels in the same position) with the prediction unit of the upper layer, having the largest overlap (having the largest number of shared pixels). According to such a definition, the prediction unit where a correlation of motion is most likely to appear can be decided as the "corresponding prediction unit".

2. Detailed Configuration Example of Motion Estimation Section

In this section, four examples of a detailed configuration of the motion estimation section 40 shown in FIG. 1 will be described. Of these four examples, the first and second examples are examples concerning the extension of the technique described in Non-Patent Literature 2 described above. On the other hand, the third and fourth examples are examples concerning the extension of the technique described in Non-Patent Literature 3 described above.

2-1. First Example

Figure 4:
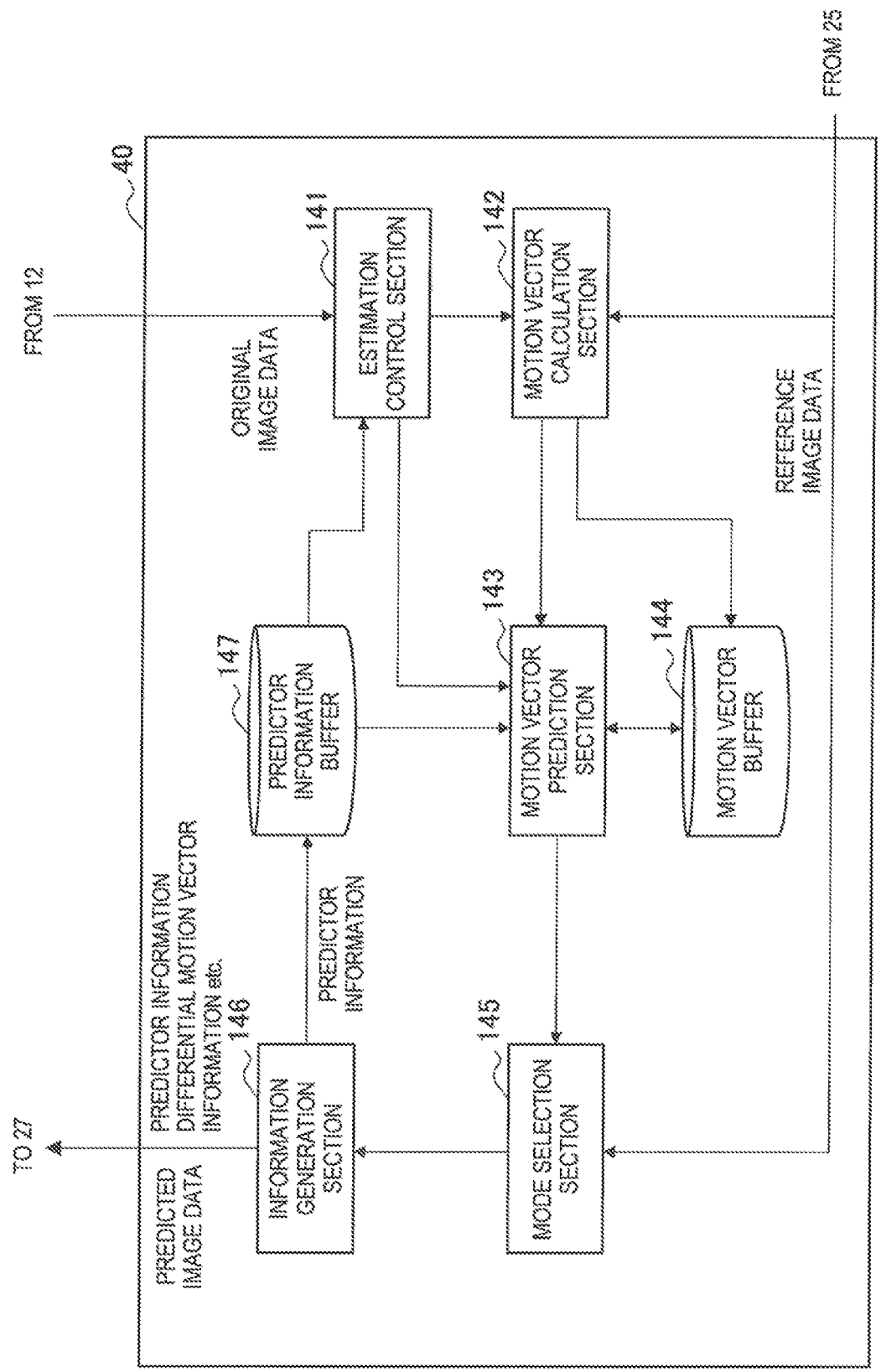
FIG. 4 is a block diagram showing an example of a detailed configuration of a motion estimation section according to a first example.

FIG. 4 is a block diagram showing an example of a detailed configuration of the motion estimation section 40 according to the first example. Referring to FIG. 4, the motion estimation section 40 includes an estimation control section 141, a motion vector calculation section 142, a motion vector prediction section 143, a motion vector buffer 144, a mode selection section 145, an information generation section 146, and a predictor information buffer 147.

(1) Base Layer

In a motion estimation process of the base layer, the estimation control section 141 arranges at least one prediction unit in a coding unit and causes the motion vector calculation section 142 to calculate a motion vector for each prediction unit. The motion vector calculated by the motion vector calculation section 142 is output to the motion vector prediction section 143 and also stored in the motion vector buffer 144. The motion vector prediction section 143 generates a predicted motion vector using motion vectors (called reference motion vectors) of other blocks stored in the motion vector buffer 144 according to each of a plurality of predictor candidates. Then, the motion vector prediction section 143 calculates a differential motion vector as a difference between the motion vector calculated by the motion vector calculation section 142 and the predicted motion vector. The mode selection section 145 generates predicted image data using the motion vector calculated by the motion vector calculation section 142 and evaluates the cost function value calculated based on comparison of the generated predicted image data and original image data. Then, the mode selection section 145 selects the optimum arrangement of prediction units that minimizes the cost function value and the optimum predictor for each prediction unit. The information generation section 146 generates predictor information showing the optimum predictor for each prediction unit and information about the inter prediction including differential motion vector information showing the differential motion vector. For example, the predictor information may contain an index to identify the reference motion vector. The predictor information may also contain a parameter to identify the prediction formula. Then, the information generation section 146 outputs the information about the inter prediction, cost function value, and predicted image data that have been generated to the selector 27. In addition, the predictor information generated by the information generation section 146 is temporarily stored in the predictor information buffer 147 for a process in the upper layer.

Figure 5:
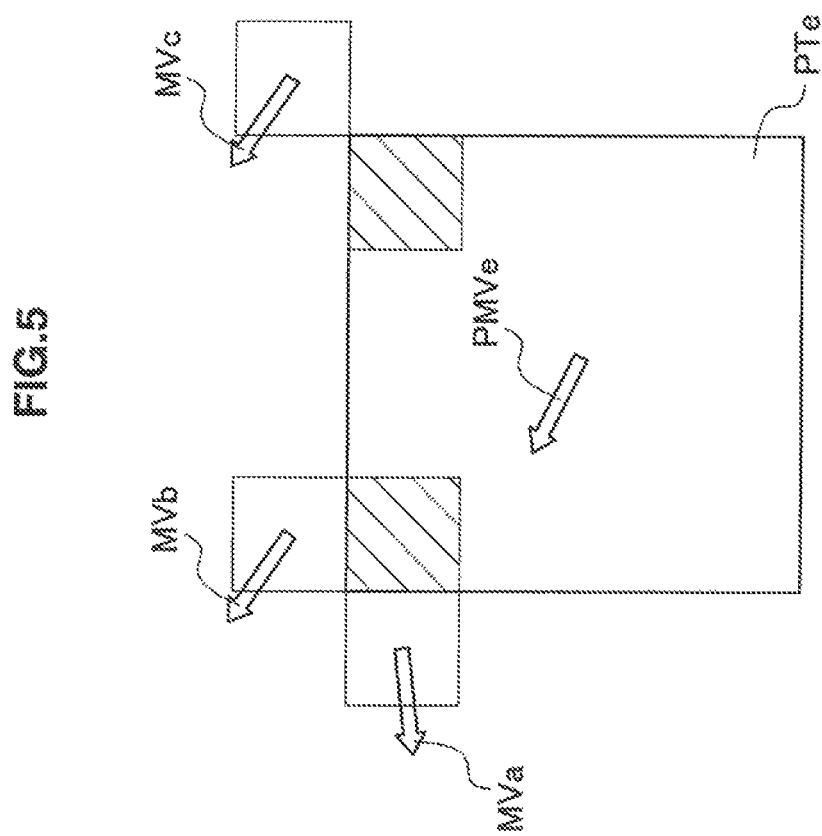
FIG. 5 is a first explanatory view illustrating an example of a predictor candidate to predict a motion vector.

FIGS. 5 and 6 are first explanatory views illustrating examples of predictor candidates to predict a motion vector. Referring to FIG. 5, one prediction unit PTe to be predicted and a predicted motion vector PMVe of the prediction unit PTe are shown. The predicted motion vector PMVe of the prediction unit PTe can be predicted by using, for example, motion vectors MVa, MVb, MVc of prediction units adjacent to the prediction unit PTe as reference motion vectors. The reference motion vector MVa is a motion vector set to the prediction unit adjacent on the left side of the prediction unit PTe. The reference motion vector MVb is a motion vector set to the prediction unit adjacent on the upper side of the prediction unit PTe. The reference motion vector MVc is a motion vector set to the prediction unit adjacent on the upper right side of the prediction unit PTe. The predicted motion vector PMVe is generated according to the following prediction formula by using these reference motion vectors MVa, MVb, MVc.

[Math. 1]

$$PMVe = \text{med}(MVa, MVb, MVc) \quad (1)$$

Formula (1) is a prediction formula based on a spatial correlation of motion. Med in Formula (1) represents a median operation. That is, according to Formula (1), the predicted motion vector PMVe is a vector having a median of horizontal components and a median of vertical components of the reference motion vectors MVa, MVb, MVc as components. The predicted motion vector PMVe generated according to Formula (1) is an example of the predictor candidate. The predicted motion vector calculated according to such a prediction formula based on a spatial correlation of motion is called a spatial predictor.

Incidentally, Formula (1) is only an example of the prediction formula. When, for example, one of the motion vectors MVa, MVb, MVc is not present because the prediction unit to be predicted is positioned at an edge of an image, the vector that is not present may be omitted from the argument of the median operation. In addition, like Formulas (2) to (4) shown below, a simpler spatial predictor may be used as a predictor candidate.

[Math. 2]

$$PMVe = MVa \quad (2)$$

$$PMVe = MVb \quad (3)$$

$$PMVe = MVc \quad (4)$$

On the other hand, a temporal predictor as a predicted motion vector calculated according to a prediction formula based on a temporal correlation of motion can also be used as a predictor candidate. Referring to FIG. 6, an image IM01 containing the prediction unit PTe to be predicted and a reference image IM02 are shown. A block Bcol in the reference image IM02 is a collocated block of the prediction unit PTe. A prediction formula using a temporal correlation of motion uses, for example, a motion vector set to the collocated block Bcol or a block adjacent to the collocated block Bcol as a reference motion vector.

For example, a motion vector set to the collocated block Bcol is set as MVcol. In addition, motion vectors set to upper, left, lower, right, upper left, lower left, lower right, and upper right blocks of the collocated block Bcol are set as MVt0 to MVt7 respectively. Then, the predicted motion vector PMVe can be generated from the reference motion vector MVcol and MVt0 to MVt7 by using Prediction Formula (5) or (6) shown below.

[Math. 3]

$$PMVe = \text{med}(MVcol, MVt0, \ldots, MVt3) \quad (5)$$

$$PMVe = \text{med}(MVcol, MVt0, \ldots, MVt7) \quad (6)$$

After generating the predicted motion vector PMVe for each of a plurality of predictor candidates, the motion vector prediction section 143 calculates, as shown in the following formula, a differential motion vector MVDe representing a difference between the motion vector MVe calculated by the motion vector calculation section 142 and the predicted motion vector PMVe.

[Math. 4]

$$MVDe = MVe - PMVe \qquad (7)$$

Then, the optimum predictor (for example, the predictor with the highest prediction accuracy) is selected for each prediction unit by the mode selection section 145, and predictor information showing the optimum predictor and differential motion vector information showing the corresponding differential motion vector are generated by the information generation section 146. Instead of differential motion vector information, motion vector information showing a motion vector calculated by the motion vector calculation section 142 may be generated for a prediction unit for which a motion vector is not predicted. Information generated in this manner can be encoded by the lossless encoding section 16 as information about an inter prediction. The predictor information is temporarily stored in the predictor information buffer 147 for a process in the upper layer.

(2) Enhancement Layer

In a motion estimation process of an enhancement layer, the prediction of a motion vector based on predictor information of the lower layer stored in the predictor information buffer 147 is made.

First, the estimation control section 141 causes the motion vector calculation section 142 to calculate a motion vector for each prediction unit arranged in the coding unit. Then, the estimation control section 141 causes the motion vector prediction section 143 to generate a predicted motion vector for each prediction unit. A predicted motion vector in an enhancement layer is generated by the motion vector prediction section 143 using predictor information as setting information stored in the predictor information buffer 147. More specifically, for example, when predictor information of the prediction unit in the lower layer corresponding to a certain prediction unit in the upper layer shows a spatial predictor as shown in Formula (1), the motion vector prediction section 143 acquires reference motion vectors of neighboring prediction units in the upper layer from the motion vector buffer 144. Then, the motion vector prediction section 143 substitutes the acquired reference motion vectors into Formula (1) to generate a predicted motion vector. When, for example, predictor information of the prediction unit in the lower layer corresponding to a certain prediction unit in the upper layer indicates a temporal predictor as shown in Formula (5), the motion vector prediction section 143 acquires reference motion vectors of a collocated block in a reference image and neighboring blocks of the collocated block from the motion vector buffer 144. Then, the motion vector prediction section 143 substitutes the acquired reference motion vectors into Formula (5) to generate a predicted motion vector. Further, the motion vector prediction section 143 calculates a differential motion vector representing a difference between the motion vector calculated by the motion vector calculation section 142 and the predicted motion vector. The mode selection section 145 generates predicted image data using the motion vector calculated by the motion vector calculation section 142 and calculates a cost function value. The information generation section 146 generates differential motion vector information showing the differential motion vector calculated for each prediction unit. Then, the information generation section 146 outputs the information about the inter prediction including the differential motion vector information, cost function value, and predicted image data to the selector 27.

(3) Flow of the Process

Figure 7:
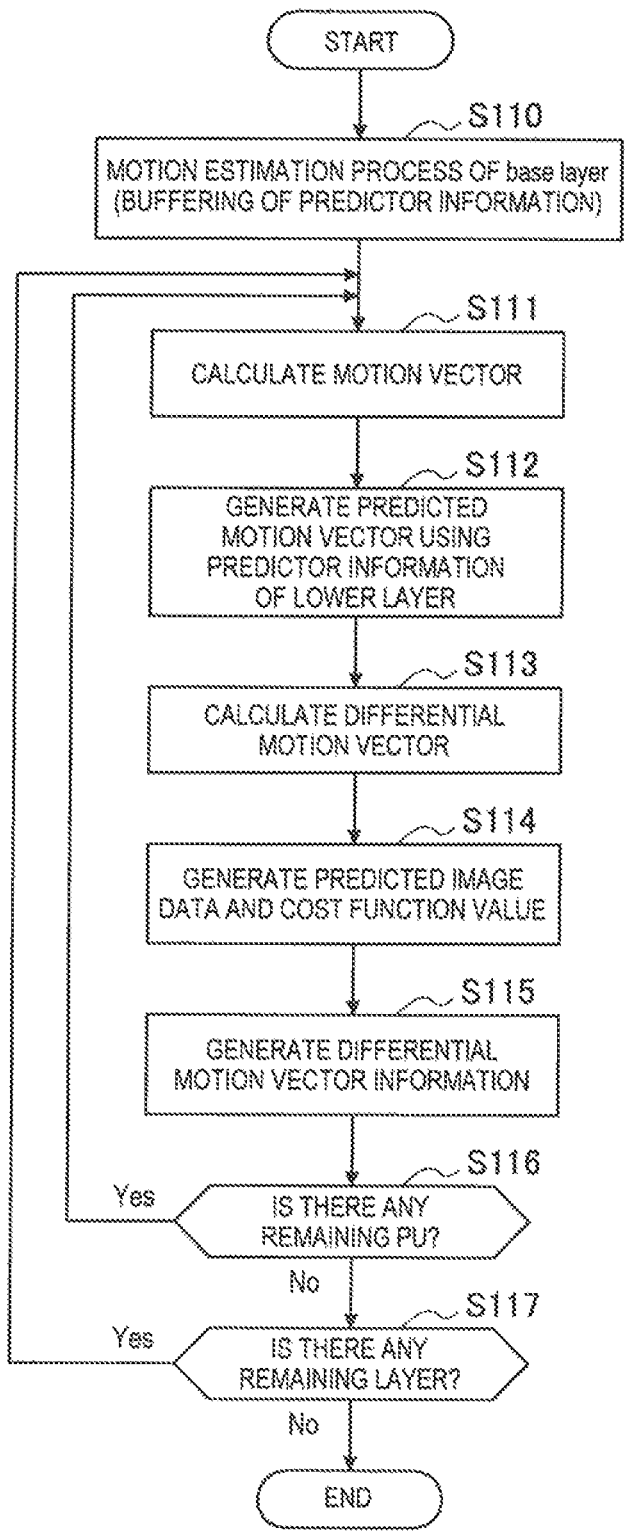
FIG. 7 is a flow chart showing an example of a flow of a motion estimation process by a motion estimation section according to the first example.

FIG. 7 is a flow chart showing an example of the flow of the motion estimation process by the motion estimation section 40 according to the present example. Referring to FIG. 7, the motion estimation section 40 first performs a motion estimation process of the base layer (step S110). As a result, the arrangement of prediction units in each coding unit is decided and the optimum predictor for each prediction unit is selected. The predictor information buffer 147 buffers predictor information showing the optimum predictor for each prediction unit as setting information.

Processes in steps S111 to S117 are the motion estimation process of enhancement layers. Of these processes, processes of steps S111 to S116 are repeated for each prediction unit (hereinafter, called an attention PU) of each enhancement layer. In the description that follows, the "upper layer" is the layer to be predicted and the "lower layer" is a layer lower than the layer to be predicted.

First, the motion vector calculation section 142 calculates a motion vector of one attention PU of the upper layer based on pixel values of an original image and pixel values of a reference image input from the frame memory 25 (step S111). Then, the motion vector calculation section 142 outputs the calculated motion vector to the motion vector prediction section 143 and the motion vector buffer 144.

Next, the motion vector prediction section 143 generates a predicted motion vector for the attention PU using predictor information of the corresponding PU in the lower layer stored in the predictor information buffer 147 and a reference motion vector acquired according to the predictor information (step S112). Next, the motion vector prediction section 143 calculates a differential motion vector by subtracting the predicted motion vector from the motion vector (step S113). Then, the motion vector prediction section 143 outputs the motion vector and the differential motion vector of the attention PU to the mode selection section 145.

Next, the mode selection section 145 generates predicted image data and the cost function value of the attention PU (step S114). The information generation section 146 generates differential motion vector information showing the differential motion vector concerning the attention PU (step S115).

Then, if any PU that is not yet processed remains in the layer to be predicted, the process returns to step S111 (step S116). On the other hand, if no PU that is not yet processed remains, whether any remaining layer (any higher layer) is present is further determined (step S117). If a remaining layer is present, the layer that has been predicted is set as the lower layer and the next layer is set as the upper layer before the processes in step S111 and thereafter are repeated. Predictor information showing predictors selected for the lower layer continues to be buffered by the predictor information buffer 147. If no remaining layer is present, the motion estimation process in FIG. 7 ends. The predicted image data and information about the inter prediction (that may contain differential motion vector information) generated here are output to each of the subtraction section 13 and the lossless encoding section 16 via the selector 27.

Thus, in the first example, predictor information as information about an inter prediction of the upper layer is not encoded and predictor information of the lower layer is reused and therefore, the amount of code of information about the inter prediction can be reduced.

2-2. Second Example

Figure 8:
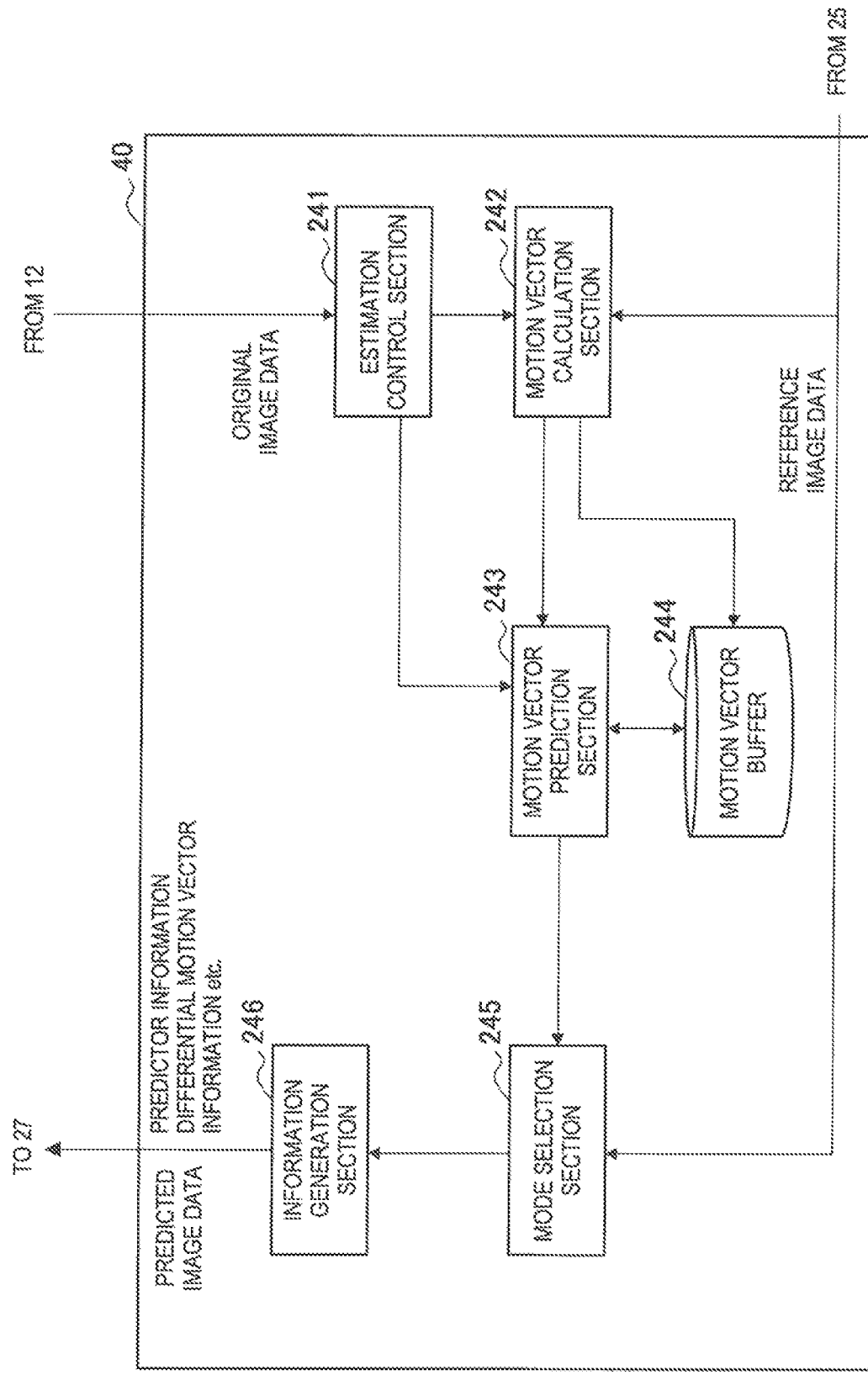
FIG. 8 is a block diagram showing an example of a detailed configuration of the motion estimation section according to a second example.

FIG. 8 is a block diagram showing an example of a detailed configuration of the motion estimation section 40 according to the second example. Referring to FIG. 8, the motion estimation section 40 includes an estimation control section 241, a motion vector calculation section 242, a motion vector prediction section 243, a motion vector buffer 244, a mode selection section 245, and an information generation section 246.

(1) Base Layer

The motion estimation process of the base layer according to the present example may be the same as the motion estimation process of the base layer according to the first example. In the present example, however, predictor information of the base layer may not be buffered and motion vector information of the base layer is buffered extending over layers. In the motion estimation process of the base layer, the estimation control section 241 arranges at least one prediction unit in a coding unit and causes the motion vector calculation section 242 to calculate a motion vector for each prediction unit. The motion vector calculated by the motion vector calculation section 242 is output to the motion vector prediction section 243 and also stored in the motion vector buffer 244. The motion vector prediction section 243 generates a predicted motion vector using reference motion vectors stored in the motion vector buffer 244 according to each of a plurality of predictor candidates. Then, the motion vector prediction section 243 calculates a differential motion vector as a difference between the motion vector calculated by the motion vector calculation section 242 and the predicted motion vector. The mode selection section 245 generates predicted image data using the motion vector calculated by the motion vector calculation section 242 and evaluates the cost function value calculated based on comparison of the generated predicted image data and original image data. Then, the mode selection section 245 selects the optimum arrangement of prediction units that minimizes the cost function value and the optimum predictor for each prediction unit. The information generation section 246 generates predictor information showing the optimum predictor for each prediction unit and information about the inter prediction including differential motion vector information showing the differential motion vector. Then, the information generation section 246 outputs the information about the inter prediction, cost function value, and predicted image data that have been generated to the selector 27.

(2) Enhancement Layer

A predictor candidate estimated in the motion estimation process of the base layer according to the present example may contain one or both of the aforementioned spatial predictor and temporal predictor. Further, additional predictor candidates are introduced in the motion estimation process of enhancement layers according to the present example. Predictor candidates introduced here are predictor candidates using a motion vector set to the corresponding prediction unit of the lower layer as a reference motion vector. Such a predictor is herein called an inter-layer predictor.

Figure 9:
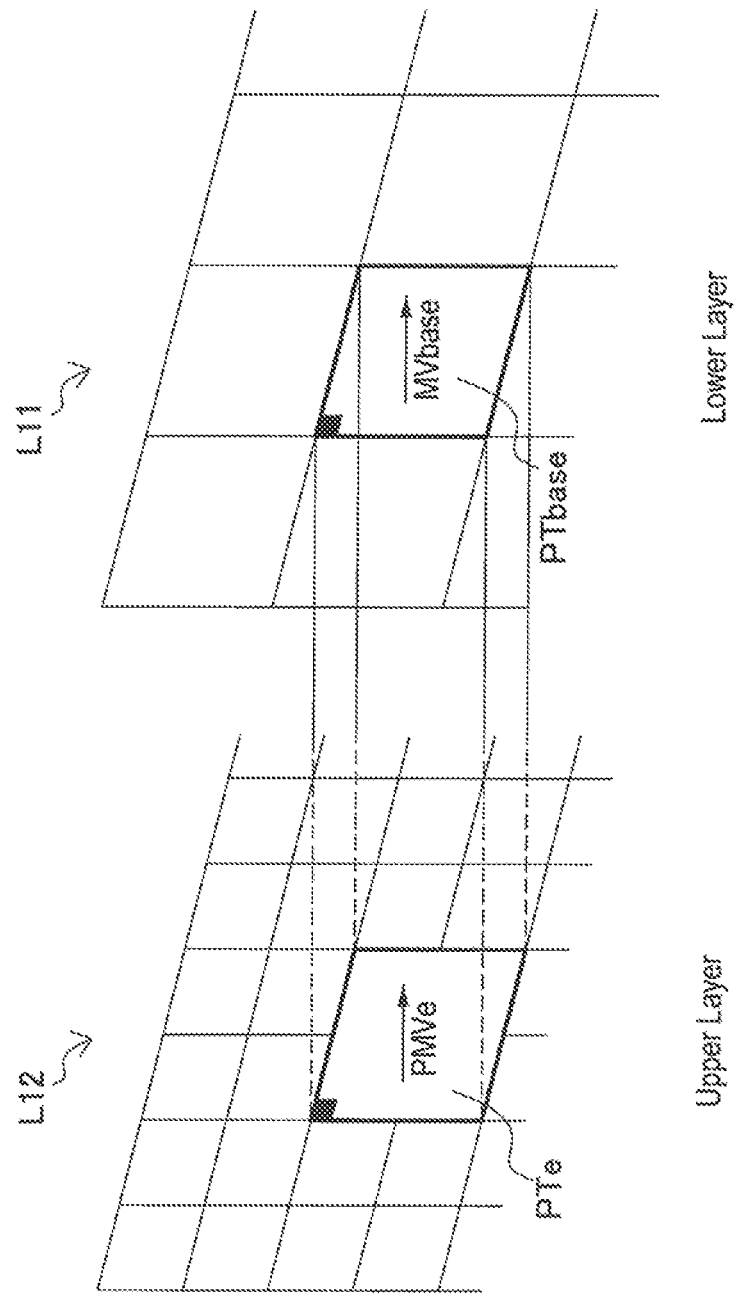
FIG. 9 is an explanatory view illustrating an example of an inter-layer predictor.

FIG. 9 is an explanatory view illustrating an example of the inter-layer predictor. Referring to FIG. 9, a prediction unit PTe in a layer L12 as an upper layer and a predicted motion vector PMVe of the prediction unit PTe are shown. A prediction unit PTbase in a layer L11 as a lower layer is a prediction unit corresponding to the prediction unit PTe. A reference motion vector MVbase is a motion vector set to the prediction unit PTbase. An inter-layer predictor can be represented by, for example, the following Formula (8).

[Math. 5]

$$PMVe = MVbase \quad (8)$$

When the spatial resolution of the lower layer and that of the upper layer are different, a motion vector enlarged as shown in the following formula in accordance with a ratio N of the spatial resolution between the lower layer and the upper layer may be used as an inter-layer predictor. In this case, values of the vertical component and horizontal component of the inter-layer predictor are rounded off to conform to the accuracy (for example, ¼ pixel precision and the like) of a motion vector of the upper layer.

[Math. 6]

$$PMVe = N \cdot MVbase \quad (9)$$

In the present example, in contrast to the first example, the optimum predictor is selected from a plurality of predictor candidates also in the motion estimation process of enhancement layers.

First, the estimation control section 241 causes the motion vector calculation section 242 to calculate a motion vector for each prediction unit in the coding unit. The motion vector calculated by the motion vector calculation section 242 is output to the motion vector prediction section 243 and also stored in the motion vector buffer 244. In the motion vector buffer 244, motion vectors (reference motion vectors) calculated for each of the prediction units of the lower layer are also stored. The motion vector prediction section 243 generates a predicted motion vector using reference motion vectors stored in the motion vector buffer 244 according to each of a plurality of predictor candidates. The plurality of predictor candidates here contains the aforementioned inter-layer predictor. Then, the motion vector prediction section 243 calculates a differential motion vector as a difference between the motion vector calculated by the motion vector calculation section 242 and the predicted motion vector. The mode selection section 245 generates predicted image data using the motion vector calculated by the motion vector calculation section 242 and evaluates the cost function value calculated based on comparison of the generated predicted image data and original image data. Then, the mode selection section 245 selects the optimum predictor for each prediction unit. The information generation section 246 generates predictor information showing the optimum predictor for each prediction unit and information about the inter prediction including differential motion vector information showing the differential motion vector. When the aforementioned inter-layer predictor is selected as the optimum predictor, the predictor information may contain an index that identifies the reference motion vector of the lower layer. Then, the information generation section 246 outputs the information about the inter prediction, cost function value, and predicted image data that have been generated to the selector 27.

(3) Flow of the Process

Figure 10:
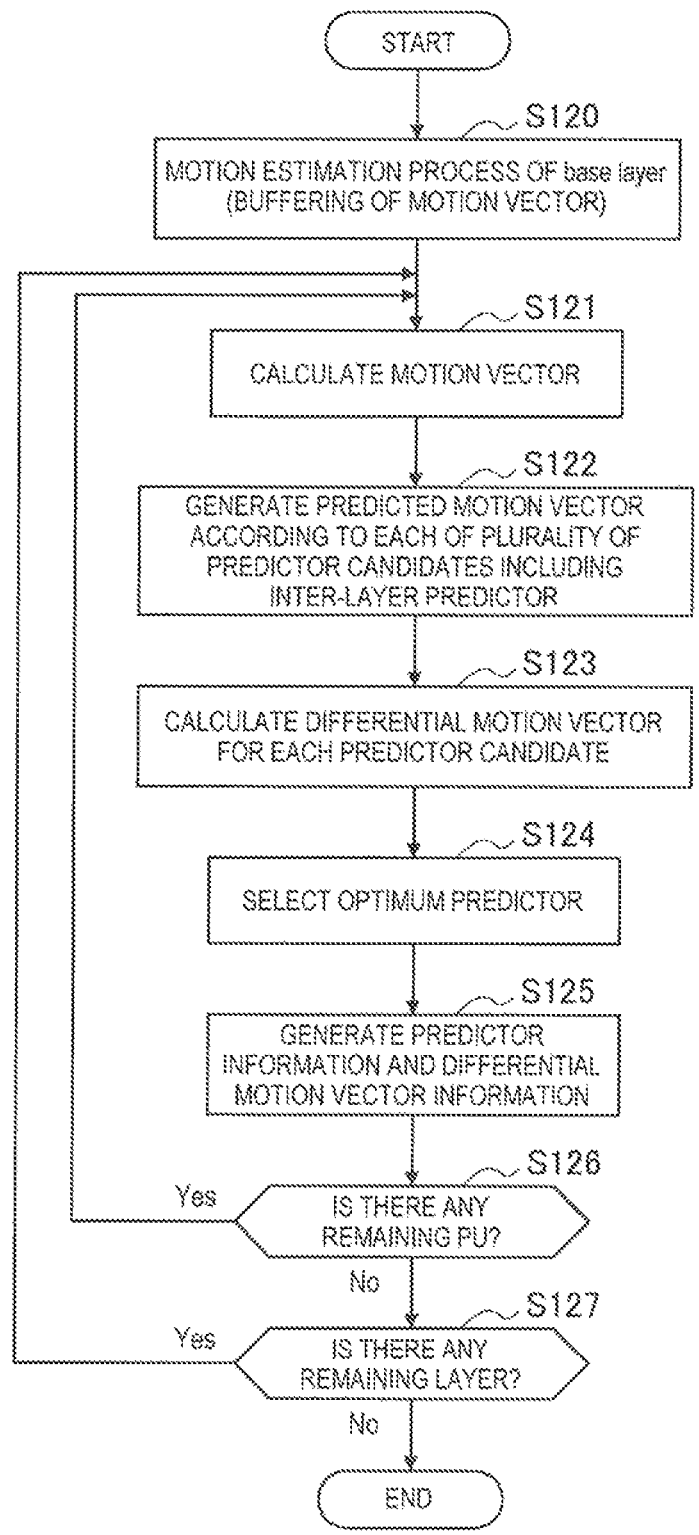
FIG. 10 is a flow chart showing an example of a flow of a motion estimation process by a motion estimation section according to the second example.

FIG. 10 is a flow chart showing an example of the flow of the motion estimation process by the motion estimation section 40 according to the present example. Referring to FIG. 10, the motion estimation section 40 first performs a motion estimation process of the base layer (step S120). As a result, the arrangement of prediction units in each coding unit is decided and the optimum predictor for each prediction unit is selected. The motion vector buffer 244 buffers the motion vector calculated for each prediction unit.

Processes in steps S121 to S127 are the motion estimation process of enhancement layers. Of these processes, processes of steps S121 to S126 are repeated for each attention PU of each enhancement layer. In the description that follows, the "upper layer" is the layer to be predicted and the "lower layer" is a layer lower than the layer to be predicted.

First, the motion vector calculation section 242 calculates a motion vector of one attention PU of the upper layer based on pixel values of an original image and pixel values of a reference image input from the frame memory 25 (step S121). Then, the motion vector calculation section 242 outputs the calculated motion vector to the motion vector prediction section 243 and the motion vector buffer 244.

Next, the motion vector prediction section 243 generates a predicted motion vector for the attention PU using reference motion vectors stored in the motion vector buffer 244 according to each of a plurality of predictor candidates (step S122). The plurality of predictor candidates here contains an inter-layer predictor. Next, the motion vector prediction section 243 calculates a differential motion vector for each of a plurality of predictor candidates (step S123). Then, the motion vector prediction section 243 outputs the motion vector and the differential motion vector of each predictor candidate to the mode selection section 245.

Next, the mode selection section 245 generates predicted image data for each predictor candidate and evaluates the cost function value to select the optimum predictor (step S124). Then, the information generation section 246 generates predictor information showing the selected optimum predictor and differential motion vector information showing the corresponding differential motion vector (step S125).

Then, if any PU that is not yet processed remains in the layer to be predicted, the process returns to step S121 (step S126). On the other hand, if no PU that is not yet processed remains, whether any remaining layer (any higher layer) is present is further determined (step S127) and, if a remaining layer is present, the processes in step S121 and thereafter are repeated after setting the layer that has been predicted as the lower layer and the next layer as the upper layer. The motion vector calculated for each attention PU of the lower layer is buffered by the motion vector buffer 244. If no remaining layer is present, the motion estimation process in FIG. 10 ends. The predicted image data and information about the inter prediction (that may contain predictor information and differential motion vector information) generated here are output to each of the subtraction section 13 and the lossless encoding section 16 via the selector 27.

In the second example, as described above, predictor information showing that an inter-layer predictor based on a motion vector set to the lower layer should be used as information about an inter prediction of the upper layer can be encoded. Thus, a motion vector prediction based on the corresponding prediction unit of a lower layer having a clear correlation of motion becomes possible. Therefore, increased accuracy of predicting a motion vector results and the amount of code of a differential motion vector can be reduced.

Incidentally, the lossless encoding section 16 that encodes predictor information may allocate the smallest code number to an inter-layer predictor among a plurality of predictor candidates when encoding predictor information of the upper layer. Normally, a correlation of motion between layers is stronger than a spatial correlation or temporal correlation of motion. Thus, by allocating the smallest code number to the inter-layer predictor, shorter code words can be used more frequently in an encoded stream after variable-length encoding so that the amount of code is further reduced.

2-3. Third Example

FIG. 11 is a block diagram showing an example of a detailed configuration of the motion estimation section 40 according to the third example. Referring to FIG. 11, the motion estimation section 40 includes an estimation control section 341, a motion vector calculation section 342, a motion vector buffer 344, a mode selection section 345, an information generation section 346, and a merge information buffer 347.

(1) Base Layer

In a motion estimation process of the base layer, the estimation control section 341 arranges at least one prediction unit in a coding unit and causes the motion vector calculation section 342 to calculate a motion vector for each prediction unit. The motion vector calculated by the motion vector calculation section 342 is output to the mode selection section 345 and also stored in the motion vector buffer 344. If a motion sector calculated by the motion vector calculation section 342 for a certain prediction unit is common to a reference motion vector set to at least one neighboring prediction unit, the mode selection section 345 decides to merge these prediction units. According to the technique proposed in Non-Patent Literature 3 described above, a certain prediction unit can be merged with the upper neighboring prediction unit or the left neighboring prediction unit. That is, the mode selection section 345 can select, for example, one of a merge with the upper neighboring prediction unit, a merge with the left neighboring prediction unit, and no merge as the merge mode. Further, the mode selection section 345 generates predicted image data for each prediction unit and calculates a cost function value based on comparison of the generated predicted image data and original image data. The information generation section 346 generates merge information indicating the merge mode for each prediction unit and information about an inter prediction containing motion vector information of a prediction unit that is not merged with other prediction units. Then, the information generation section 346 outputs the information about the inter prediction, cost function value, and predicted image data that have been generated to the selector 27.

Merge information generated in the present example may contain "MergeFlag" and "MergeLeftFlag". MergeFlag is a flag indicating whether the motion vector of the attention PU is common to the motion vector of at least one neighboring PU. When, for example, MergeFlag=1, the motion vector of the attention PU is common to the motion vector of at least one neighboring PU. When MergeFlag=0, the motion vector of the attention PU is different from the motion vector of any neighboring PU. When MergeFlag=0, MergeLeftFlag is not encoded and instead, the motion vector (and motion information of reference image information and the like) of the attention PU is encoded. When MergeFlag=1 and two neighboring PUs have a common motion vector, MergeLeftFlag may not be encoded.

MergeLeftFlag is a flag indicating whether the motion vector of the attention PU is common to the motion vector of the left neighboring PU. When, for example, MergeLeftFlag=1, the motion vector of the attention PU is common to the motion vector of the left neighboring PU. When MergeLeftFlag=0, the motion vector of the attention PU is different from the motion vector of the left neighboring PU and common to the motion vector of the upper neighboring PU.

Figure 12A:
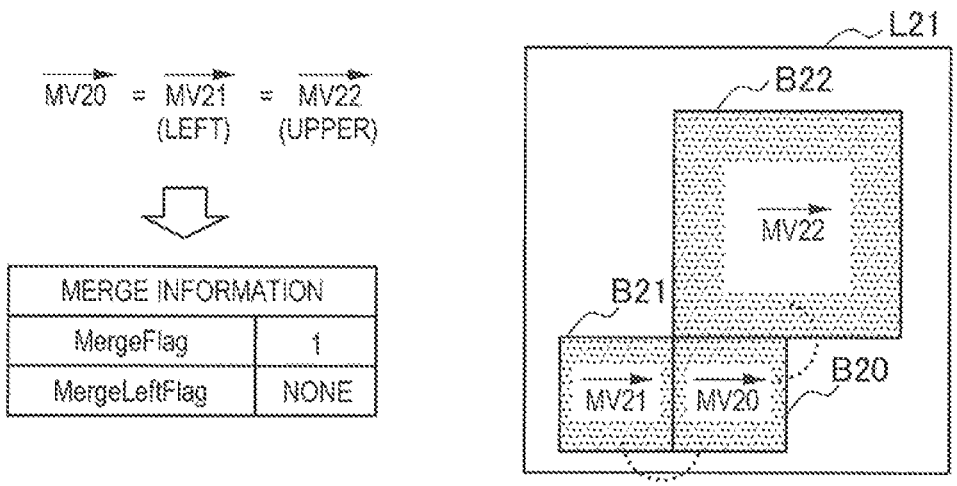
FIG. 12A is an explanatory view showing a first example of merge information.
Figure 12B:
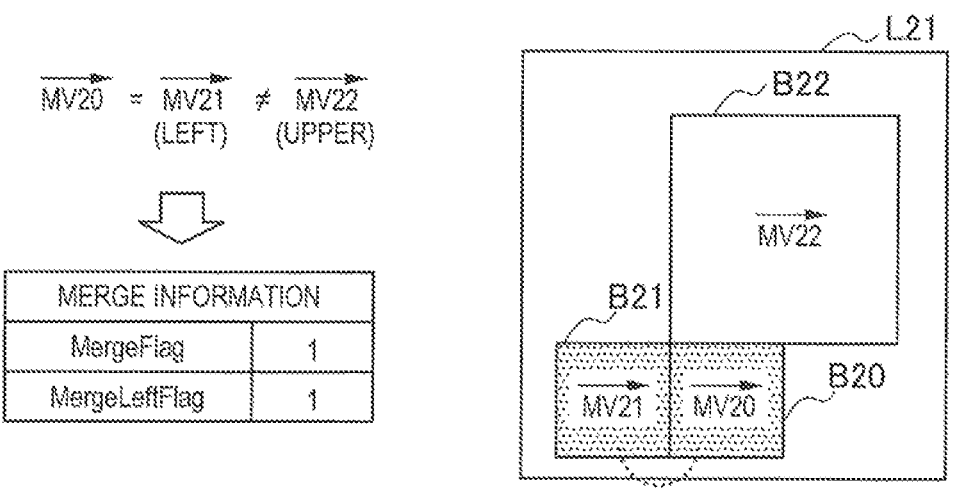
FIG. 12B is an explanatory view showing a second example of merge information.
Figure 12C:
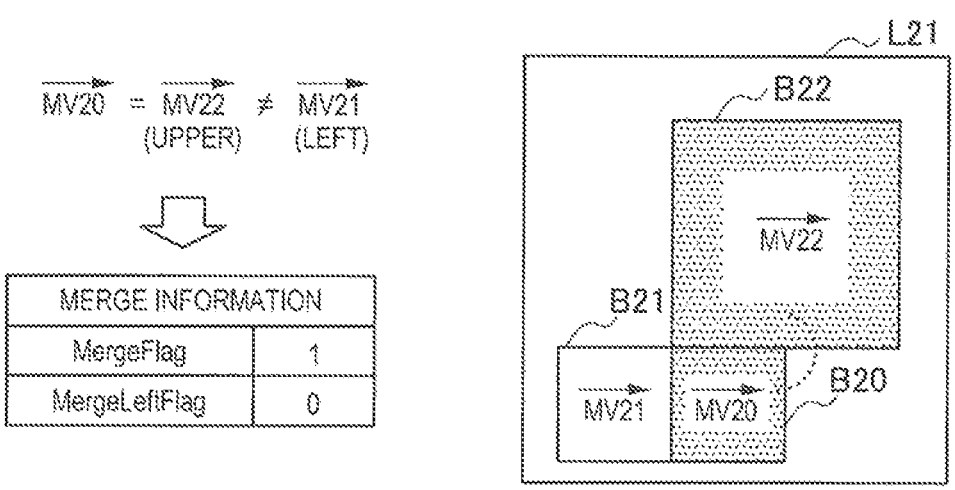
FIG. 12C is an explanatory view showing a third example of merge information.

FIGS. 12A to 12C each show examples of merge information generated in the present example. In these three figures, a prediction unit B20 as an attention PU in a layer L21 is shown. Prediction units B21, B22 are adjacent to the prediction unit B20 as a left prediction unit and an upper prediction unit respectively. A motion vector MV20 is a motion vector calculated by the motion vector calculation section 342 for the prediction unit B20. Motion vectors MV21, MV22 are reference motion vectors set to the prediction units B21, B22 respectively.

In the example of FIG. 12A, the motion vector MV20 is common to both of the reference motion vectors MV21, MV22. In this case, the information generation section 346 generates MergeFlag=1 as merge information. MergeLeftFlag is not included in the merge information. The decoding side having received such merge information can set a motion vector common to the motion vector set to the prediction unit B21 or B22 to the prediction unit B20 without MergeLeftFlag being decoded.

In the example of FIG. 12B, the motion vector MV20 is common to the reference motion vector MV21 and different from the reference motion vector MV22. In this case, the information generation section 346 generates MergeFlag=1 and MergeLeftFlag=1 as merge information. The decoding side having received such merge information can set a motion vector common to the motion vector set to the prediction unit B21 to the prediction unit B20.

In the example of FIG. 12C, the motion vector MV20 is common to the reference motion vector MV22 and different from the reference motion vector MV21. In this case, the information generation section 346 generates MergeFlag=1 and MergeLeftFlag=0 as merge information. The decoding side having received such merge information can set a motion vector common to the motion vector set to the prediction unit B22 to the prediction unit B20.

(2) Enhancement Layer

In the motion estimation process of an enhancement layer, a motion vector is set to each prediction unit using merge information of the lower layer stored in the merge information buffer 347.

First, the estimation control section 341 acquires merge information of the prediction unit in the lower layer corresponding to each prediction unit in a coding unit of the lower layer from the merge information buffer 347. Then, if the acquired merge information indicates no merge (for example, MergeFlag=0), the estimation control section 341 causes the motion vector calculation section 342 to calculate a motion vector for the relevant prediction unit of the upper layer. The motion vector calculated by the motion vector calculation section 342 is output to the mode selection section 345 and also stored in the motion vector buffer 344. On the other hand, if the acquired merge information indicates a merge with another prediction unit, the estimation control section 341 does not cause the motion vector calculation section 342 to calculate a motion vector for the relevant prediction unit of the upper layer. Instead, the mode selection section 345 generates predicted image data using a motion vector (for example, if MergeLeftFlag=1, a motion vector of a prediction unit adjacent on the left side) (of the prediction unit to be merged with) acquired from the motion vector buffer 344 for the prediction unit to be merged with another prediction unit and calculates a cost function value. On the other hand, for prediction units not to be merged with another prediction unit, the mode selection section 345 generates predicted image data using a motion vector input from the motion vector calculation section 342 and calculates a cost function value. The information generation section 346 generates information about an inter prediction including motion vector information for prediction units not to be merged with another prediction unit. Then, the information generation section 346 outputs the information about the inter prediction, cost function value, and predicted image data that have been generated to the selector 27.

(3) Flow of the Process

FIG. 13 is a flow chart showing an example of the flow of the motion estimation process by the motion estimation section 40 according to the present example. Referring to FIG. 13, the motion estimation section 40 first performs a motion estimation process of the base layer (step S130). As a result, the arrangement of prediction units in each coding unit is decided and the merge mode for each prediction unit is selected. The motion vector buffer 344 buffers the motion vector calculated for each prediction unit. The merge information buffer 347 buffers merge information showing the merge mode selected for each prediction unit as setting information.

Processes in steps S131 to S136 are the motion estimation process of enhancement layers. Of these processes, processes of steps S131 to S135 are repeated for each attention PU of each enhancement layer. In the description that follows, the "upper layer" is the layer to be predicted and the "lower layer" is a layer lower than the layer to be predicted.

First, the estimation control section 341 determines whether regarding one attention PU of the upper layer, the corresponding PU of the lower layer is merged with another PU by referring to merge information stored in the merge information buffer 347 (step S131). If the corresponding PU of the lower layer is merged with another PU, the attention PU is also merged with another PU and thus, the subsequent process in step S132 is skipped.

In step S132, the motion vector calculation section 342 calculates a motion vector of the attention PU that is not merged with another PU based on pixel values of an original image and pixel values of a reference image input from the frame memory 25 (step S132). Then, the motion vector calculation section 342 outputs the calculated motion vector to the mode selection section 345 and the motion vector buffer 344.

Next, the mode selection section 345 generates predicted image data using the motion vector calculated by the motion vector calculation section 342 or acquired from the motion vector buffer 344 and calculates a cost function value (step S133). Then, the information generation section 346 generates motion vector information of the attention PU that is not merged with another PU (step S134).

Then, if any PU that is not yet processed remains in the layer to be predicted, the process returns to step S131 (step S135). On the other hand, if no PU that is not yet processed remains, whether any remaining layer (any higher layer) is present is further determined (step S136) and, if a remaining layer is present, the processes in step S131 and thereafter are repeated after setting the layer that has been predicted as the lower layer and the next layer as the upper layer. The motion vector calculated for each attention PU of the lower layer is buffered by the motion vector buffer 344. Merge information continues to be buffered by the merge information buffer 347. If no remaining layer is present, the motion estimation process in FIG. 13 ends. The predicted image data and information about the inter prediction generated here are output to each of the subtraction section 13 and the lossless encoding section 16 via the selector 27.

Thus, in the third example, merge information as information about an inter prediction of the upper layer is not encoded and merge information of the lower layer is reused and therefore, the amount of code of information about the inter prediction can be reduced.

2-4. Fourth Example

FIG. 14 is a block diagram showing an example of a detailed configuration of the motion estimation section 40 according to the fourth example. Referring to FIG. 14, the motion estimation section 40 includes an estimation control section 441, a motion vector calculation section 442, a motion vector buffer 444, a mode selection section 445, and an information generation section 446.

(1) Base Layer

The motion estimation process of the base layer according to the present example may be the same as the motion estimation process of the base layer according to the third example. In the present example, however, merge information of the base layer may not be buffered. In a motion estimation process of the base layer, the estimation control section 441 arranges at least one prediction unit in a coding unit and causes the motion vector calculation section 442 to calculate a motion vector for each prediction unit. The motion vector calculated by the motion vector calculation section 442 is output to the mode selection section 445 and also stored in the motion vector buffer 444. If a motion sector calculated by the motion vector calculation section 442 for a certain prediction unit is common to a reference motion vector set to at least one neighboring prediction unit, the mode selection section 445 decides to merge these prediction units. The mode selection section 445 generates predicted image data for each prediction unit and calculates a cost function value based on comparison of the generated predicted image data and original image data. The information generation section 346 generates merge information indicating the merge mode for each prediction unit and information about an inter prediction containing motion vector information of a prediction unit that is not merged with other prediction units. Then, the information generation section 346 outputs the information about the inter prediction, cost function value, and predicted image data that have been generated to the selector 27.

(2) Enhancement Layer

Merge information generated in the motion estimation process of the base layer according to the present example may contain two flags of "MergeFlag" and "MergeLeftFlag" like in the third example. In contrast, merge information generated in the motion estimation process of the enhancement layers may additionally contain a new flag "MergeBaseFlag". MergeBaseFlag is a flag indicating whether the motion vector of the attention PU is common to the motion vector of the corresponding PU of the lower layer. When, for example, MergeBaseFlag=1, the motion vector of the attention PU is common to the motion vector of the corresponding PU of the lower layer.

FIGS. 15A to 15C each show examples of merge information generated in the present example. In these three figures, a prediction unit B30 as an attention PU in a layer L30 is shown. Prediction units B31, B32 are adjacent to the prediction unit B30 as a left prediction unit and an upper prediction unit respectively. A motion vector MV30 is a motion vector calculated by the motion vector calculation section 442 for the prediction unit B30. Motion vectors MV31, MV32 are reference motion vectors set to the prediction units B31, B32 respectively. The prediction unit B20 as a PU corresponding to the attention PU in the lower layer L21 is also shown. The motion vector MV20 is a reference motion vector buffered in the prediction unit B20.

In the example of FIG. 15A, the motion vector MV30 is common to all of the reference motion vectors MV31, MV32, MV20. In this case, the information generation section 446 generates MergeFlag=1 as merge information. MergeBaseFlag and MergeLeftFlag are not included in the merge information. The decoding side having received such merge information can set a motion vector common to the motion vector set to the prediction unit B20, B31, or B32 to the prediction unit B30 without MergeBaseFlag and MergeLeftFlag being decoded.

In the example of FIG. 15B, the motion vector MV30 is common to the reference motion vector MV20 and different from the reference motion vectors MV31, MV32. In this case, the information generation section 446 generates MergeFlag=1 and MergeBaseFlag=1 as merge information. The decoding side having received such merge information can set a motion vector common to the motion vector set to the prediction unit B20 in the lower layer L21 to the prediction unit B30 in the upper layer L30.

In the example of FIG. 15C, the motion vector MV30 is common to the reference motion vector MV31 and different from the reference motion vectors MV20, MV32. In this case, the information generation section 446 generates MergeFlag=1, MergeBaseFlag=0, and MergeLeftFlag=1 as merge information. The decoding side having received such merge information can set a motion vector common to the motion vector set to the prediction unit B31 to the prediction unit B30.

In a motion estimation process of the enhancement layer, the estimation control section 441 causes the motion vector calculation section 442 to calculate a motion vector for each prediction unit in a coding unit. The motion vector calculated by the motion vector calculation section 442 is output to the mode selection section 445 and also stored in the motion vector buffer 444. In the motion vector buffer 444, motion vectors (reference motion vectors) calculated for each of the prediction units of the lower layer are also stored. If a motion sector calculated by the motion vector calculation section 442 for a certain prediction unit is common to a reference motion vector set to the neighboring prediction unit or the corresponding prediction unit in the lower layer, the mode selection section 445 decides to merge these prediction units. That is, the mode selection section 445 can select, for example, one of a merge with the lower layer, a merge with the upper neighboring prediction unit, a merge with the left neighboring prediction unit, and no merge as the merge mode. Further, the mode selection section 445 generates predicted image data for each prediction unit and calculates a cost function value based on comparison of the generated predicted image data and original image data. The information generation section 346 generates merge information indicating the merge mode for each prediction unit and information about an inter prediction containing motion vector information of a prediction unit that is not merged with other prediction units. Then, the information generation section 346 outputs the information about the inter prediction, cost function value, and predicted image data that have been generated to the selector 27.

(3) Flow of the Process

Figure 16:
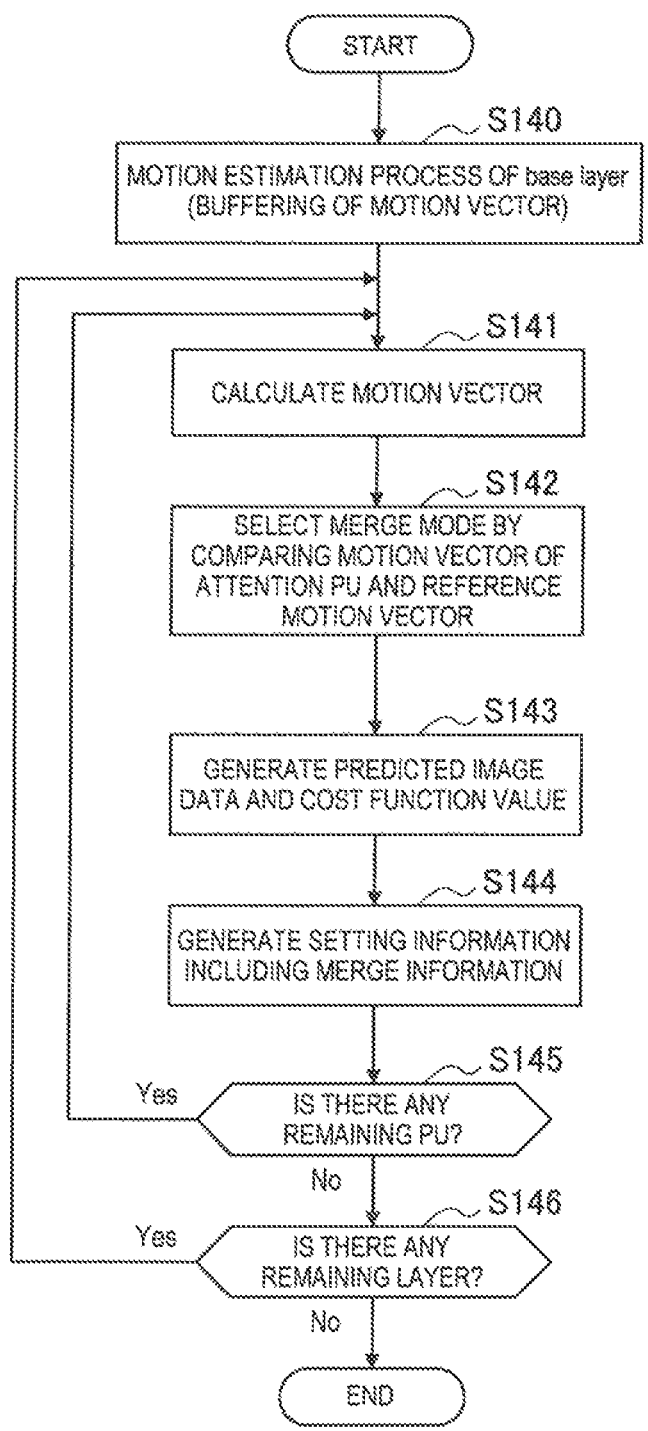
FIG. 16 is a flow chart showing an example of a flow of a motion estimation process by a motion estimation section according to the fourth example.

FIG. 16 is a flow chart showing an example of the flow of the motion estimation process by the motion estimation section 40 according to the present example. Referring to FIG. 16, the motion estimation section 40 first performs a motion estimation process of the base layer (step S140). As a result, the arrangement of prediction units in each coding unit is decided and the merge mode for each prediction unit is selected. The motion vector buffer 444 buffers the motion vector calculated for each prediction unit.

Processes in steps S141 to S146 are the motion estimation process of enhancement layers. Of these processes, processes of steps S141 to S145 are repeated for each attention PU of each enhancement layer. In the description that follows, the "upper layer" is the layer to be predicted and the "lower layer" is a layer lower than the layer to be predicted.

First, the motion vector calculation section 442 calculates a motion vector of one attention PU of the upper layer based on pixel values of an original image and pixel values of a reference image input from the frame memory 25 (step S141). Then, the motion vector calculation section 442 outputs the calculated motion vector to the mode selection section 445 and the motion vector buffer 444.

Next, the mode selection section 445 selects the merge mode by comparing the motion vector calculated by the motion vector calculation section 442 with reference motion vectors stored in the motion vector buffer 444 (step S142). If, for example, the motion vector calculated for the attention PU is common to a reference motion vector buffered for the corresponding PU in the lower layer, a merge with the lower layer can be selected.

Next, the mode selection section 445 generates predicted image data using the motion vector for the attention PU and calculates a cost function value (step S144). Then, the information generation section 446 generates setting information including merge information (and motion vector information for attention PUs not merged with another PU) for the attention PU (step S144).

Then, if any PU that is not yet processed remains in the layer to be predicted, the process returns to step S141 (step S145). On the other hand, if no PU that is not yet processed remains, whether any remaining layer (any higher layer) is present is further determined (step S146) and, if a remaining layer is present, the processes in step S141 and thereafter are repeated after setting the layer that has been predicted as the lower layer and the next layer as the upper layer. The motion vector calculated for each attention PU of the lower layer is buffered by the motion vector buffer 444. If no remaining layer is present, the motion estimation process in FIG. 16 ends. The predicted image data and information about the inter prediction generated here are output to each of the subtraction section 13 and the lossless encoding section 16 via the selector 27.

Thus, in the fourth example, as information about an inter prediction of the upper layer, merge information indicating that the attention PU is merged with the corresponding PU in the lower layer (that a common motion vector is set) can be encoded. Therefore, a merge of the prediction unit with a lower layer having a clear correlation of motion becomes possible and the motion vector of the prediction unit to be merged in the upper layer is not encoded and so the amount of code can effectively be reduced.

3. Configuration Example of Image Decoding Device

Figure 17:
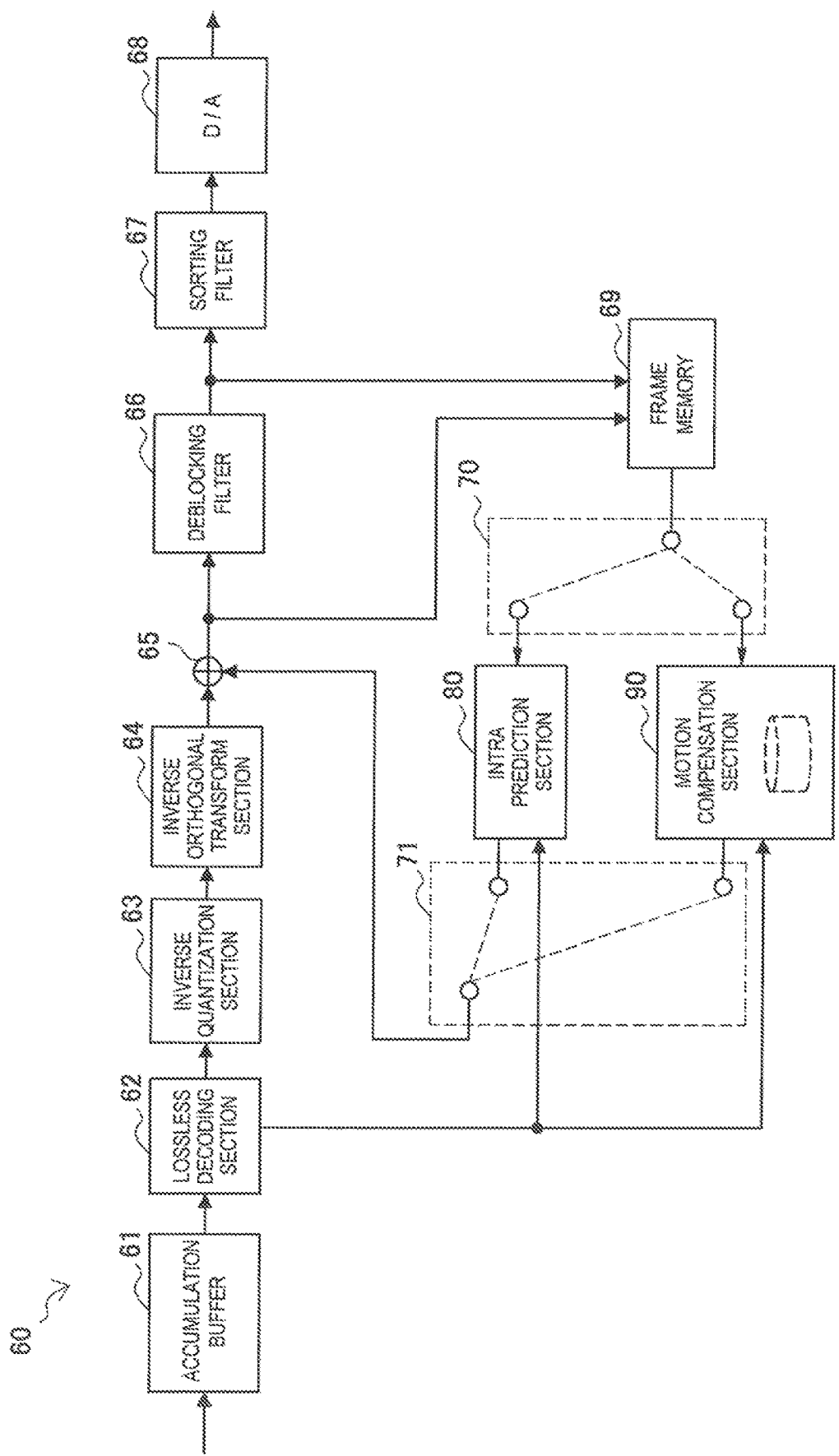
FIG. 17 is a block diagram showing an example of a configuration of an image decoding device according to an embodiment.

FIG. 17 is a block diagram showing an example of a configuration of an image decoding device 60 according to an embodiment. Referring to FIG. 17, the image decoding device 60 includes an accumulation buffer 61, a lossless decoding section 62, an inverse quantization section 63, an inverse orthogonal transform section 64, an addition section 65, a deblocking filter 66, a sorting buffer 67, a D/A (Digital to Analogue) conversion section 68, a frame memory 69, selectors 70 and 71, an intra prediction section 80 and a motion compensation section 90.

The accumulation buffer 61 temporarily stores an encoded stream input via a transmission line.

The lossless decoding section 62 decodes an encoded stream input from the accumulation buffer 61 according to the encoding method used at the time of encoding. Also, the lossless decoding section 62 decodes information multiplexed to the header region of the encoded stream. Information that is multiplexed to the header region of the encoded stream may include information about inter prediction and information about intra prediction described above, for example. The lossless decoding section 62 outputs the information about inter prediction to the motion compensation section 90. Also, the lossless decoding section 62 outputs the information about intra prediction to the intra prediction section 80.

The inverse quantization section 63 inversely quantizes quantized data which has been decoded by the lossless decoding section 62. The inverse orthogonal transform section 64 generates predicted error data by performing inverse orthogonal transformation on transform coefficient data input from the inverse quantization section 63 according to the orthogonal transformation method used at the time of encoding. Then, the inverse orthogonal transform section 64 outputs the generated predicted error data to the addition section 65.

The addition section 65 adds the predicted error data input from the inverse orthogonal transform section 64 and predicted image data input from the selector 71 to thereby generate decoded image data. Then, the addition section 65 outputs the generated decoded image data to the deblocking filter 66 and the frame memory 69.

The deblocking filter 66 removes block distortion by filtering the decoded image data input from the addition section 65, and outputs the decoded image data after filtering to the sorting buffer 67 and the frame memory 69.

The sorting buffer 67 generates a series of image data in a time sequence by sorting images input from the deblocking filter 66. Then, the sorting buffer 67 outputs the generated image data to the D/A conversion section 68.

The D/A conversion section 68 converts the image data in a digital format input from the sorting buffer 67 into an image signal in an analogue format. Then, the D/A conversion section 68 causes an image to be displayed by outputting the analogue image signal to a display (not shown) connected to the image decoding device 60, for example.

The frame memory 69 stores, using a storage medium, the decoded image data before filtering input from the addition section 65, and the decoded image data after filtering input from the deblocking filter 66.

The selector 70 switches the output destination of image data from the frame memory 69 between the intra prediction section 80 and the motion compensation section 90 for each block in an image in accordance with mode information acquired by the lossless decoding section 62. When, for example, the intra prediction mode is specified, the selector 70 outputs decoded image data before filtering supplied from the frame memory 69 to the intra prediction section 80 as reference image data. When the inter prediction mode is specified, the selector 70 outputs decoded image data after filtering supplied from the frame memory 69 to the motion compensation section 90 as reference image data.

The selector 71 switches the output source of predicted image data to be supplied to the addition section 65 between the intra prediction section 80 and the motion compensation section 90 in accordance with mode information acquired by the lossless decoding section 62. When, for example, the intra prediction mode is specified, the selector 71 supplies predicted image data output from the intra prediction section 80 to the addition section 65. When the inter prediction mode is specified, the selector 71 supplies predicted image data output from the motion compensation section 90 to the addition section 65.

The intra prediction section 80 performs an intra prediction process based on information about an intra prediction input from the lossless decoding section 62 and reference image data from the frame memory 69 to generate predicted image data. Then, the intra prediction section 80 outputs the generated predicted image data to the selector 71.

The motion compensation section 90 performs a motion compensation process based on information about an inter prediction input from the lossless decoding section 62 and reference image data from the frame memory 69 to generate predicted image data. The motion compensation process by the motion compensation section 90 according to the present embodiment is realized by extending the technique described in Non-Patent Literature 2 or the technique described in Non-Patent Literature 3. Then, the motion compensation section 90 outputs predicted image data generated as a result of the motion compensation process to the selector 71. In the next section, four examples of a detailed configuration of the motion compensation section 90 will be described.

The image decoding device 60 repeats a series of decoding processes described here for each of a plurality of layers of a scalable-video-coded image. The layer to be decoded first is the base layer. After the base layer is decoded, one or more enhancement layers are decoded. When an enhancement layer is decoded, information obtained by decoding the base layer or lower layers as other enhancement layers is used.

In scalable video decoding by the image decoding device 60, a motion vector is set to a certain prediction unit in the upper layer using setting information about the motion vector set to the corresponding prediction unit in the lower layer. The setting information may contain, for example, the aforementioned predictor information, merge information, or motion vector information.

4. Detailed Configuration Example of Motion Compensation Section

In this section, four examples of a detailed configuration of the motion compensation section 90 shown in FIG. 17 will be described. The four examples correspond to the respective four examples of the motion estimation section 40 of the aforementioned image encoding device 10. The first and second examples are examples concerning the extension of the technique described in Non-Patent Literature 2 described above. On the other hand, the third and fourth examples are examples concerning the extension of the technique described in Non-Patent Literature 3 described above.

4-1. First Example

Figure 18:
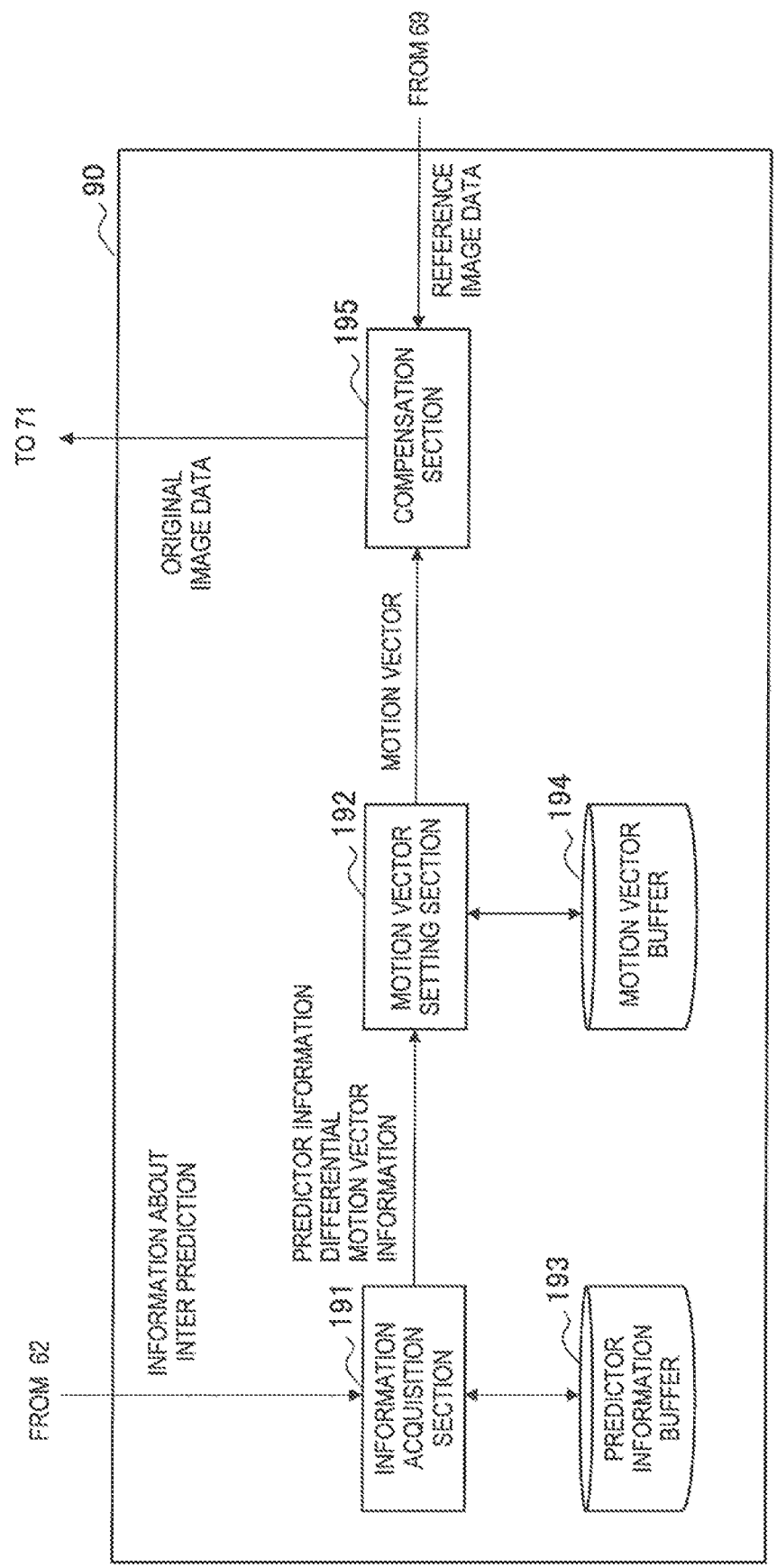
FIG. 18 is a block diagram showing an example of a detailed configuration of a motion compensation section according to a first example.

FIG. 18 is a block diagram showing an example of a detailed configuration of the motion compensation section 90 according to the first example. Referring to FIG. 18, the motion compensation section 90 includes an information acquisition section 191, a motion vector setting section 192, a predictor information buffer 193, a motion vector buffer 194, and a compensation section 195.

(1) Base Layer

In a motion compensation process of the base layer, the information acquisition section 191 acquires information about an inter prediction decoded by the lossless decoding section 62 from an encoded stream. In the present example, information about the inter prediction may contain predictor information and differential motion vector information (motion vector information for prediction units for which no motion vector is predicted). The predictor information acquired here shows, for example, among aforementioned various predictor candidates, a predictor selected for each prediction unit for encoding. The motion vector setting section 192 sets a motion vector to each prediction unit. Then, the motion vector set to each prediction unit by the motion vector setting section 192 is output to the compensation section 195 and also stored in the motion vector buffer 194. In addition, predictor information for each prediction unit is temporarily stored in the predictor information buffer 193 for a process in the upper layer. Settings of a motion vector by the motion vector setting section 192 can be made by using a predictor shown by predictor information for each prediction unit and a differential motion vector shown by differential motion vector information. For example, when predictor information for a certain prediction unit shows a spatial predictor as shown in Formula (1), the motion vector setting section 192 acquires reference motion vectors of prediction units adjacent to the prediction unit from the motion vector buffer 194. Then, the motion vector setting section 192 substitutes the acquired reference motion vectors into Formula (1) to generate a predicted motion vector. Further, the motion vector setting section 192 rebuilds a motion vector by adding a differential motion vector to the generated predicted motion vector. The motion vector rebuilt in this manner is set to each prediction unit. The compensation section 195 generates predicted image data of each prediction unit using the motion vector set to each prediction unit by the motion vector setting section 192 and reference image data input from the frame memory 69. Then, the compensation section 195 outputs the generated predicted image data to the addition section 65 via the selector 71.

(2) Enhancement Layer

In a motion compensation process of an enhancement layer, the prediction of a motion vector based on predictor information of the lower layer stored in the predictor information buffer 193 is made.

First, the information acquisition section 191 acquires information about an inter prediction decoded by the lossless decoding section 62 from an encoded stream. In the present example, information about the inter prediction of an enhancement layer may contain differential motion vector information (motion vector information for prediction units for which no motion vector is predicted). In addition, as setting information to set a motion vector to each prediction unit in the lower layer, the information acquisition section 191 acquires predictor information showing the predictor used to predict the motion vector of the corresponding prediction unit in the lower layer from the predictor information buffer 193. The predictor information acquired here shows, for example, one of the aforementioned spatial predictor and temporal predictor. The motion vector setting section 192 rebuilds a motion vector using the differential motion vector information and predictor information acquired by the information acquisition section 191 and sets the rebuilt motion vector to each prediction unit. The motion vector set to each prediction unit by the motion vector setting section 192 is output to the compensation section 195 and also stored in the motion vector buffer 194. The compensation section 195 generates predicted image data of each prediction unit using the motion vector set to each prediction unit by the motion vector setting section 192 and reference image data input from the frame memory 69. Then, the compensation section 195 outputs the generated predicted image data to the addition section 65 via the selector 71.

(3) Flow of the Process

Figure 19:
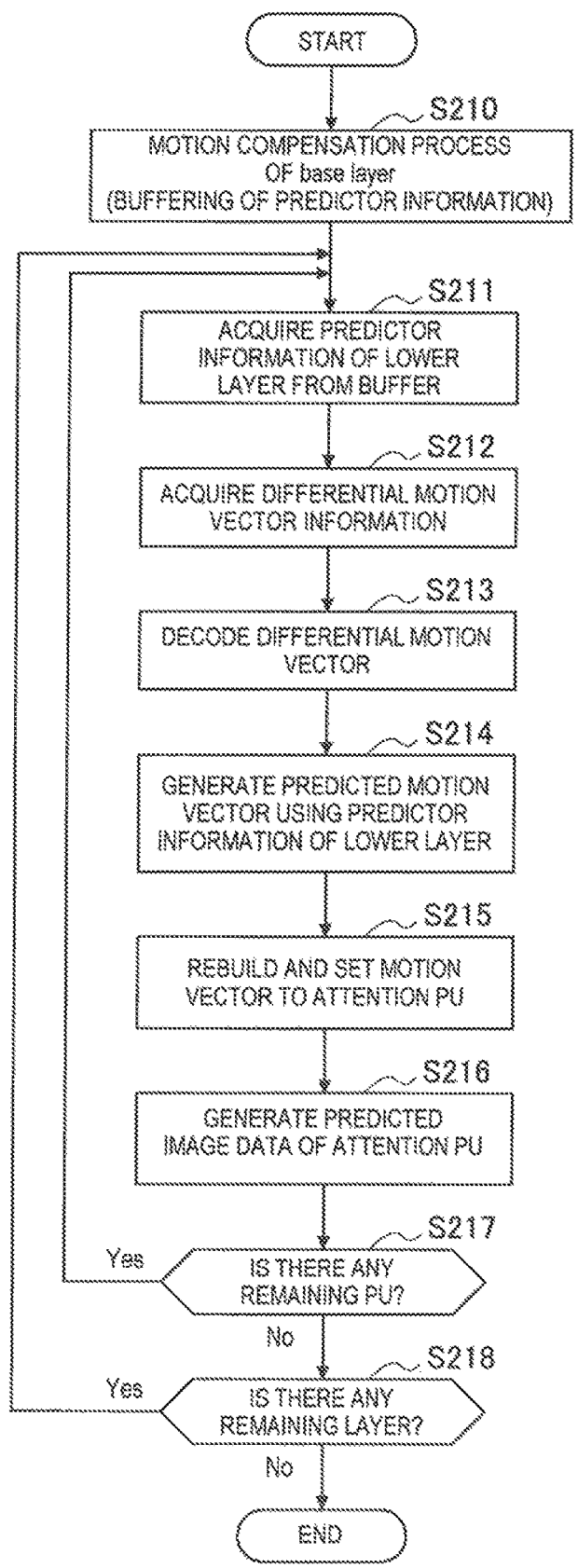
FIG. 19 is a flow chart showing an example of a flow of a motion compensation process by the motion compensation section according to the first example.

FIG. 19 is a flow chart showing an example of a flow of a motion compensation process by the motion compensation section 90 according to the present example. Referring to FIG. 19, the motion compensation section 90 first performs a motion compensation process of the base layer (step S210). At this point, the predictor information buffer 193 buffers predictor information showing the predictor selected for encoding of each prediction unit as setting information.

Processes in steps S211 to S218 are the motion compensation process of enhancement layers. Of these processes, processes of steps S211 to S217 are repeated for each attention PU of each enhancement layer. In the description that follows, the "upper layer" is the layer to be predicted and the "lower layer" is a layer lower than the layer to be predicted.

First, the information acquisition section 191 sets one PU of the upper layer as an attention PU and acquires predictor information of the PU in the lower layer corresponding to the attention PU from the predictor information buffer 193 (step S211). The information acquisition section 191 also acquires differential motion vector information concerning the attention PU (step S212). The motion vector setting section 192 decodes the differential motion vector information (step S213).

Next, the motion vector setting section 192 generates a predicted motion vector of the attention PU using the predictor information acquired by the information acquisition section 191 and reference motion vectors (step S214). Next, the motion vector setting section 192 rebuilds a motion vector by adding a differential motion vector to the generated predicted motion vector (step S215). The motion vector built in this manner is set to the attention PU. In addition, the rebuilt motion vector is temporarily stored in the motion vector buffer 194 for a process in the upper layer. For prediction units for which no prediction vector is predicted, instead of differential motion vector information, motion vector information may be acquired from an encoded stream to decode a motion vector from the motion vector information.

Next, the compensation section 195 generates predicted image data of the attention PU using the motion vector set to the attention PU by the motion vector setting section 192 and reference image data input from the frame memory 69 (step S216).

Then, if any PU that is not yet processed remains in the layer to be predicted, the process returns to step S211 (step S217). On the other hand, if no PU that is not yet processed remains, whether any remaining layer (any higher layer) is present is further determined (step S218). If a remaining layer is present, the layer that has been predicted is set as the lower layer and the next layer is set as the upper layer before the processes in step S211 and thereafter are repeated. Predictor information showing predictors selected for the lower layer continues to be buffered by the predictor information buffer 193. If no remaining layer is present, the motion compensation process in FIG. 19 ends. The predicted image data generated here is output to the addition section 65 via the selector 71.

In the first example, as described above, predictor information of the lower layer is reused for decoding of the upper layer and thus, there is no need to redundantly encode the predictor information for the upper layer. Therefore, the amount of code of information about the inter prediction can be reduced.

4-2. Second Example

Figure 20:
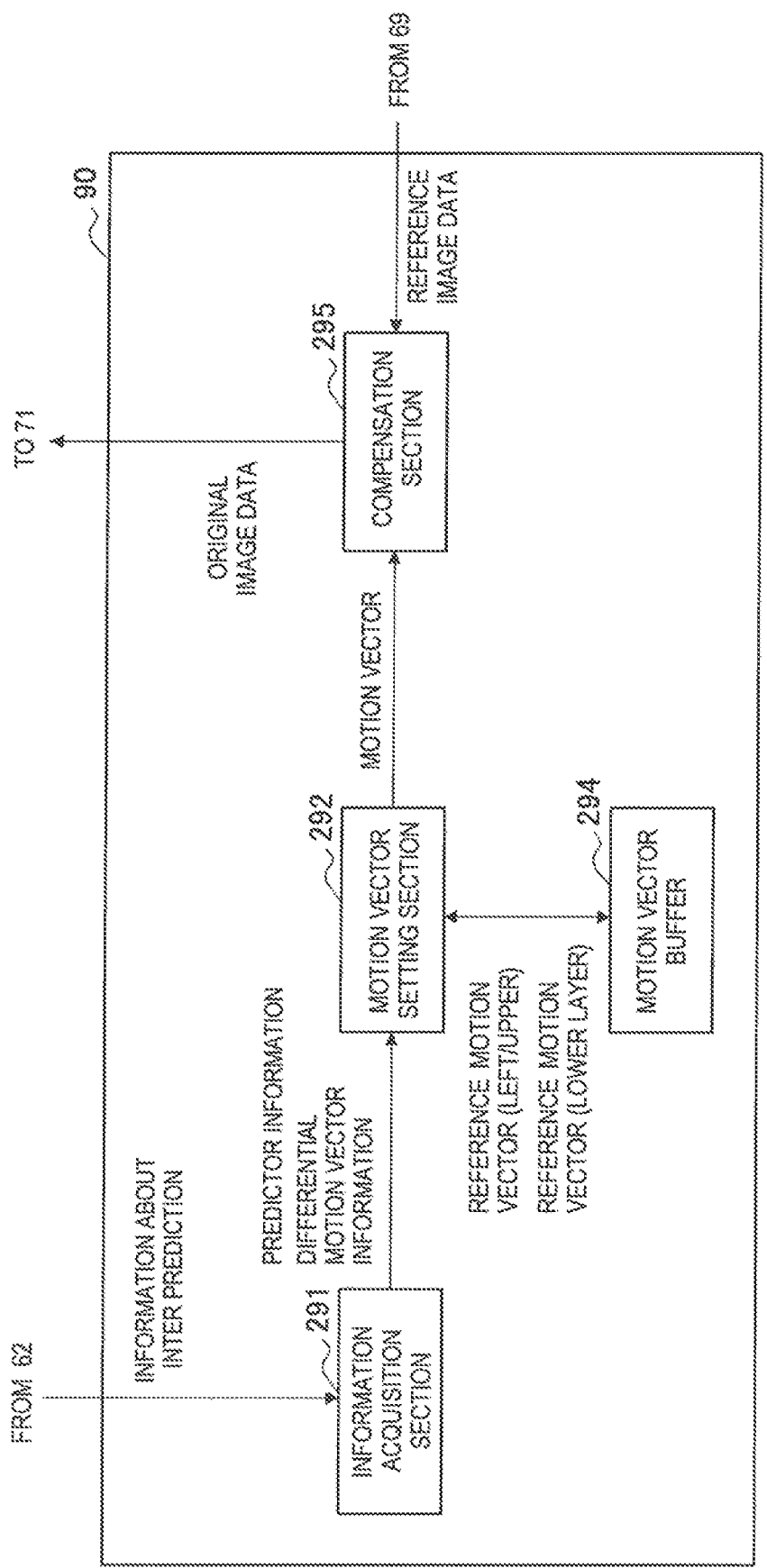
FIG. 20 is a block diagram showing an example of a detailed configuration of a motion compensation section according to a second example.

FIG. 20 is a block diagram showing an example of a detailed configuration of the motion compensation section 90 according to the second example. Referring to FIG. 20, the motion compensation section 90 includes an information acquisition section 291, a motion vector setting section 292, a motion vector buffer 294, and a compensation section 295.

(1) Base Layer

The motion compensation process of the base layer according to the present example may be the same as the motion compensation process of the base layer according to the first example. In the present example, however, predictor information of the base layer may not be buffered and motion vector information of the base layer is buffered extending over layers. In the motion compensation process of the base layer, the information acquisition section 291 acquires information about an inter prediction decoded by the lossless decoding section 62 from an encoded stream. In the present example, information about the inter prediction may contain predictor information and differential motion vector information (motion vector information for prediction units for which no motion vector is predicted). The predictor information acquired here shows, for example, among predictor candidates that may contain the aforementioned spatial predictor and temporal predictor, a predictor selected for each prediction unit for encoding. The motion vector setting section 292 sets a motion vector to each prediction unit. Then, the motion vector set to each prediction unit by the motion vector setting section 292 is output to the compensation section 295 and also stored in the motion vector buffer 294. Settings of a motion vector by the motion vector setting section 292 can be made by using a predictor shown by predictor information for each prediction unit and a differential motion vector shown by differential motion vector information. The compensation section 295 generates predicted image data of each prediction unit using the motion vector set to each prediction unit by the motion vector setting section 292 and reference image data input from the frame memory 69. Then, the compensation section 295 outputs the generated predicted image data to the addition section 65 via the selector 71.

(2) Enhancement Layer

In the motion compensation process of an enhancement layer, the prediction of a motion vector using an inter-layer predictor based on reference motion vectors of the lower layer stored in the motion vector buffer 294 can be made.

First, the information acquisition section 291 acquires information about an inter prediction decoded by the lossless decoding section 62 from an encoded stream. In the present example, information about an inter prediction of an enhancement layer may contain, in addition to differential motion vector information, predictor information showing the predictor selected for encoding from a plurality of predictor candidates including an inter-layer predictor as setting information. To predictor information showing that an inter-layer predictor is selected, the smallest code number among a plurality of predictor candidates is allocated. The motion vector setting section 292 rebuilds a motion vector using the differential motion vector information and predictor information acquired by the information acquisition section 291 and sets the rebuilt motion vector to each prediction unit. When predictor information shows an inter-layer predictor, the motion vector setting section 292 may set a reference motion vector enlarged in accordance with the ratio of spatial resolutions between layers like the aforementioned Formula (9) as a predicted motion vector. In this case, the motion vector setting section 292 may round off the predicted motion vector in accordance with the accuracy of the motion vector. The motion vector set to each prediction unit by the motion vector setting section 292 is output to the compensation section 295 and also stored in the motion vector buffer 294. The compensation section 295 generates predicted image data of each prediction unit using the motion vector set to each prediction unit by the motion vector setting section 292 and reference image data input from the frame memory 69. Then, the compensation section 295 outputs the generated predicted image data to the addition section 65 via the selector 71.

(3) Flow of the Process

Figure 21:
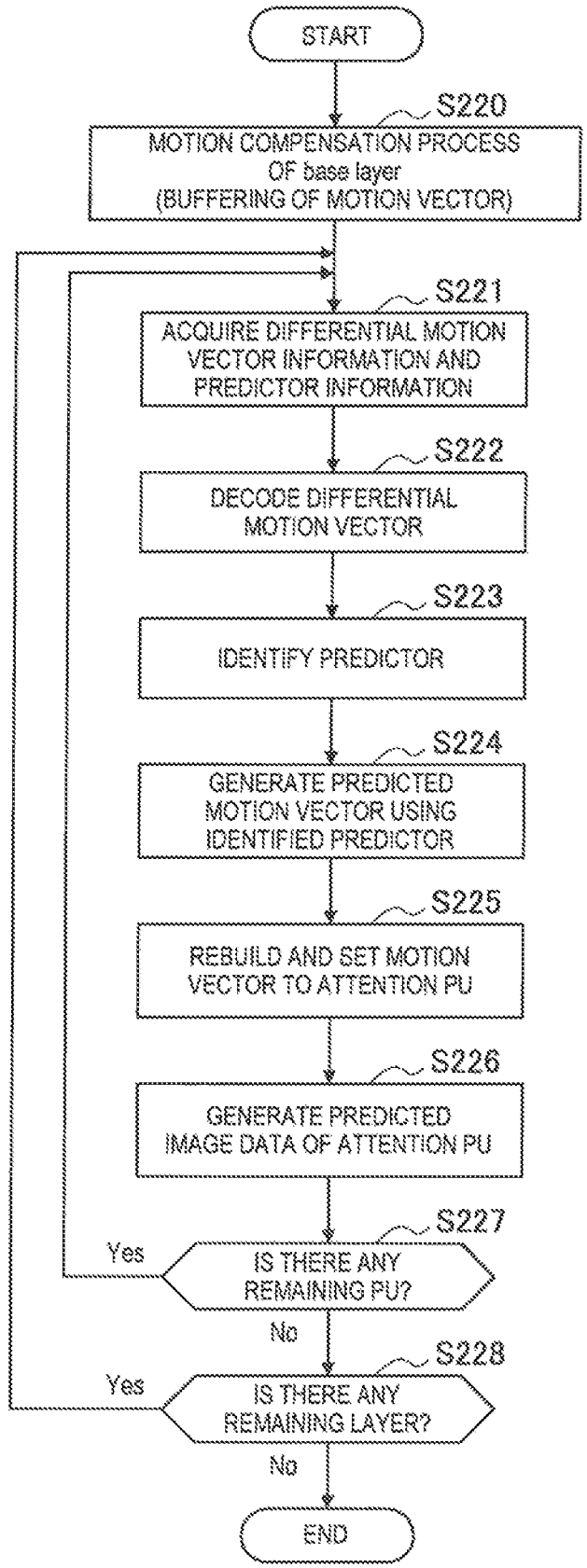
FIG. 21 is a flow chart showing an example of a flow of a motion compensation process by the motion compensation section according to the second example.

FIG. 21 is a flow chart showing an example of the flow of the motion compensation process by the motion compensation section 90 according to the present example. Referring to FIG. 21, the motion compensation section 90 first performs the motion compensation process of the base layer (step S220). At this point, the motion vector buffer 294 buffers the motion vector set to each prediction unit.

Processes in steps S221 to S218 are the motion compensation process of enhancement layers. Of these processes, processes of steps S221 to S228 are repeated for each attention PU of each enhancement layer. In the description that follows, the "upper layer" is the layer to be predicted and the "lower layer" is a layer lower than the layer to be predicted.

First, the information acquisition section 291 sets one PU of the upper layer as the attention PU and acquires differential motion vector information and predictor information concerning the attention PU from an encoded stream (step S221). The motion vector setting section 292 decodes the differential motion vector information (step S222). The motion vector setting section 292 uses predictor information to identify the predictor to be used for generating a predicted motion vector of the attention PU (step S223).

Next, the motion vector setting section 292 generates a predicted motion vector for the attention PU using reference motion vectors buffered by the motion vector buffer 294 according to the identified predictor (step S224). If, for example, the identified predictor is an inter-layer predictor, the motion vector set to the PU in the lower layer corresponding to the attention PU is used as the reference motion vector MVbase in the aforementioned Formula (8) or Formula (9). Next, the motion vector setting section 292 rebuilds a motion vector by adding a differential motion vector to the generated predicted motion vector (step S225). The motion vector rebuilt in this manner is set to the attention PU. In addition, the rebuilt motion vector is temporarily stored in the motion vector buffer 294 for a process in the upper layer. For prediction units for which no prediction vector is predicted, instead of differential motion vector information, motion vector information may be acquired from an encoded stream to decode the motion vector information into a motion vector.

Next, the compensation section 295 generates predicted image data of the attention PU using the motion vector set to the attention PU by the motion vector setting section 292 and reference image data input from the frame memory 69 (step S226).

Then, if any PU that is not yet processed remains in the layer to be predicted, the process returns to step S221 (step S227). On the other hand, if no PU that is not yet processed remains, whether any remaining layer (any higher layer) is present is further determined (step S228). If a remaining layer is present, the layer that has been predicted is set as the lower layer and the next layer is set as the upper layer before the processes in step S221 and thereafter are repeated. If no remaining layer is present, the motion compensation process in FIG. 21 ends. The predicted image data generated here is output to the addition section 65 via the selector 71.

In the second example, as described above, the motion vector used for motion compensation of the upper layer can be predicted according to an inter-layer predictor based on the motion vector set to the lower layer. Therefore, increased accuracy of predicting a motion vector results and the amount of code of a differential motion vector can be reduced.

4-3. Third Example

Figure 22:
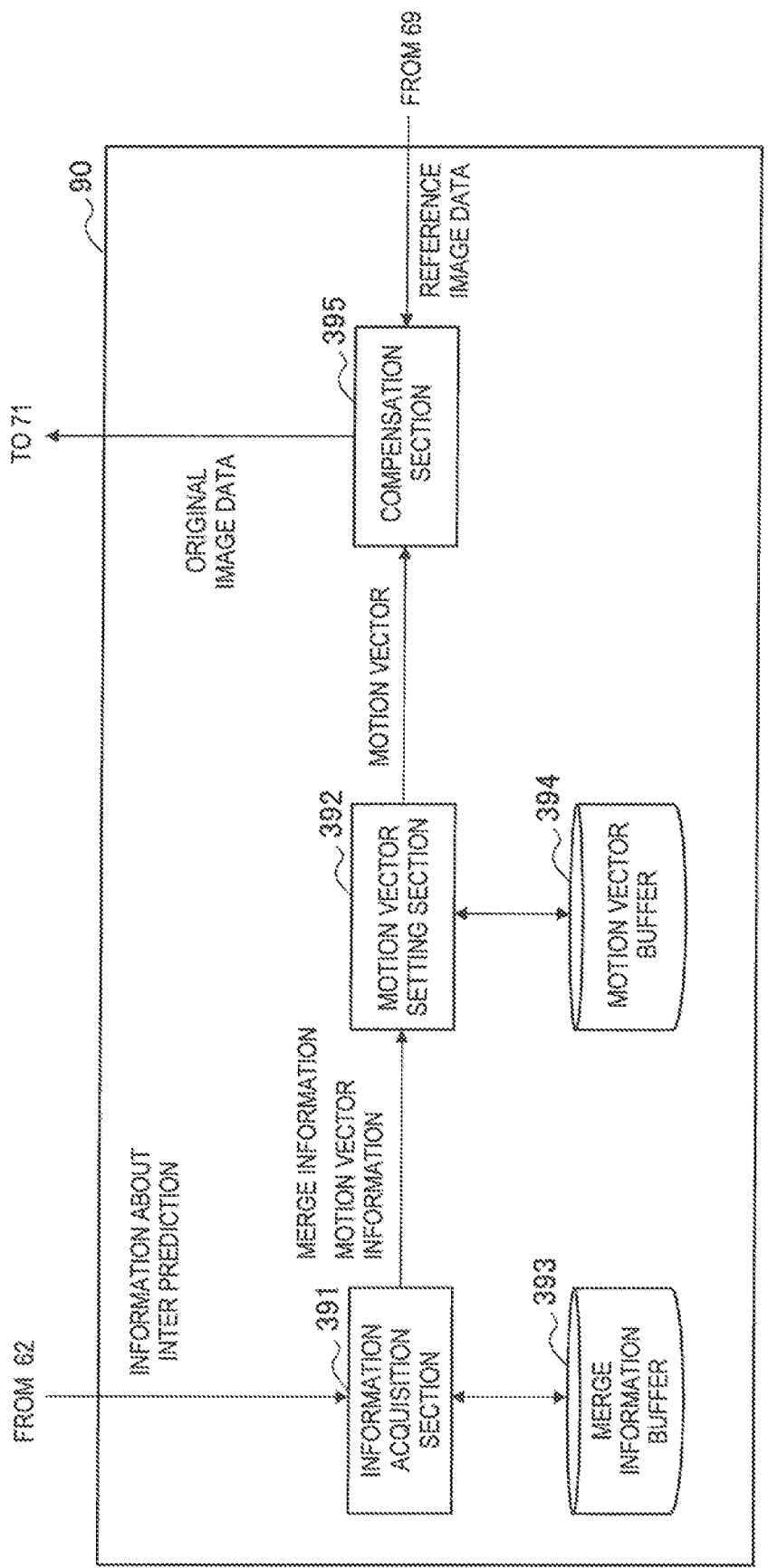
FIG. 22 is a block diagram showing an example of a detailed configuration of a motion compensation section according to a third example.

FIG. 22 is a block diagram showing an example of a detailed configuration of the motion compensation section 90 according to the third example. Referring to FIG. 22, the motion compensation section 90 includes an information acquisition section 391, a motion vector setting section 392, a merge information buffer 393, a motion vector buffer 394, and a compensation section 395.

(1) Base Layer

In the motion compensation process of the base layer, the information acquisition section 391 acquires information about an inter prediction decoded by the lossless decoding section 62 from an encoded stream. In the present example, information about an inter prediction may contain merge information and motion vector information. The merge information acquired here may contain, for example, MergeFlag and MergeLeftFlag described using FIGS. 12A to 12C and show, among a plurality of merge mode candidates, the merge mode selected for each prediction unit for encoding. The motion vector setting section 392 sets a motion vector to each prediction unit. Then, the motion vector set to each prediction unit by the motion vector setting section 392 is output to the compensation section 395 and also stored in the motion vector buffer 394. In addition, merge information for each prediction unit is stored in the merge information buffer 393 for a process in the upper layer. If, for example, merge information indicates that a certain prediction unit is merged with a neighboring prediction unit adjacent to the prediction unit (that a motion vector common to these prediction units is set), the motion vector setting section 392 acquires the motion vector set to the neighboring prediction unit from the motion vector buffer 394 and sets the acquired motion vector to the aforementioned prediction unit. On the other hand, if merge information indicates that a certain prediction unit is not merged with another prediction unit, the motion vector setting section 392 sets a motion vector rebuilt by decoding motion vector information acquired by the information acquisition section 391 to the aforementioned prediction unit. The compensation section 395 generates predicted image data of each prediction unit using the motion vector set to each prediction unit by the motion vector setting section 392 and reference image data input from the frame memory 69.

Then, the compensation section 395 outputs the generated predicted image data to the addition section 65 via the selector 71.

(2) Enhancement Layer

In the motion compensation process of an enhancement layer, a motion vector is set to each prediction unit according to merge information of the lower layer stored in the merge information buffer 393.

First, the information acquisition section 391 acquires, as setting information to set a motion vector to each prediction unit in the upper layer, merge information of the prediction unit in the lower layer corresponding to each prediction unit from the merge information buffer 393. The information acquisition section 391 acquires motion vector information contained in information about an inter prediction for a prediction unit not merged with another prediction unit. Merge information acquired by the information acquisition section 391 may contain, for example, MergeFlag and MergeLeftFlag described using FIGS. 12A to 12C. The motion vector setting section 392 sets a motion vector to each prediction unit according to the merge information acquired by the information acquisition section 391. The motion vector set to each prediction unit by the motion vector setting section 392 is output to the compensation section 395 and also stored in the motion vector buffer 394. The motion vector setting section 392 may set a motion vector rebuilt by decoding motion vector information to a prediction unit that is not merged with another prediction unit. The compensation section 395 generates predicted image data of each prediction unit using the motion vector set to each prediction unit by the motion vector setting section 392 and reference image data input from the frame memory 69. Then, the compensation section 395 outputs the generated predicted image data to the addition section 65 via the selector 71.

(3) Flow of the Process

Figure 23:
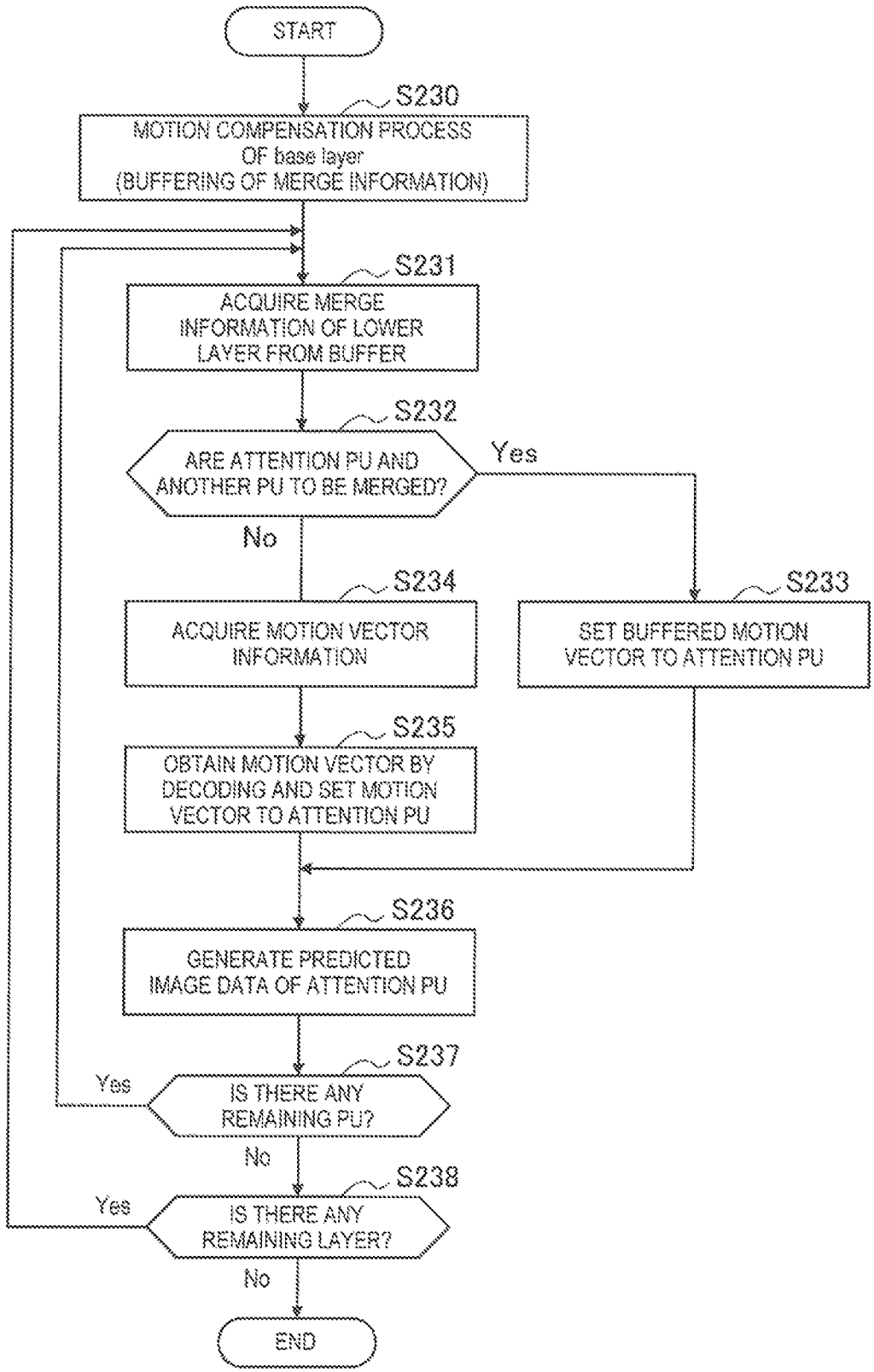
FIG. 23 is a flow chart showing an example of a flow of a motion compensation process by the motion compensation section according to the third example.

FIG. 23 is a flow chart showing an example of the flow of the motion compensation process by the motion compensation section 90 according to the present example. Referring to FIG. 23, the motion compensation section 90 first performs the motion compensation process of the base layer (step S230). At this point, the merge information buffer 393 buffers merge information showing the merge mode selected for encoding of each prediction unit as setting information.

Processes in steps S231 to S238 are the motion compensation process of enhancement layers. Of these processes, processes of steps S231 to S237 are repeated for each attention PU of each enhancement layer. In the description that follows, the "upper layer" is the layer to be predicted and the "lower layer" is a layer lower than the layer to be predicted.

First, the information acquisition section 391 sets one PU of the upper layer as an attention PU and acquires merge information of the PU in the lower layer corresponding to the attention PU from the merge information buffer 393 (step S231). Next, the information acquisition section 391 determines whether to merge the attention PU with another PU based on the acquired merge information (step S232). When, for example, the corresponding PU in the lower layer is merged with the left neighboring PU, the attention PU can also be determined to be merged with the left neighboring PU. Similarly, when the corresponding PU in the lower layer is merged with the upper neighboring PU, the attention PU can also be determined to be merged with the upper neighboring PU. In these cases, the process proceeds to step S233. On the other hand, when the corresponding PU in the lower layer is not merged with the neighboring PU, the attention PU can also be determined not to be merged with the neighboring PU. In this case, the process proceeds to step S234.

In step S233, the motion vector setting section 392 acquires a motion vector identified in accordance with the merge information from the motion vector buffer 394 and sets the acquired motion vector to the attention PU (step S233). In step S234, on the other hand, the information acquisition section 391 acquires motion vector information of the attention PU (step S234). Then, the motion vector setting section 392 decodes the acquired motion vector information into a motion vector and sets the decoded motion vector to the attention PU (step S235).

Next, the compensation section 395 generates predicted image data of the attention PU using the motion vector set to the attention PU by the motion vector setting section 392 and reference image data input from the frame memory 69 (step S236).

Then, if any PU that is not yet processed remains in the layer to be predicted, the process returns to step S231 (step S237). On the other hand, if no PU that is not yet processed remains, whether any remaining layer (any higher layer) is present is further determined (step S238). If a remaining layer is present, the layer that has been predicted is set as the lower layer and the next layer is set as the upper layer before the processes in step S231 and thereafter are repeated. Merge information showing the merge mode selected for the lower layer continues to be buffered by the merge information buffer 393. If no remaining layer is present, the motion compensation process in FIG. 23 ends. The predicted image data generated here is output to the addition section 65 via the selector 71.

In the third example, as described above, merge information of the lower layer is reused for decoding of the upper layer and thus, there is no need to redundantly encode the merge information for the upper layer. Therefore, the amount of code of information about the inter prediction can be reduced.

4-4. Fourth Example

Figure 24:
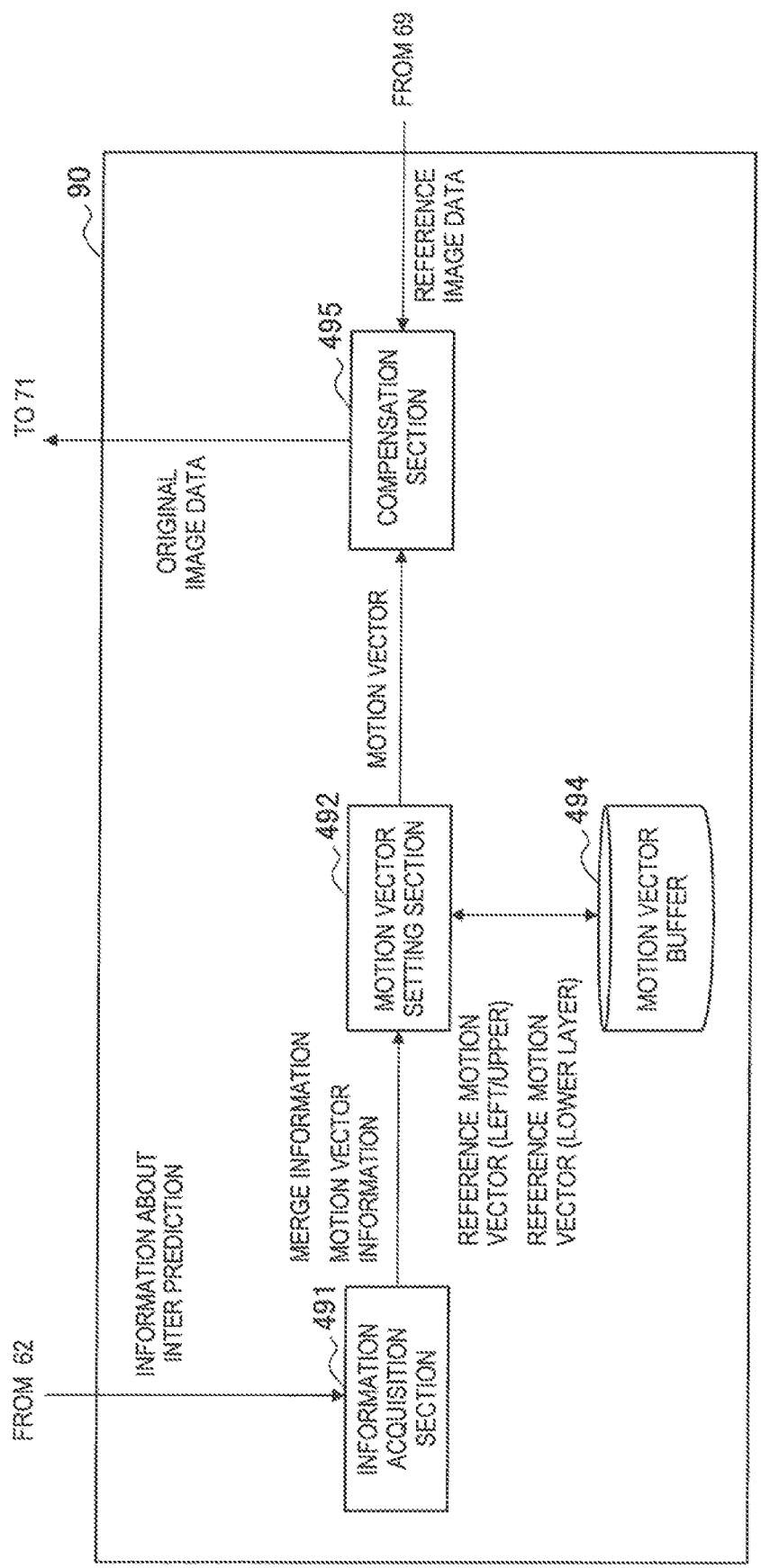
FIG. 24 is a block diagram showing an example of a detailed configuration of a motion compensation section according to a fourth example.

FIG. 24 is a block diagram showing an example of a detailed configuration of the motion compensation section 90 according to the fourth example. Referring to FIG. 24, the motion compensation section 90 includes an information acquisition section 491, a motion vector setting section 492, a motion vector buffer 494, and a compensation section 495.

(1) Base Layer

In the motion compensation process of the base layer, the information acquisition section 491 acquires information about an inter prediction decoded by the lossless decoding section 62 from an encoded stream. In the present example, information about an inter prediction may contain merge information and motion vector information. The merge information acquired for the base layer may contain, for example, MergeFlag and MergeLeftFlag described using FIGS. 12A to 12C and show, among a plurality of merge mode candidates, the merge mode selected for each prediction unit for encoding. The motion vector setting section 492 sets a motion vector to each prediction unit. Then, the motion vector set to each prediction unit by the motion vector setting section 492 is output to the compensation section 495 and also stored in the motion vector buffer 494. If, for example, merge information indicates that a certain prediction unit is merged with a neighboring prediction unit adjacent to the prediction unit, the motion vector setting section 492 acquires the motion vector set to the neighboring prediction unit from the motion vector buffer 494 and sets the acquired motion vector to the aforementioned prediction unit. On the other hand, if merge information indicates that a certain prediction unit is not merged with another prediction unit, the motion vector setting section 492 sets a motion vector rebuilt by decoding motion vector information acquired by the information acquisition section 491 to the aforementioned prediction unit. The compensation section 495 generates predicted image data of each prediction unit using the motion vector set to each prediction unit by the motion vector setting section 492 and reference image data input from the frame memory 69. Then, the compensation section 495 outputs the generated predicted image data to the addition section 65 via the selector 71.

(2) Enhancement Layer

In the motion compensation process of an enhancement layer, merge information including MergeBaseFlag showing a merge with the corresponding prediction unit in the lower layer may be used.

First, the information acquisition section 491 acquires information about an inter prediction decoded by the lossless decoding section 62 from an encoded stream. Information about an inter prediction of an enhancement layer may contain merge information and motion vector information. The merge information may contain, for example, MergeFlag, MergeBaseFlag, and MergeLeftFlag described using FIGS. 15A to 15C and show, among a plurality of merge mode candidates, the merge mode selected for each prediction unit for encoding. The motion vector setting section 492 sets a motion vector to each prediction unit according to the merge information acquired by the information acquisition section 491. When prediction units are merged between layers, the motion vector setting section 492 may set an enlarged reference motion vector after enlarging, like the aforementioned Formula (9), the buffered motion vector in accordance with the ratio of spatial resolutions between layers. In this case, the motion vector setting section 492 may round off the enlarged motion vector in accordance with the accuracy of the motion vector. The motion vector set to each prediction unit by the motion vector setting section 492 is output to the compensation section 495 and also stored in the motion vector buffer 494. The motion vector setting section 492 may set a motion vector rebuilt by decoding motion vector information to a prediction unit that is not merged with another prediction unit. The compensation section 495 generates predicted image data of each prediction unit using the motion vector set to each prediction unit by the motion vector setting section 492 and reference image data input from the frame memory 69. Then, the compensation section 495 outputs the generated predicted image data to the addition section 65 via the selector 71.

(3) Flow of the Process

Figure 25:
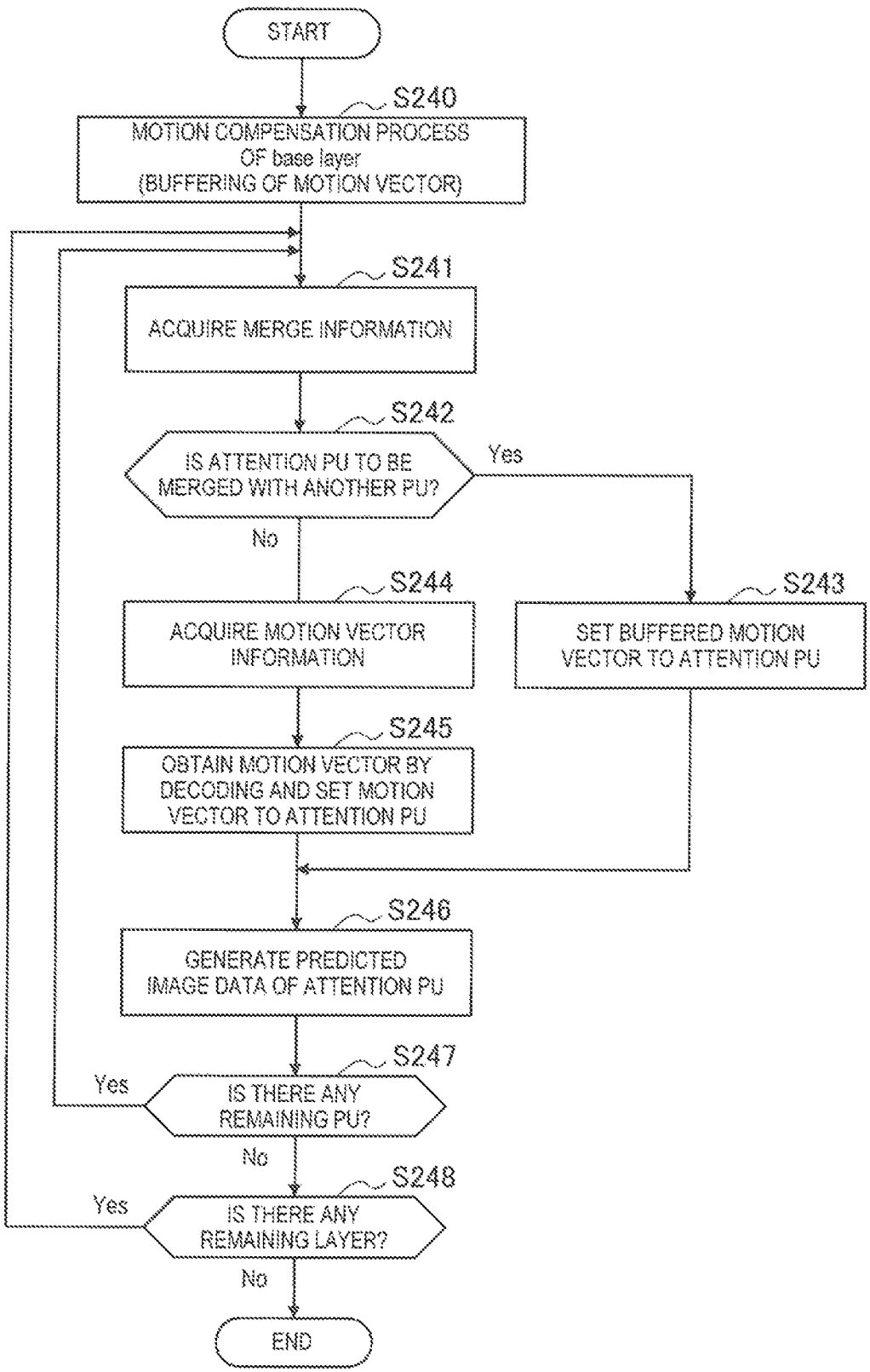
FIG. 25 is a flow chart showing an example of a flow of a motion compensation process by the motion compensation section according to the fourth example.

FIG. 25 is a flow chart showing an example of the flow of the motion compensation process by the motion compensation section 90 according to the present example. Referring to FIG. 25, the motion compensation section 90 first performs the motion compensation process of the base layer (step S240). At this point, the motion vector buffer 494 buffers the motion vector set to each prediction unit.

Processes in steps S241 to S248 are the motion compensation process of enhancement layers. Of these processes, processes of steps S241 to S247 are repeated for each attention PU of each enhancement layer. In the description that follows, the "upper layer" is the layer to be predicted and the "lower layer" is a layer lower than the layer to be predicted.

The information acquisition section 491 first acquires merge information of one attention PU of the upper layer (step S241). Next, the information acquisition section 491 determines whether to merge the attention PU with another PU based on the acquired merge information (step S242). For example, the attention PU may be merged with the corresponding PU in the lower layer or a neighboring PU in the upper layer. When the attention PU is merged with another PU, the process proceeds to step S243. On the other hand, when the attention PU is not merged with another PU, the process proceeds to step S244.

In step S243, the motion vector setting section 492 acquires a motion vector identified in accordance with the merge information from the motion vector buffer 494 and sets the acquired motion vector to the attention PU (step S243). In step S244, on the other hand, the information acquisition section 491 acquires motion vector information of the attention PU (step S244). Then, the motion vector setting section 492 decodes the acquired motion vector information into a motion vector and sets the decoded motion vector to the attention PU (step S245).

Next, the compensation section 495 generates predicted image data of the attention PU using the motion vector set to the attention PU by the motion vector setting section 492 and reference image data input from the frame memory 69 (step S246).

Then, if any PU that is not yet processed remains in the layer to be predicted, the process returns to step S241 (step S247). On the other hand, if no PU that is not yet processed remains, whether any remaining layer (any higher layer) is present is further determined (step S248). If a remaining layer is present, the layer that has been predicted is set as the lower layer and the next layer is set as the upper layer before the processes in step S241 and thereafter are repeated. The motion vector set to each prediction unit of the lower layer is buffered by the motion vector buffer 494. If no remaining layer is present, the motion compensation process in FIG. 25 ends. The predicted image data generated here is output to the addition section 65 via the selector 71.

In the fourth example, as described above, a motion vector is set to each prediction unit of an enhancement layer using merge information showing the merge mode selected from a plurality of merge mode candidates including a merge of prediction units between layers. Therefore, the motion vector of the prediction unit in the upper layer to be merged with the corresponding prediction unit in the lower layer having a clear correlation of motion is not encoded and so the amount of code can effectively be reduced.

5. Example Application

The image encoding device 10 and the image decoding device 60 according to the embodiment described above may be applied to various electronic appliances such as a transmitter and a receiver for satellite broadcasting, cable broadcasting such as cable TV, distribution on the Internet, distribution to terminals via cellular communication, and the like, a recording device that records images in a medium such as an optical disc, a magnetic disk or a flash memory, a reproduction device that reproduces images from such storage medium, and the like. Four example applications will be described below.

5-1. First Application Example

Figure 26:
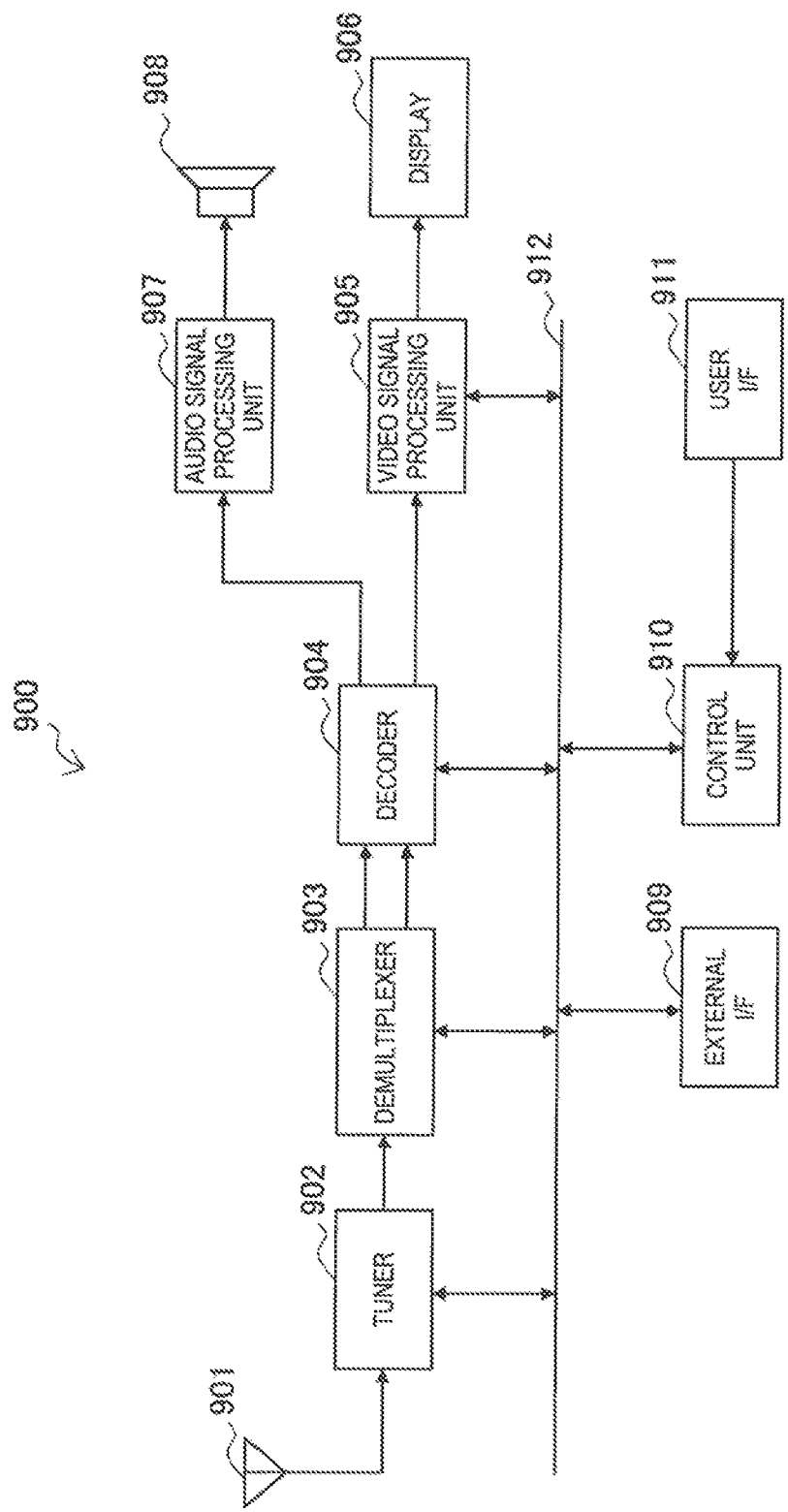
FIG. 26 is a block diagram showing an example of a schematic configuration of a television.

FIG. 26 is a diagram illustrating an example of a schematic configuration of a television device applying the aforementioned embodiment. A television device 900 includes an antenna 901, a tuner 902, a demultiplexer 903, a decoder 904, a video signal processing unit 905, a display 906, an audio signal processing unit 907, a speaker 908, an external interface 909, a control unit 910, a user interface 911, and a bus 912.

The tuner 902 extracts a signal of a desired channel from a broadcast signal received through the antenna 901 and demodulates the extracted signal. The tuner 902 then outputs an encoded bit stream obtained by the demodulation to the demultiplexer 903. That is, the tuner 902 has a role as transmission means receiving the encoded stream in which an image is encoded, in the television device 900.

The demultiplexer 903 isolates a video stream and an audio stream in a program to be viewed from the encoded bit stream and outputs each of the isolated streams to the decoder 904. The demultiplexer 903 also extracts auxiliary data such as an EPG (Electronic Program Guide) from the encoded bit stream and supplies the extracted data to the control unit 910. Here, the demultiplexer 903 may descramble the encoded bit stream when it is scrambled.

The decoder 904 decodes the video stream and the audio stream that are input from the demultiplexer 903. The decoder 904 then outputs video data generated by the decoding process to the video signal processing unit 905. Furthermore, the decoder 904 outputs audio data generated by the decoding process to the audio signal processing unit 907.

The video signal processing unit 905 reproduces the video data input from the decoder 904 and displays the video on the display 906. The video signal processing unit 905 may also display an application screen supplied through the network on the display 906. The video signal processing unit 905 may further perform an additional process such as noise reduction on the video data according to the setting. Furthermore, the video signal processing unit 905 may generate an image of a GUI (Graphical User Interface) such as a menu, a button, or a cursor and superpose the generated image onto the output image.

The display 906 is driven by a drive signal supplied from the video signal processing unit 905 and displays video or an image on a video screen of a display device (such as a liquid crystal display, a plasma display, or an OELD (Organic ElectroLuminescence Display)).

The audio signal processing unit 907 performs a reproducing process such as D/A conversion and amplification on the audio data input from the decoder 904 and outputs the audio from the speaker 908. The audio signal processing unit 907 may also perform an additional process such as noise reduction on the audio data.

The external interface 909 is an interface that connects the television device 900 with an external device or a network. For example, the decoder 904 may decode a video stream or an audio stream received through the external interface 909. This means that the external interface 909 also has a role as the transmission means receiving the encoded stream in which an image is encoded, in the television device 900.

The control unit 910 includes a processor such as a CPU and a memory such as a RAM and a ROM. The memory stores a program executed by the CPU, program data, EPG data, and data acquired through the network. The program stored in the memory is read by the CPU at the start-up of the television device 900 and executed, for example. By executing the program, the CPU controls the operation of the television device 900 in accordance with an operation signal that is input from the user interface 911, for example.

The user interface 911 is connected to the control unit 910. The user interface 911 includes a button and a switch for a user to operate the television device 900 as well as a reception part which receives a remote control signal, for example. The user interface 911 detects a user operation through these components, generates the operation signal, and outputs the generated operation signal to the control unit 910.

The bus 912 mutually connects the tuner 902, the demultiplexer 903, the decoder 904, the video signal processing unit 905, the audio signal processing unit 907, the external interface 909, and the control unit 910.

The decoder 904 in the television device 900 configured in the aforementioned manner has a function of the image decoding device 60 according to the aforementioned embodiment. Accordingly, for scalable video encoding and decoding of images by the mobile telephone 920, the encoding efficiency can be further enhanced by utilizing a correlation of motion between layers.

5-2. Second Application Example

Figure 27:
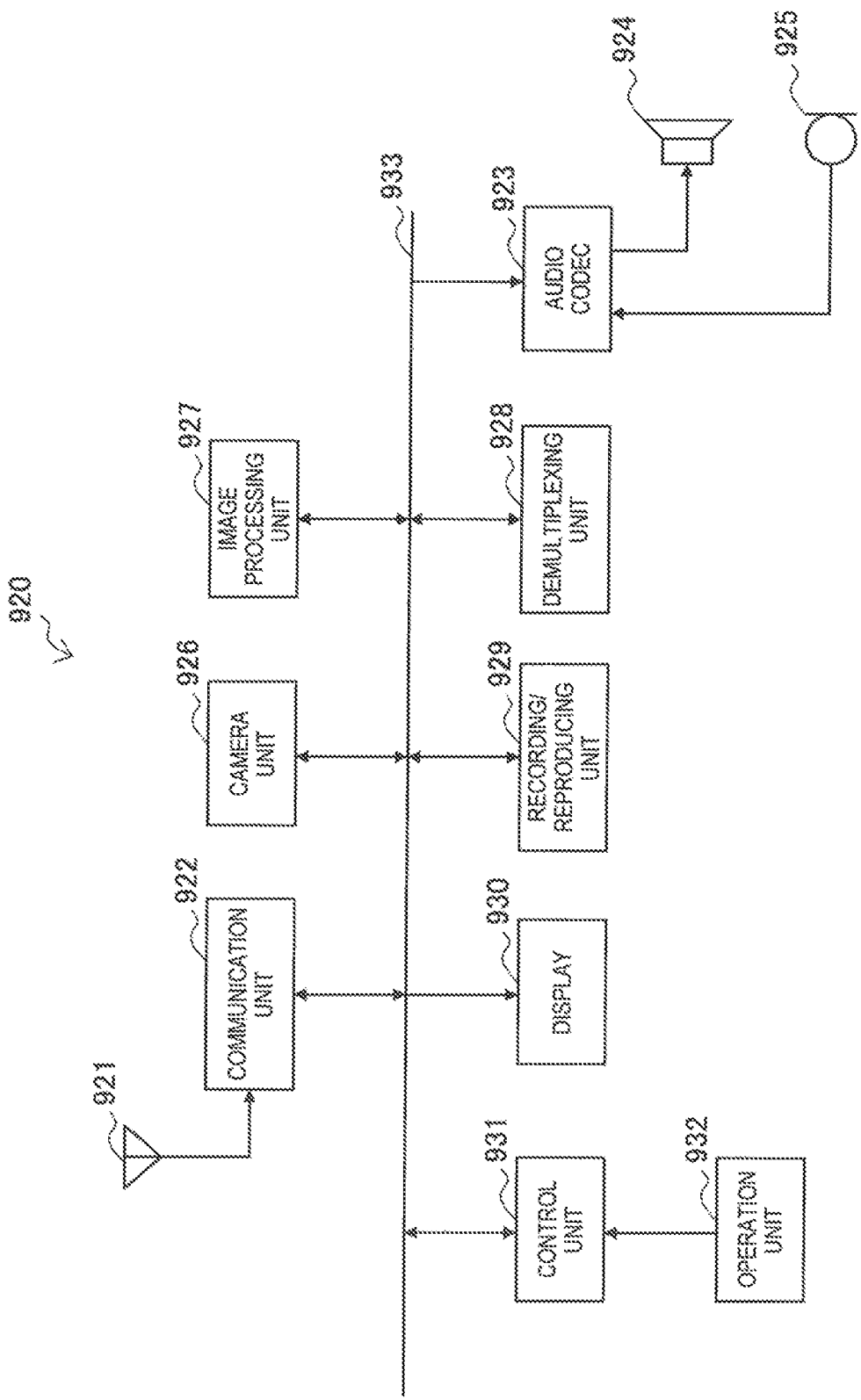
FIG. 27 is a block diagram showing an example of a schematic configuration of a mobile phone.

FIG. 27 is a diagram illustrating an example of a schematic configuration of a mobile telephone applying the aforementioned embodiment. A mobile telephone 920 includes an antenna 921, a communication unit 922, an audio codec 923, a speaker 924, a microphone 925, a camera unit 926, an image processing unit 927, a demultiplexing unit 928, a recording/reproducing unit 929, a display 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the demultiplexing unit 928, the recording/reproducing unit 929, the display 930, and the control unit 931.

The mobile telephone 920 performs an operation such as transmitting/receiving an audio signal, transmitting/receiving an electronic mail or image data, imaging an image, or recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, converts a frequency of the signal, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then outputs the audio by supplying the generated audio signal to the speaker 924.

In the data communication mode, for example, the control unit 931 generates character data configuring an electronic mail, in accordance with a user operation through the operation unit 932. The control unit 931 further displays a character on the display 930. Moreover, the control unit 931 generates electronic mail data in accordance with a transmission instruction from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, converts a frequency of the signal, and acquires a reception signal. The communication unit 922 thereafter demodulates and decodes the reception signal, restores the electronic mail data, and outputs the restored electronic mail data to the control unit 931. The control unit 931 displays the content of the electronic mail on the display 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB (Unallocated Space Bitmap) memory, or a memory card.

In the photography mode, for example, the camera unit 926 images an object, generates image data, and outputs the generated image data to the image processing unit 927. The image processing unit 927 encodes the image data input from the camera unit 926 and stores an encoded stream in the storage medium of the storing/reproducing unit 929.

In the videophone mode, for example, the demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 subsequently transmits the generated transmission signal to the base station (not shown) through the antenna 921. Moreover, the communication unit 922 amplifies a radio signal received through the antenna 921, converts a frequency of the signal, and acquires a reception signal. The transmission signal and the reception signal can include an encoded bit stream. Then, the communication unit 922 demodulates and decodes the reception signal to restore the stream, and outputs the restored stream to the demultiplexing unit 928. The demultiplexing unit 928 isolates the video stream and the audio stream from the input stream and outputs the video stream and the audio stream to the image processing unit 927 and the audio codec 923, respectively. The image processing unit 927 decodes the video stream to generate video data. The video data is then supplied to the display 930, which displays a series of images. The audio codec 923 expands and performs D/A conversion on the audio stream to generate an analog audio signal. The audio codec 923 then supplies the generated audio signal to the speaker 924 to output the audio.

The image processing unit 927 in the mobile telephone 920 configured in the aforementioned manner has a function of the image encoding device 10 and the image decoding device 60 according to the aforementioned embodiment. Accordingly, for scalable video coding and decoding of images by the mobile telephone 920, the encoding efficiency can be further enhanced by utilizing a correlation of motion between layers.

5-3. Third Application Example

Figure 28:
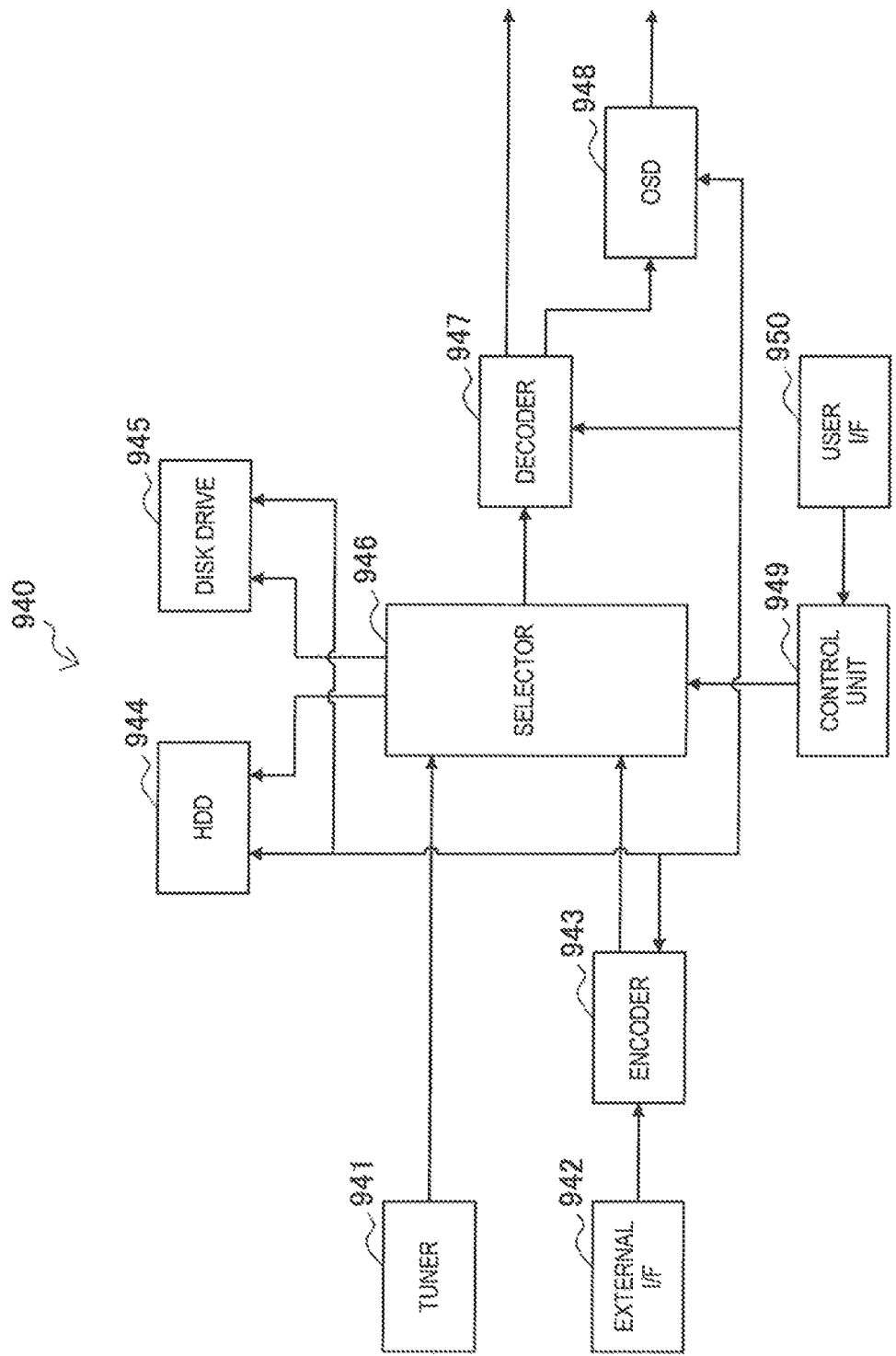
FIG. 28 is a block diagram showing an example of a schematic configuration of a recording/reproduction device.

FIG. 28 is a diagram illustrating an example of a schematic configuration of a recording/reproducing device applying the aforementioned embodiment. A recording/reproducing device 940 encodes audio data and video data of a broadcast program received and records the data into a recording medium, for example. The recording/reproducing device 940 may also encode audio data and video data acquired from another device and record the data into the recording medium, for example. In response to a user instruction, for example, the recording/reproducing device 940 reproduces the data recorded in the recording medium on a monitor and a speaker. The recording/reproducing device 940 at this time decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface which connects the recording/reproducing device 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing device 940.

The encoder 943 encodes the video data and the audio data when the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when reproducing the video and the audio.

The disk drive 945 records and reads data into/from a recording medium which is mounted to the disk drive. The recording medium mounted to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, a button, or a cursor onto the video displayed.

The control unit 949 includes a processor such as a CPU and a memory such as a RAM and a ROM. The memory stores a program executed by the CPU as well as program data. The program stored in the memory is read by the CPU at the start-up of the recording/reproducing device 940 and executed, for example. By executing the program, the CPU controls the operation of the recording/reproducing device 940 in accordance with an operation signal that is input from the user interface 950, for example.

The user interface 950 is connected to the control unit 949. The user interface 950 includes a button and a switch for a user to operate the recording/reproducing device 940 as well as a reception part which receives a remote control signal, for example. The user interface 950 detects a user operation through these components, generates the operation signal, and outputs the generated operation signal to the control unit 949.

The encoder 943 in the recording/reproducing device 940 configured in the aforementioned manner has a function of the image encoding device 10 according to the aforementioned embodiment. On the other hand, the decoder 947 has a function of the image decoding device 60 according to the aforementioned embodiment. Accordingly, for scalable video encoding and decoding of images by the recording/reproducing device 940, the encoding efficiency can be further enhanced by utilizing a correlation of motion between layers.

5-4. Fourth Application Example

FIG. 29 is a diagram illustrating an example of a schematic configuration of an imaging device applying the aforementioned embodiment. An imaging device 960 images an object, generates an image, encodes image data, and records the data into a recording medium.

The imaging device 960 includes an optical block 961, an imaging unit 962, a signal processing unit 963, an image processing unit 964, a display 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of the object on an imaging surface of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging surface into an image signal as an electric signal. Subsequently, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal process has been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display 965. Moreover, the image processing unit 964 may output to the display 965 the image data input from the signal processing unit 963 to display the image. Furthermore, the image processing unit 964 may superpose display data acquired from the OSD 969 onto the image that is output on the display 965.

The OSD 969 generates an image of a GUI such as a menu, a button, or a cursor and outputs the generated image to the image processing unit 964.

The external interface 966 is configured as a USB input/output terminal, for example. The external interface 966 connects the imaging device 960 with a printer when printing an image, for example. Moreover, a drive is connected to the external interface 966 as needed. A removable medium such as a magnetic disk or an optical disk is mounted to the drive, for example, so that a program read from the removable medium can be installed to the imaging device 960. The external interface 966 may also be configured as a network interface that is connected to a network such as a LAN or the Internet. That is, the external interface 966 has a role as transmission means in the imaging device 960.

The recording medium mounted to the media drive 968 may be an arbitrary removable medium that is readable and writable such as a magnetic disk, a magneto-optical disk, an optical disk, or a semiconductor memory. Furthermore, the recording medium may be fixedly mounted to the media drive 968 so that a non-transportable storage unit such as a built-in hard disk drive or an SSD (Solid State Drive) is configured, for example.

The control unit 970 includes a processor such as a CPU and a memory such as a RAM and a ROM. The memory stores a program executed by the CPU as well as program data. The program stored in the memory is read by the CPU at the start-up of the imaging device 960 and then executed. By executing the program, the CPU controls the operation of the imaging device 960 in accordance with an operation signal that is input from the user interface 971, for example.

The user interface 971 is connected to the control unit 970. The user interface 971 includes a button and a switch for a user to operate the imaging device 960, for example. The user interface 971 detects a user operation through these components, generates the operation signal, and outputs the generated operation signal to the control unit 970.

The image processing unit 964 in the imaging device 960 configured in the aforementioned manner has a function of the image encoding device 10 and the image decoding device 60 according to the aforementioned embodiment. Accordingly, for scalable video encoding and decoding of images by the imaging device 960, the encoding efficiency can be further enhanced by utilizing a correlation of motion between layers.

6. Summary

Heretofore, the four examples of the image encoding device 10 and the image decoding device 60 according to an embodiment have been described using FIGS. 1 to 29. According to these examples, in scalable video coding and decoding of an image, setting information to set a motion vector to a second prediction unit in the upper layer corresponding to a first prediction unit in the lower layer and related to a motion vector set to the first prediction unit is used to set the motion vector to the second prediction unit. Thus, a motion vector can be set to each prediction unit of the upper layer by utilizing a correlation of motion between layers. Therefore, redundant encoding of motion vector information, differential motion vector information, predictor information, or merge information can be avoided and so the encoding efficiency can be enhanced.

According to the first example, for example, predictor information showing a predictor used to predict a motion vector of a prediction unit in the lower layer is reused when a motion vector of a prediction unit in the upper layer is predicted. Therefore, redundant encoding of predictor information can be avoided.

According to the second example, for example, an inter-layer predictor for a prediction unit in the upper layer based on a motion vector set to the corresponding prediction unit in the lower layer is introduced as a new predictor candidate. Therefore, the accuracy of prediction of the motion vector for the prediction unit in the upper layer can be improved and the amount of code needed to encode differential motion vector information can be reduced.

According to the third example, for example, merge information showing the merge mode selected for a prediction unit in the lower layer is reused for a prediction unit in the upper layer. Therefore, redundant encoding of merge information can be avoided.

According to the fourth example, for example, a new merge mode to merge a prediction unit in the upper layer with the corresponding prediction unit in the lower layer is introduced. Therefore, redundant encoding of motion vector information for a prediction unit in the upper layer can be avoided.

Mainly described herein is the example where the various pieces of information such as the information related to intra prediction and the information related to inter prediction are multiplexed to the header of the encoded stream and transmitted from the encoding side to the decoding side. The method of transmitting these pieces of information however is not limited to such example. For example, these pieces of information may be transmitted or recorded as separate data associated with the encoded bit stream without being multiplexed to the encoded bit stream. Here, the term "association" means to allow the image included in the bit stream (may be a part of the image such as a slice or a block) and the information corresponding to the current image to establish a link when decoding. Namely, the 25 information may be transmitted on a different transmission path from the image (or the bit stream). The information may also be recorded in a different recording medium (or a different recording area in the same recording medium) from the image (or the bit stream). Furthermore, the information and the 30 image (or the bit stream) may be associated with each other by an arbitrary unit such as a plurality of frames, one frame, or a portion within a frame.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

Additionally, the present technology may also be configured as below.

(1)
An image processing apparatus including:
an information acquisition section that acquires setting information to set a motion vector to a second prediction unit in a second layer corresponding to a first prediction unit in a first layer of a scalable-video-decoded image containing the first layer and the second layer, which is higher than the first layer, the setting information being related to a motion vector set to the first prediction unit; and
a motion vector setting section that sets the motion vector to the second prediction unit using the setting information acquired by the information acquisition section.

(2)
The image processing apparatus according to (1),
wherein the setting information includes predictor information showing a predictor used for predicting the motion vector of the first prediction unit, and
wherein the motion vector setting section predicts the motion vector set to the second prediction unit using the predictor shown by the predictor information.

(3)
The image processing apparatus according to (1),
wherein the setting information includes predictor information showing a predictor used for predicting the motion vector of the second prediction unit, and
wherein the predictor is selected from a plurality of predictor candidates including the predictor candidate based on the motion vector set to the first prediction unit.

(4)
The image processing apparatus according to (3), wherein a smallest code number is allocated to, among a plurality of the predictor candidates, the predictor candidate based on the motion vector set to the first prediction unit.

(5)
The image processing apparatus according to any one of (2) to (4),
wherein the information acquisition section further acquires differential motion vector information showing a difference between the motion vector set to the second prediction unit and a predicted motion vector, and
wherein the motion vector setting section sets, to the second prediction unit, the motion vector generated by adding the difference shown by the differential motion vector information to the predicted motion vector predicted by using the predictor.

(6)
The image processing apparatus according to (1),
wherein the setting information includes merge information showing whether the motion vector common to the first prediction unit and a prediction unit adjacent to the first prediction unit is set, and
wherein the motion vector setting section sets the motion vector common to the second prediction unit and a prediction unit adjacent to the second prediction unit according to the merge information.

(7)
The image processing apparatus according to (1),
wherein the setting information includes merge information showing whether the motion vector common to the first prediction unit and the second prediction unit is set, and
wherein when the merge information shows that the motion vector common to the first prediction unit and the second prediction unit is set, the motion vector setting section sets the motion vector common to the first prediction unit to the second prediction unit.

(8)
The image processing apparatus according to any one of (3), (4), and (7), wherein the motion vector setting section enlarges the motion vector set to the first prediction unit in accordance with a ratio of spatial resolutions between the first layer and the second layer and then performs a motion vector setting process for the second prediction unit.

(9)

The image processing apparatus according to (8), wherein when the motion vector set to the first prediction unit is enlarged, the motion vector setting section rounds off the enlarged motion vector in accordance with accuracy of the motion vector.

(10)

The image processing apparatus according to any one of (1) to (7), wherein the first layer and the second layer are layers having mutually different spatial resolutions.

(11)

The image processing apparatus according to any one of (1) to (7), wherein the first layer and the second layer are layers having mutually different noise ratios.

(12)

The image processing apparatus according to any one of (1) to (11), wherein the first prediction unit is a prediction unit in the first layer having a pixel corresponding to a pixel in a predetermined position in the second prediction unit.

(13)

The image processing apparatus according to any one of (1) to (11), wherein the first prediction unit is, among prediction units in the first layer overlapping with the second prediction unit, the prediction unit having a largest overlap.

(14)

An image processing method including:

acquiring setting information to set a motion vector to a second prediction unit in a second layer corresponding to a first prediction unit in a first layer of a scalable-video-decoded image containing the first layer and the second layer, which is higher than the first layer, the setting information being related to a motion vector set to the first prediction unit; and setting the motion vector to the second prediction unit using the acquired setting information.

(15)

An image processing apparatus including:

an information generation section that generates setting information to set a motion vector to a second prediction unit in a second layer corresponding to a first prediction unit in a first layer of a scalable-video-decoded image containing the first layer and the second layer, which is higher than the first layer, the setting information being related to a motion vector set to the first prediction unit; and an encoding section that encodes the setting information generated by the information generation section.

(16)

An image processing method including:

generating setting information to set a motion vector to a second prediction unit in a second layer corresponding to a first prediction unit in a first layer of a scalable-video-decoded image containing the first layer and the second layer, which is higher than the first layer, the setting information being related to a motion vector set to the first prediction unit; and encoding the generated setting information.

REFERENCE SIGNS LIST 10 image encoding device (image processing apparatus)
146, 246, 346, 446 information generation section
16 encoding section
60 image decoding device (image processing apparatus)
191, 291, 391, 491 information acquisition section
192, 246, 392, 492 motion vector setting section

The invention claimed is:

1. An image processing apparatus comprising:
circuitry configured to:
set a motion vector to a second prediction unit in a second layer corresponding to a first prediction unit in a first layer of an image containing the first layer and the second layer different from the first layer, based on information indicating that the motion vector set to the second prediction unit is common to at least one of a motion vector set to the first prediction unit or a motion vector set to a neighbor prediction unit neighboring the second prediction unit; and
predict the motion vector set to the second prediction unit using the information,
wherein the information comprises a flag indicating whether the motion vector set to the second prediction unit is common with the motion vector set to the first prediction unit, and whether the motion vector set to the second prediction unit is common with the motion vector set to the neighbor prediction unit.

2. The image processing apparatus according to claim 1, wherein the circuitry is further configured to:
set the motion vector, in which the motion vector set to the second prediction unit is common to at least one of the motion vector set to the first prediction unit or the motion vector set to the neighbor prediction unit, to the second prediction unit on a condition that the flag indicates that the motion vector set to the second prediction unit is common with the motion vector set to the first prediction unit or that the motion vector set to the second prediction unit is common with the neighbor prediction unit.

3. The image processing apparatus according to claim 2, wherein the circuitry is further configured to:
enlarge the motion vector set to the first prediction unit in accordance with a ratio of spatial resolutions between the first layer and the second layer on a condition that the second prediction unit is set with the motion vector common to the first prediction unit; and
set the enlarged motion vector to the second prediction unit.

4. The image processing apparatus according to claim 1, wherein the circuitry is further configured to:
decode the second prediction unit based on the set motion vector.

5. The image processing apparatus according to claim 4, wherein the circuitry is further configured to:
generate a prediction picture data based on the set motion vector and a reference picture data of the image; and
decode the second prediction unit based on the generated prediction picture data.

6. The image processing apparatus according to claim 1, wherein the first layer and the second layer are layers having mutually different spatial resolutions.

7. The image processing apparatus according to claim 1, wherein the first layer and the second layer are layers having mutually different noise ratios.

8. The image processing apparatus according to claim 1, wherein the first prediction unit is a prediction unit in the first layer having a pixel corresponding to a pixel in a predetermined position in the second prediction unit.

9. The image processing apparatus according to claim 1, wherein the first prediction unit is, among prediction units in the first layer overlapping with the second prediction unit, the prediction unit having a largest overlap.

10. An image processing method comprising:
setting a motion vector to a second prediction unit in a second layer corresponding to a first prediction unit in a first layer of an image containing the first layer and the second layer different from the first layer, based on information indicating that the motion vector set to the second prediction unit is common to at least one of a motion vector set to the first prediction unit or a motion vector set to a neighbor prediction unit neighboring the second prediction unit; and
predicting the motion vector set to the second prediction unit using the information,
wherein the information comprises a flag indicating whether the motion vector set to the second prediction unit is common with the motion vector set to the first prediction unit, and whether the motion vector set to the second prediction unit is common with the motion vector set to the neighbor prediction unit.

11. A non-transitory computer-readable medium having embodied thereon a program, which when executed by a computer causes the computer to execute an image processing method, the method comprising:
setting a motion vector to a second prediction unit in a second layer corresponding to a first prediction unit in a first layer of an image containing the first layer and the second layer different from the first layer, based on information indicating that the motion vector set to the second prediction unit is common to at least one of a motion vector set to the first prediction unit or a motion vector set to a neighbor prediction unit neighboring the second prediction unit; and
predicting the motion vector set to the second prediction unit using the information,
wherein the information comprises a flag indicating whether the motion vector set to the second prediction unit is common with the motion vector set to the first prediction unit, and whether the motion vector set to the second prediction unit is common with the motion vector set to the neighbor prediction unit.

12. The image processing apparatus according to claim 1, wherein the information further comprises merge information indicating whether the motion vector common to the second prediction unit and at least one the motion vector set to the first prediction unit or the motion vector set to the neighboring prediction unit neighboring the second prediction unit, is set based on the flag.

13. The image processing apparatus according to claim 1, wherein the information further indicates whether the motion vector set to the second prediction unit is common with a motion vector set to a prediction unit adjacent on a left side of the second prediction unit.

14. The image processing apparatus according to claim 1, wherein the information further indicates whether the motion vector set to the second prediction unit is common with only the motion vector set to the first prediction unit.

15. The image processing apparatus according to claim 1, wherein the information further indicates whether the motion vector set to the second prediction unit is common with only the motion vector set to the neighbor prediction unit.

* * * * *